(12) United States Patent
Maeda et al.

(10) Patent No.: US 12,177,025 B2
(45) Date of Patent: Dec. 24, 2024

(54) MOBILE COMMUNICATION SYSTEM

(71) Applicant: MITSUBISHI ELECTRIC CORPORATION, Tokyo (JP)

(72) Inventors: Miho Maeda, Tokyo (JP); Mitsuru Mochizuki, Tokyo (JP); Taiga Saegusa, Tokyo (JP); Yasushi Iwane, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/446,938

(22) Filed: Aug. 9, 2023

(65) Prior Publication Data
US 2023/0388059 A1 Nov. 30, 2023

Related U.S. Application Data

(60) Continuation of application No. 15/164,586, filed on May 25, 2016, now Pat. No. 12,003,325, which is a
(Continued)

(30) Foreign Application Priority Data

Jun. 19, 2009 (JP) .................................. 2009-146295
Apr. 2, 2010 (JP) .................................. 2010-086195

(51) Int. Cl.
*H04L 1/1812* (2023.01)
*H04L 5/00* (2006.01)
(Continued)

(52) U.S. Cl.
CPC ............ *H04L 1/1812* (2013.01); *H04L 5/001* (2013.01); *H04L 5/0055* (2013.01); *H04W 72/20* (2023.01);
(Continued)

(58) Field of Classification Search
CPC ....... H04L 1/1812; H04L 5/001; H04L 5/0055; H04W 72/20; H04W 72/23; H04W 28/06; H04W 48/08; H04W 88/02; H04W 88/12
See application file for complete search history.

(56) References Cited

U.S. PATENT DOCUMENTS 7,873,710 B2    1/2011 Kiley et al.
8,156,206 B2    4/2012 Kiley et al.
(Continued)

FOREIGN PATENT DOCUMENTS

CN          1889751 A      1/2007
CN        101098294 A      1/2008
(Continued)

OTHER PUBLICATIONS

Ericsson, "Carrier aggregation in LTE-Advanced", Jun. 24, 2008, 3GPP Draft R1-082468, 3rd Generation Partnership Project (3GPP) RAN WG1. (Year: 2008).*
(Continued)

*Primary Examiner* — Charles C Jiang
*Assistant Examiner* — Shawn D Miller
(74) *Attorney, Agent, or Firm* — PROCOPIO, CORY, HARGREAVES & SAVITCH LLP

(57) ABSTRACT

In a mobile communication system according to the present invention, with the separate use of a plurality of component carriers or with the use of a carrier set including the plurality of component carriers aggregated, a base station performs radio communication with a user equipment corresponding to the component carrier or a user equipment corresponding to the aggregated carriers. In particular, in a case where the base station performs radio communication with the user equipment corresponding to the aggregated carriers with the use of the aggregated carriers, each of a plurality of transport blocks created by dividing a transport channel is transmitted
(Continued)

per each of the plurality of component carriers constituting the aggregated carriers, and control information related to radio communication between the base station and the user equipment corresponding to the aggregated carriers is transmitted such that physical information of the corresponding component carrier is identifiable. Accordingly, communication control is performed efficiently while improving a communication speed correspondingly to the aggregated carriers.

4 Claims, 38 Drawing Sheets

Related U.S. Application Data division of application No. 14/531,516, filed on Nov. 3, 2014, now Pat. No. 9,386,577, which is a division of application No. 13/378,380, filed as application No. PCT/JP2010/003969 on Jun. 15, 2010, now Pat. No. 8,908,560.

(51) Int. Cl.
| | | |
|---|---|---|
| *H04W 28/06* | (2009.01) | |
| *H04W 48/08* | (2009.01) | |
| *H04W 72/20* | (2023.01) | |
| *H04W 72/23* | (2023.01) | |
| *H04W 88/02* | (2009.01) | |
| *H04W 88/12* | (2009.01) | |

(52) U.S. Cl.
CPC ............ *H04W 72/23* (2023.01); *H04W 28/06* (2013.01); *H04W 48/08* (2013.01); *H04W 88/02* (2013.01); *H04W 88/12* (2013.01)

(56) References Cited

U.S. PATENT DOCUMENTS

| | | |
|---|---|---|
| 8,514,793 B2 | 8/2013 | Gauvreau et al. |
| 8,639,785 B2 | 1/2014 | Kiley et al. |
| 8,675,585 B2 | 3/2014 | Park et al. |
| 8,681,724 B2 | 3/2014 | Du et al. |
| 8,687,541 B2 | 4/2014 | Lohr et al. |
| 8,725,851 B2 | 5/2014 | Kiley et al. |
| 8,842,613 B2 | 9/2014 | Zhang |
| 8,879,485 B2 | 11/2014 | Chun et al. |
| 8,959,190 B2 | 2/2015 | Kiley et al. |
| 8,995,358 B2 | 3/2015 | Chen et al. |
| 9,768,922 B2 | 9/2017 | Yamada et al. |
| 2004/0071194 A1 | 4/2004 | Suwa |
| 2005/0105657 A1 | 5/2005 | Kroeger et al. |
| 2008/0189360 A1 | 8/2008 | Kiley et al. |
| 2009/0257381 A1 | 10/2009 | Kuri et al. |
| 2009/0285174 A1 | 11/2009 | Haga et al. |
| 2009/0316659 A1 | 12/2009 | Lindoff et al. |
| 2010/0014467 A1 | 1/2010 | Wang et al. |
| 2010/0227569 A1 | 9/2010 | Bala et al. |
| 2010/0267394 A1 | 10/2010 | Wu |
| 2010/0271970 A1 | 10/2010 | Pan et al. |
| 2011/0092242 A1 | 4/2011 | Parkvall |
| 2011/0134877 A1 | 6/2011 | Noh |
| 2011/0205976 A1 | 8/2011 | Roessel |
| 2011/0211541 A1 | 9/2011 | Yuk |
| 2011/0243261 A1 | 10/2011 | Bienas |
| 2011/0310856 A1 | 12/2011 | Hariharan |
| 2012/0042006 A1 | 2/2012 | Kiley et al. |
| 2012/0069819 A1 | 3/2012 | Park |
| 2012/0198328 A1 | 8/2012 | Kiley et al. |
| 2012/0294694 A1 | 11/2012 | Garot |
| 2012/0317652 A1 | 12/2012 | Kiley et al. |
| 2013/0325935 A1 | 12/2013 | Kiley et al. |

FOREIGN PATENT DOCUMENTS

| | | |
|---|---|---|
| CN | 101394199 A | 3/2009 |
| CN | 101404526 | 4/2009 |
| CN | 101404539 A | 4/2009 |
| CN | 101426225 A | 5/2009 |
| CN | 101442818 A | 5/2009 |
| EP | 1 814 251 A1 | 8/2007 |
| KR | 10-2007-0085969 | 8/2007 |
| KR | 10-2008-0110788 | 12/2008 |
| WO | WO 2007/061866 A2 | 5/2007 |
| WO | WO 2008/098082 A2 | 8/2008 |
| WO | WO 2009/153165 A1 | 12/2009 |
| WO | WO 2010/048178 A1 | 4/2010 |
| WO | WO 2010/051209 A1 | 5/2010 |
| WO | WO 2010/064521 A1 | 6/2010 |

OTHER PUBLICATIONS

Japanese Office Action issued Jan. 10, 2017 in Patent Application No. 2015-245735 (with Partial English Translation).
Office Action issued Feb. 14, 2013, In Russian Patent Application No. 2012101795/07 (002428) with English translation.
Office Action issued May 30, 2013 in Korean Application No. 10-2011-7029355 (with English translation).
Japanese Office Action with partial English translation mailed on Jan. 28, 2014 in counterpart Japanese Application No. 2012-282830, 6 pages.
Nokia Siemens Networks, Nokia, Use of Background Interference Matrix for Autonomous Component Carrier Selection for LTE-Advanced, 3GPP TSG RAN WG1 #55-bis Meeting R1-090235, Jan. 12, 2009, 8 pages.
Office Action issued Aug. 9, 2016 in Japanese Patent Application No. 2015-245735 (with Partial English language translation).
Panasonic, "Discussion on when UE starts aggregating carriers" 3GPP TSG RAN WG1 Meeting #55bis R1-090261, Jan. 12-16, 2009, pp. 1-2.
Extended European Search Report issued on Sep. 27, 2016 in Patent Application No. 10789216.8.
"Carrier aggregation in LTE-Advanced", Ericsson, R1-082468, XP050110739, 2008, 6 Pages.
Combined Chinese Office Action and Search Report issued Jun. 16, 2017 in Chinese Patent Application No. 201510236237.4 (with English translation of Search Report).
Office Action issued Sep. 29, 2017 in Australian Patent Application No. 2016204585.
Combined Chinese Office Action and Search Report issued Sep. 4, 2017 in Chinese Patent Application No. 201510237084.5 (with English translation).
Combined Chinese Office Action and Search Report issued Jan. 23, 2018 in Chinese Patent Application No. 201510237082.6 (with English translation).
Office Action issued Mar. 8, 2018 in Indian Patent Application No. 9534/CHENP/2011, 6 pages.
Office Action issued Feb. 24, 2018 in Chinese Patent Application No. 201510236237.4, with English-language Translation, 15 pages.
Huawai, "DL/UL Asymmetric Carrier aggregation", 3GPP TSG-RAN-WG1 Meeting #54bis R1-083706, Sep. 29-Oct. 3, 2018, 5 pages.
Office Action issued Mar. 12, 2018 in European Patent Application No. 10 789 216.8, 4 pages.
Office Action issued Apr. 17, 2018 in Japanese Patent Application No. 2017-075308, 6 pages. (with English-language Translation).
NEC, Higher Layer Functions to Support Carrier Aggregation, 3GPP TSG-RAN WG2 #66 R2-093287, 3GPP, Apr. 28, 2009, 3 pages.
HTC Corporation, LTE-A MAC for multiple component carriers, 3GPP TSG-RAN WG2 #66 R2-092874, 3GPP, Apr. 28, 2009, 2 pages.
Trial Decision issued May 8, 2018 in Japanese Patent Application No. 2015-245735, with English-language Translation, 13 pages.
Office Action issued Apr. 27, 2018 in Chinese Patent Application No. 201510237084.5, with English-language Translation, 12 pages.

(56) References Cited

OTHER PUBLICATIONS

Office Action issued Apr. 27, 2018 in Russian Patent Application No. 2014111726/07(018453), with English-language Translation, 6 pages.
Australian Examination Report issued May 22, 2018 in Australian Application No. 2016204585, 5 pages.
Office Action issued Jul. 31, 2018 in Japanese Patent Application No. 2017-075308, with English-language translation, 6 pages.
ZTE, Primary and Secondary PDCCH Design for LTE-A, 3GPP TSG-RAN WG1 meeting #57, R1-091707, 3GPP, Apr. 28, 2009, 12 pages.
CATT, Initial Random Access Procedure for LTE-A, 3GPP TSG-RAN WG1 meeting #57, R1-091999, 3GPP, Apr. 28, 2009, 4 pages.
Office Action issued Jul. 19, 2018 in Chinese Patent Application No. 201510237082.6, with English-language translation, 13 pages.
Office Action issued Aug. 3, 2018 in European Patent Application No. 10 789 216.8, 4 pages.
Office Action issued Aug. 6, 2018 in Russian Patent Application No., 2014111726/07(018453), with English-language translation, 6 pages.
NTT Docomo, Initial Access Procedure of Asymmetric Wider Bandwidth in LTE-Advanced, 3GPP TSG RAN WG1 Meeting #56bis, R1-091487, Mar. 2009, 5 pages.
Office Action issued Sep. 13, 2018 in Australian Patent Application No., 2016204585, 4 pages.
Office Action issued Sep. 18, 2018 in Chinese Patent Application No., 201510237084.5, with English-language translation, 12 pages.
Office Action issued Feb. 1, 2019 in Chinese Patent Application No., 201510237085.X, with English-language translation, 15 pages.
Office Action issued Feb. 11, 2019 in Chinese Patent Application No., 201510237082.6, with English-language translation, 11 pages.
Office Action issued Jun. 27, 2019 in Australian Patent Application No., 2018236830, 4 pages.
Office Action issued Jul. 8, 2019 in European Patent Application No., 10789216.8, 7 pages.
Office Action issued Jul. 10, 2019, in Chinese Patent Application No., 201510237084.5, with English-language translation, 16 pages.
Chinese Office Action issued Jul. 3, 2019 in Chinese Patent Application No. 201510236237.4 (with English translation), 9 pages.
Chinese Office Action issued Aug. 5, 2019 in Chinese Patent Application No. 201510237085.X (with English translation), 8 pages.
Office Action issued on Aug. 27, 2019 in Japanese Patent Application No. 2018-237964 (with unedited computer generated English translation), 4 pages.
"Primary Component Carrier Selection, Monitoring, and Recovery", Nokia Siemens Networks, Nokia. 3GPP TSG RAN WG1 #56 Meeting, R1-090735, Feb. 3, 2009, 6 pages.
"Control plane aspects of carrier aggregation", Ericsson, 3GPP TSG-RAN WG2 #66, R2-092958, Apr. 28, 2009, 4 pages.
Chinese Office Action issued on Aug. 30, 2019 in Patent Application No. 201510237082.6.
Office Action issued on Nov. 19, 2019 in Japanese Patent Application No. 2018-237964 (with unedited computer generated English translation), 8 pages.
Brazilian Office Action and Search Report dated Jan. 20, 2020 in Brazilian Patent Application No. PI1011352-5 with partial English translation.
Extended European Search Report dated Mar. 20, 2020 in European Patent Application No. 20150796.9.
Chinese Decision of Reexamination dated Mar. 11, 2020 in Chinese Patent Application No. 201510237082.6 with computer-generated translation.
Hearing Notice issued Jul. 16, 2020 in Indian Application No. 9534/CHENP/2011.
Japanese Office Action issued Aug. 4, 2020 in Japanese Application No. 2018-237964 (with Computer Generated English Translation).
Eunjong Lee et al. "Proposed Text Related to MAC Operation of Multi-carrier for the IEEE 802.16m Amendment", IEEE C802.16m-09/1096, IEEE Broadband Wireless Access Working Group, Apr. 27, 2019, 9 pages, http://grouper.ieee.org/groups/802/tgm/contrib/C80216m-09_1098.doc.
Japanese Office Action issued Nov. 24, 2020 in Japanese Application No. 2018-237964 (with Computer Generated English Translation).
Australian Office Action issued Apr. 26, 2021 in Australian Patent Application No. 2020204193, 4 pages.
European Office Action issued Apr. 28, 2021 in European Patent Application No. 20150796.9, 3 pages.
Qualcomm Europe, "Avoiding ping-pong for CS/PS mode 1 UE in connected mode," 3GPP TSG-RAN WG2 meeting #66, R2-093171, XP050340884, May 2009, 3 pages.
Indian Office Action issued Jun. 16, 2021 in Indian Application No. 201848033242.
Indian Office Action issued Jun. 23, 2021 in Indian Application No. 201848033247.
Decision issued May 30, 2021 in Indian Patent Application No. 9534/CHENP/2011.
European Office Action issued Apr. 11, 2022 in European Application No. 20150796.9.
Australian Office Action issued Apr. 22, 2022 in Australian Application No. 2020204193.
Office Action issued May 25, 2022 in Russian Application No. 2019101192/07(001915) (with Computer Generated English Translation).
Summons to attend oral proceedings issued Mar. 9, 2023, in corresponding European Patent Application No. 20150796.9, 9 pages.
Extended Search Report dated Jul. 11, 2023, issued in corresponding European patent application No. 23179103.9.
Panasonic, PDCCH design for carrier aggregation, 3GPP TSG-RAN WG1 Meeting #57 R1-091743, May 4, 2009, 10 pages.
Chinese Office Action dated Nov. 15, 2013 in corresponding Chinese Patent Application No. 2010800272538 with partial English translation, 11 pp.
3GPP TSG-RAN WG1 Meeting #54, Issue Date Aug. 12, 2008, Panasonic, Transport block mapping and PDCCH signaling for carrier aggregation, 4 pp.
3GPP TSG-RAN WG2 #66, Issue Date Apr. 28, 2009, Sharp, Configuration parameters issues in carrier aggregation, 5 pp.
3GPP TSG-RAN WG2 #66, Issue Date Apr. 28, 2009, Ericsson, Control plane aspects of carrier aggregation, 5 pp.
International Preliminary Report on Patentability and Written Opinion of the International Searching Authority issued Jan. 5, 2012 in patent application No. PCT/JP2010/003969 filed Jun. 15, 2010 (with English translation).
International Search Report issued Jul. 13, 2010 in patent application No. PCT/JP2010/003969.
Huawei, "Carrier Aggregation in LTE-Advanced", 3GPP R1-084346, Nov. 10, 2008, 6 pages.
ZTE, "Issues on Carrier Aggregation for Advanced E-UTRA", 3GPP R1-084111, Nov. 10, 2008, 4 pages.
CATT, RITT, "Carrier Aggregation for LTE-A", 3GPP R1-090187, Jan. 12, 2009, 3 pages.
"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.6.0, Sep. 2008, pp. 1-137.
Nokia Siemens Networks, Nokia, Huawei, "Signaling of MBSFN subframe allocation in D-BCH", 3GPP R1-072963, Jun. 2007, 5 pages.
"$3^{rd}$ Generation Partnership Project; Technical Specification Group Radio Access Network; Home (e)NodeB; Network Aspects (Release 8)", 3GPP TR R3.020 V0.6.0, May 2008, pp. 1-53.
"$3^{rd}$ Generation Partnership Project; Technical Specification Group Radio Access Network; Evolved Universal Terrestrial Radio Access (E-UTRA); User Equipment (UE) Procedures in Idle Mode (Release 8)", 3GPP TS 36.304 V8.4.0, Dec. 2008, pp. 1-29.
Masato Kitazoe, "LS on CSG cell identification", 3GPP R2-082899, May 5, 2008, pp. 1-2.

(56) References Cited

OTHER PUBLICATIONS

Mona Mustapha, "LS on HNB/HeNB Open Access Mode", 3GPP S1-083461, Oct. 13, 2008, 2 pages.

3rd Generation Partnership Project; Technical Specification Group Radio Access Network; Further Advancements for E-UTRA Physical Layer Aspects (Release 9), 3GPP TR 36.814 V0.4.1, Feb. 2009, pp. 1-31.

Qualcomm Europe, "Notion of Anchor Carrier in LTE-A", 3GPP R1-090860, Feb. 9, 2009, pp. 1-5.

3rd Generation Partnership Project; Technical Specification Group Radio Access Network; Evolved Universal Terrestrial Radio Access (E-UTRA) Radio Resource Control (RRC); Protocol Specification (Release 8), 3GPP TS 36.331 V8.5.0, Mar. 2009, pp. 1-203.

Huawei, "Carrier Aggregation in Active Mode", 3GPP R2-093104, May 4, 2009, 4 pages.

Huawei, "RAN2 considerations for carrier aggregation", 3GPP R2-092180, Mar. 23, 2009, 3 pages.

Motorola, "Layer-2 structure for LTE-A carrier aggregation", 3GPP R2-093204, May 4, 2009, 4 pages.

3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V8.5.0, Mar. 2009, pp. 1-46.

Ericsson, "Way forward for measurements for Carrier Aggregation", 3GPP R2-100812, Jan. 18, 2010, pp. 1-2.

"3rd Generation Partnership Project; Technical Specification Group Radio Access Network; Evolved Universal Terrestrial Radio Access (E-UTRA) Radio Resource Control (RRC); Protocol specification (Release 9)", 3GPP TS 36.331 V9.1.0, Dec. 2009, pp. 1-232.

"3rd Generation Partnership Project; Technical Specification Group Radio Access Network; Feasibility study for Further Advancements for E-UTRA (LTE-Advanced) (Release 9)", 3GPP TR 36.912 V9.1.0, Dec. 2009, pp. 1-58, 1-52, and 1-50.

Ericsson, "Summary of email discussion [68b#24] LTE: CA measurements", 3GPP R2-101423, Feb. 22, 2010, pp. 1-4.

NTT Docomo, Inc., "Carrier Aggregation Deployment Scenarios", 3GPP R2-100531, Jan. 18, 2010, 2 pages.

Office Action issued Apr. 28, 2015 in Japanese Patent Application No. 2014-158588 (with partial English language translation).

Panasonic, "MAC to physical layer mapping and control signaling for carrier aggregation", 3GPP TSG-RAN WG1 Meeting #55, R1-084222, (Nov. 4, 2008), 4 pages.

Japanese Office Action issued on Oct. 20, 2015 in corresponding Japanese application No. 2014-158588, with partial English translation (6 pages).

LG Electronics, UE-specific Carrier Assignment for LTE-Advanced, R1-091207, 3GPP, Mar. 17, 2009.

Ericsson, Qualcomm, Nokia Motorola, Panasonic Huawei, ZTE, Downlink Control Signaling, R1-071216, 3GPP, Feb. 16, 2007.

Office Action mailed Mar. 15, 2016 in Japanese Patent Application No. 2014-158588 (with/ English Translation).

U.S. Appl. No. 61/106,810, U.S. Appl. No. 61/111,573, filed 2008.
U.S. Appl. No. 61/142,429, U.S. Appl. No. 61/157,758, filed 2009.
U.S. Appl. No. 61/169,319, filed 2009.

* cited by examiner

F I G. 5
[A]
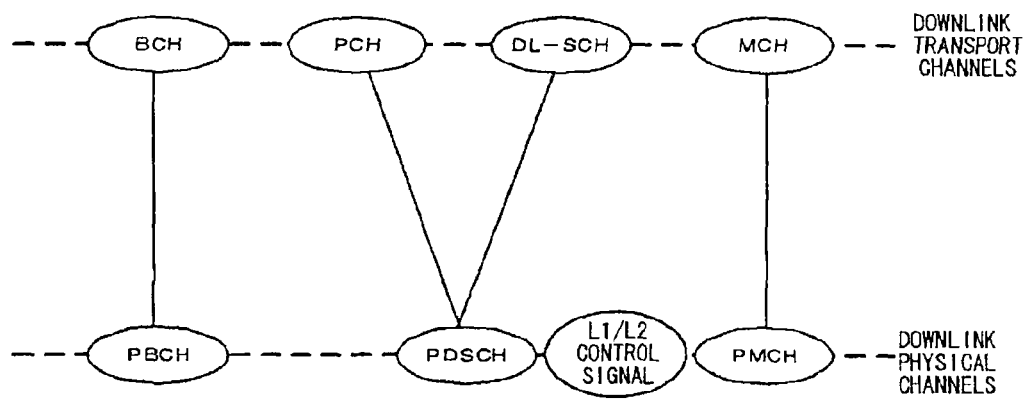
[B]
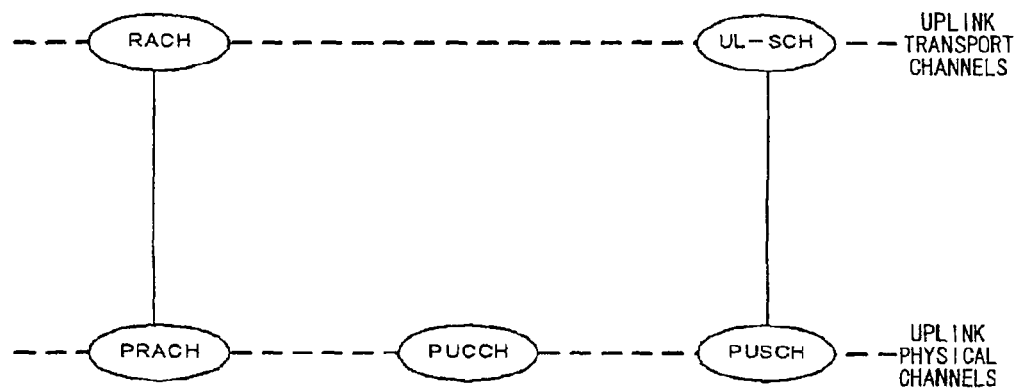

FIG. 6
[A]
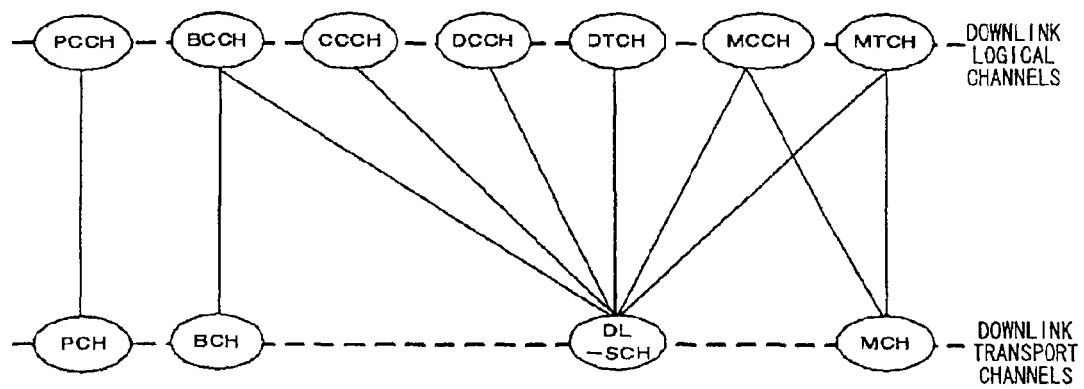
[B]
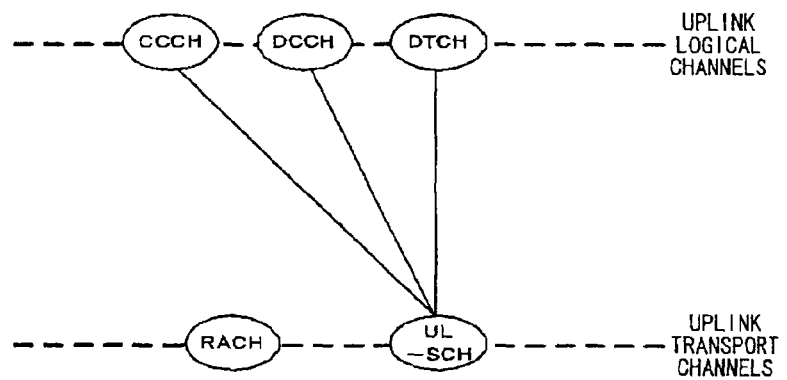

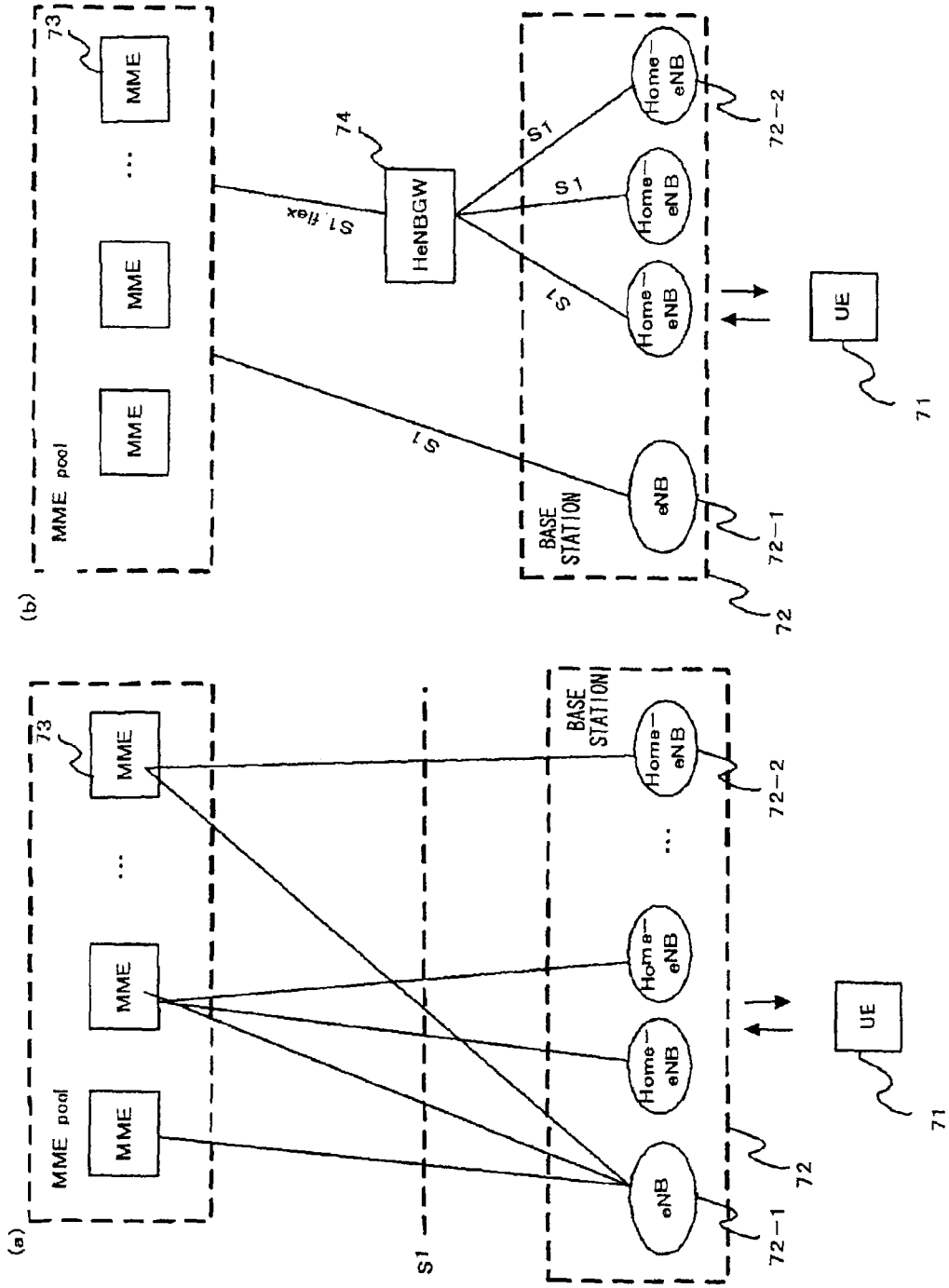

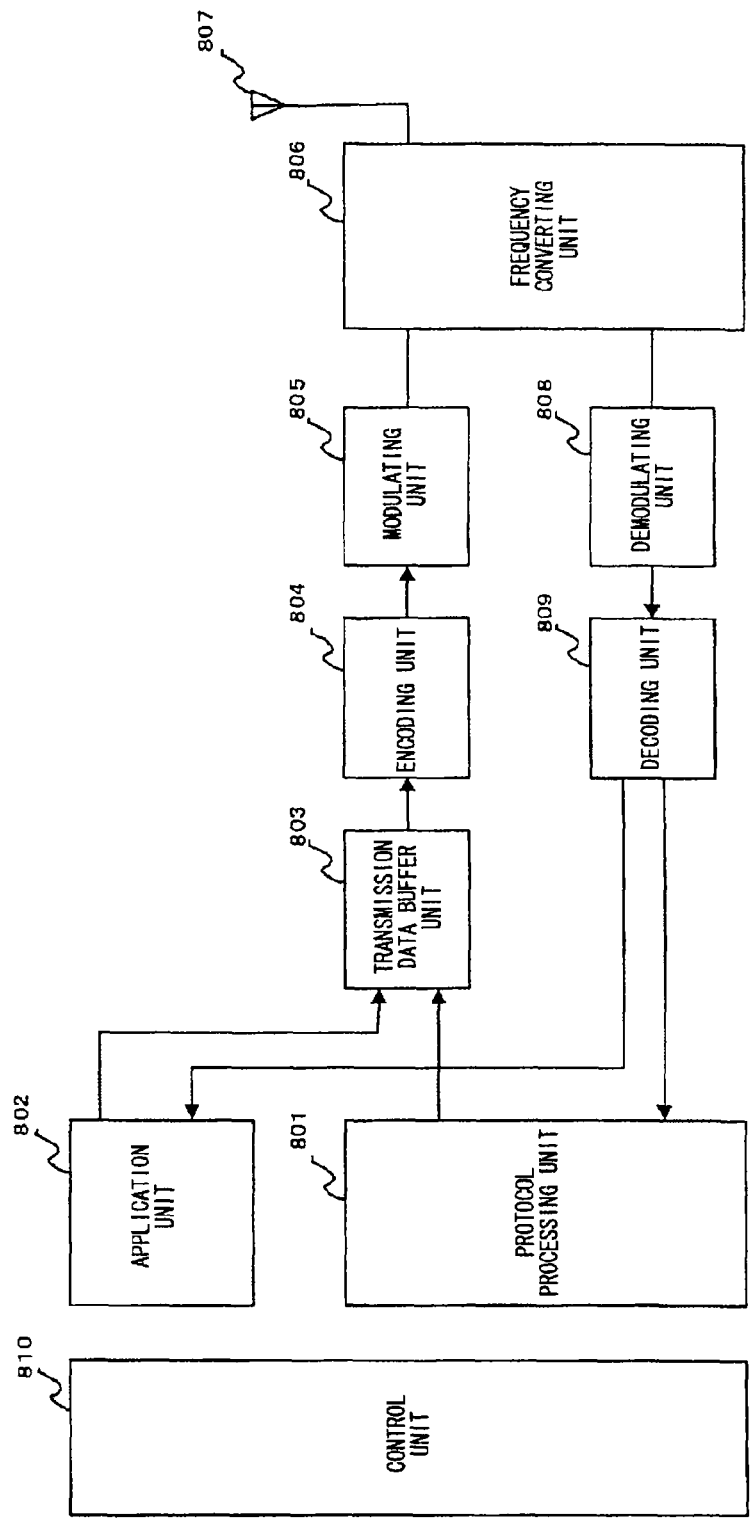

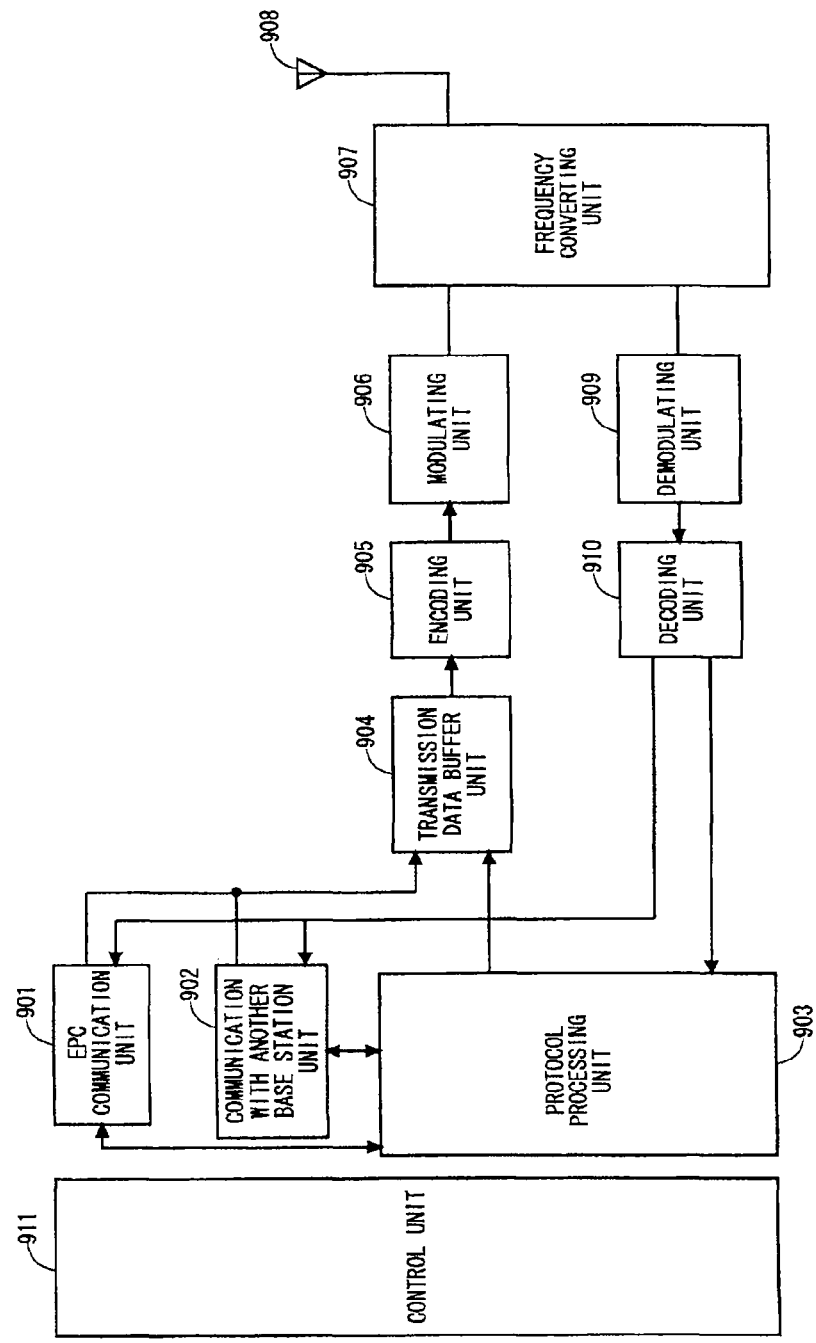

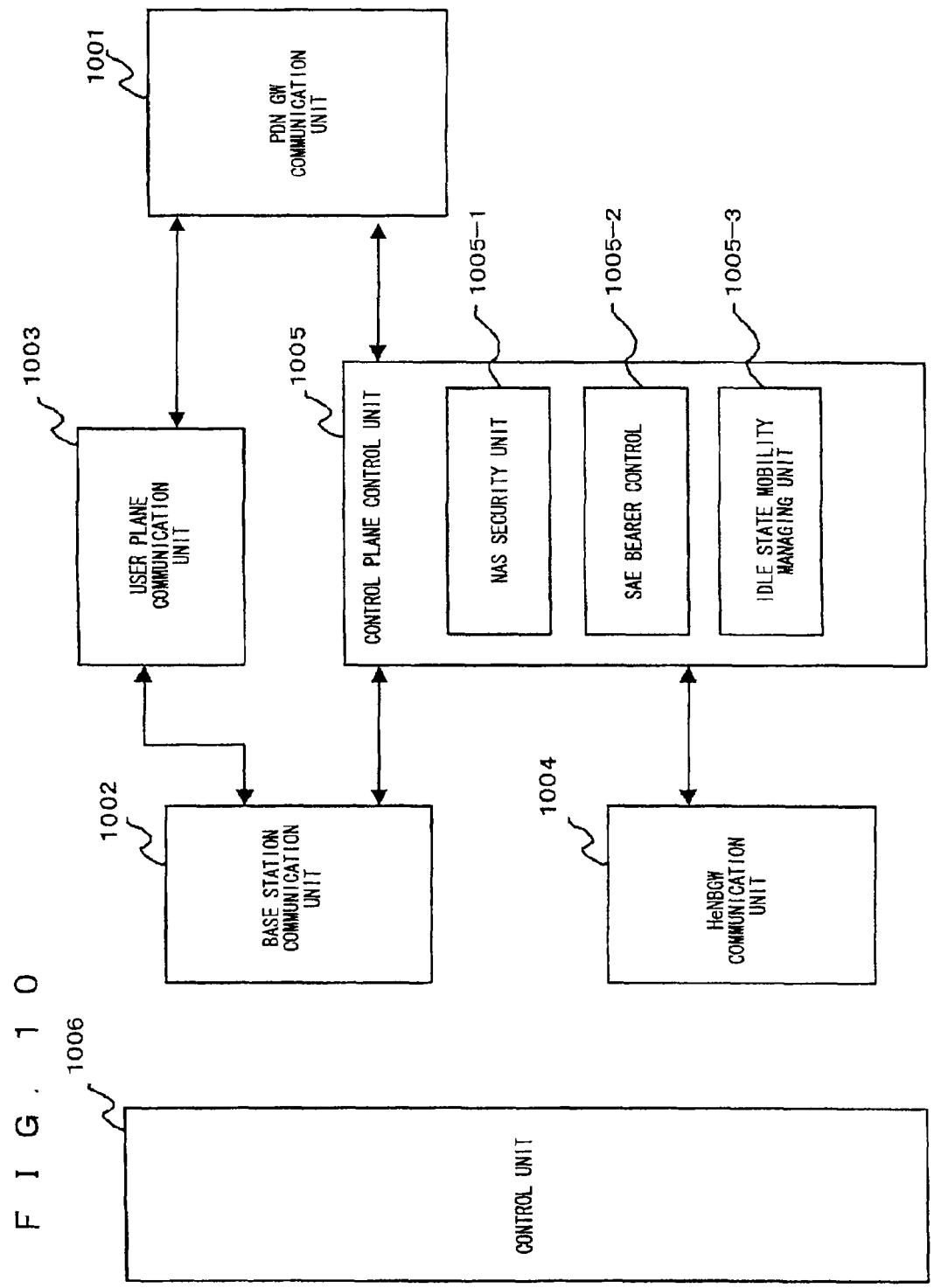

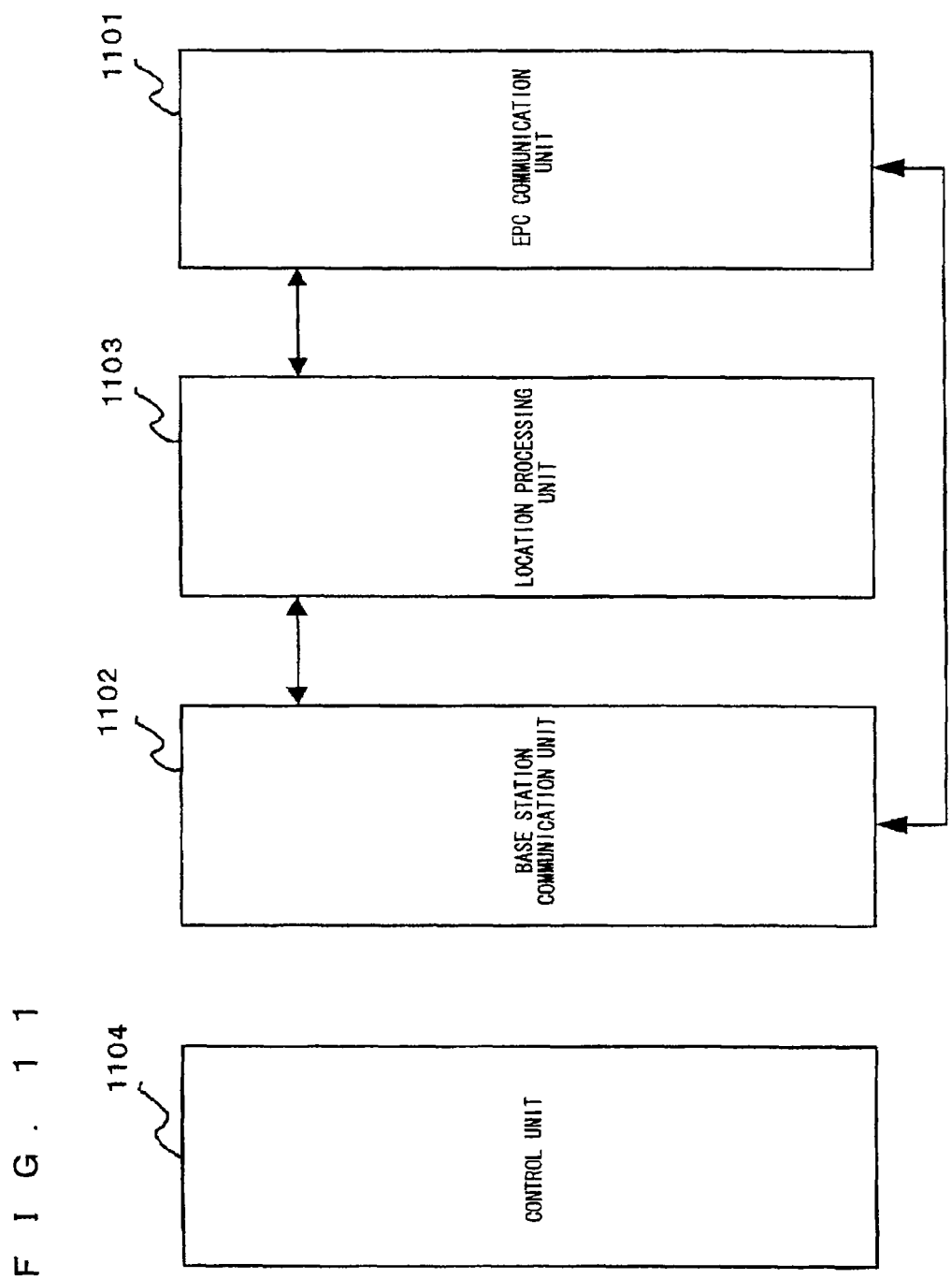

F I G . 1 2
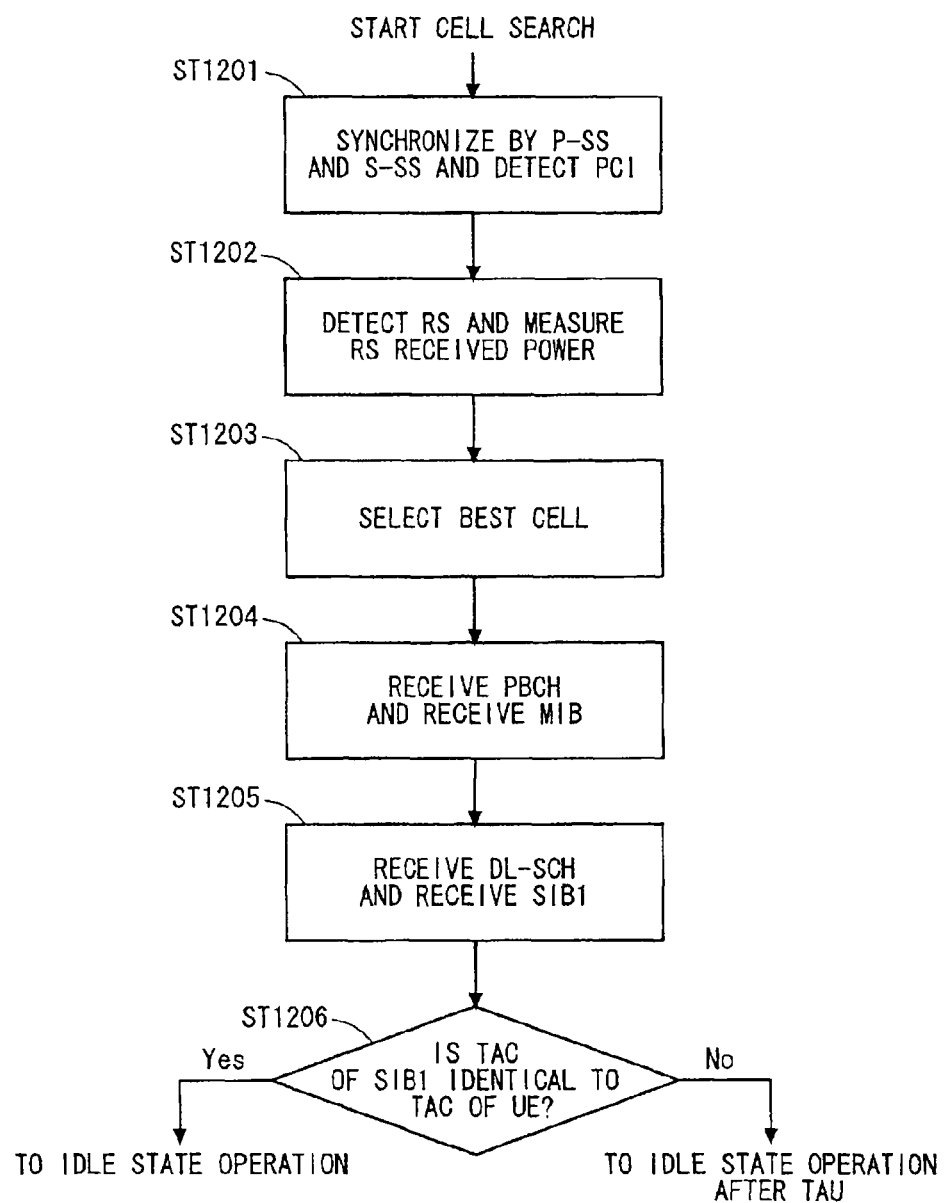

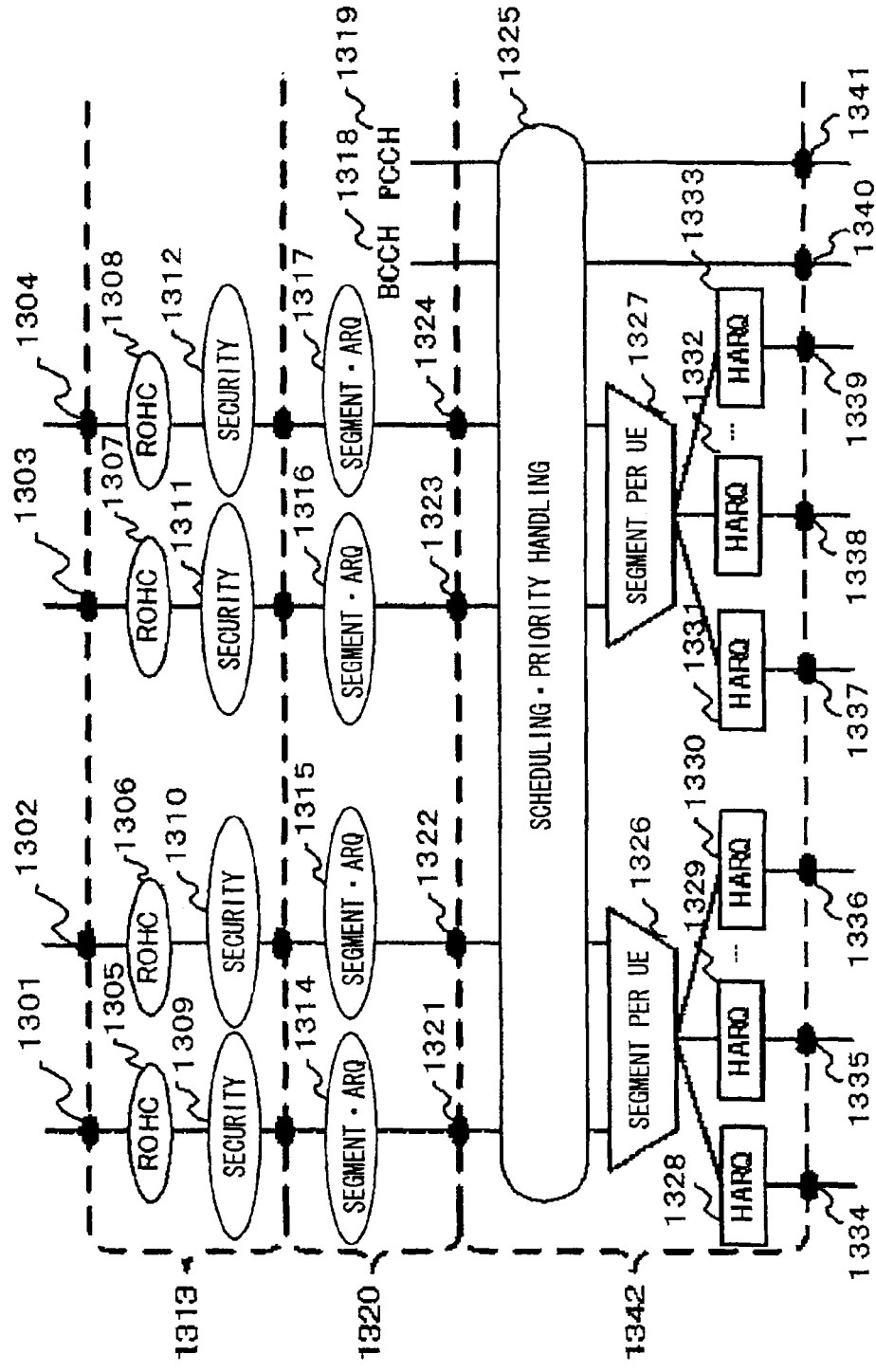

(a)

(b)

| FREQUENCY | IDENTIFIER OF COMPONENT |
|---|---|
| f1 | CC#1 |
| f2 | CC#2 |
| f3 | CC#3 |
| f4 | CC#4 |
| f5 | CC#5 |
| f6 | CC#6 |
| f7 | CC#7 |
| f8 | CC#8 |
| f9 | CC#9 |
| f10 | CC#10 |

F I G . 1 7
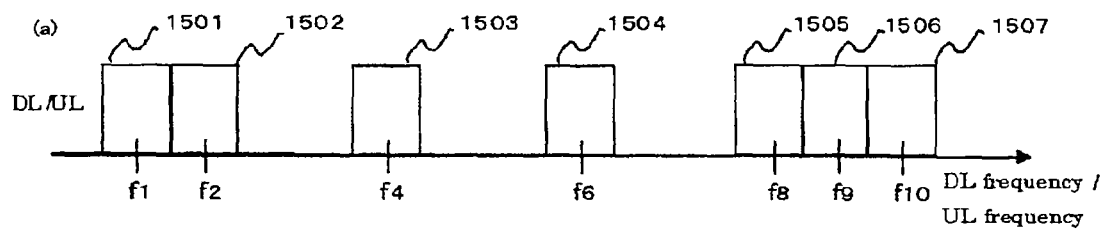

(b)

| FREQUENCY | IDENTIFIER OF COMPONENT |
|---|---|
| f1 | CC#1 |
| f2 | CC#2 |
| f3 | CC#3 |
| f4 | CC#4 |
| f5 | CC#5 |
| f6 | CC#6 |
| f7 | CC#7 |
| f8 | CC#8 |
| f9 | CC#9 |
| f10 | CC#10 |

(c)

| COMPONENT INDEX | SCHEDULING COMPONENT |
|---|---|
| CC_I#1 | CC#2 |
| CC_I#2 | CC#6 |

FIG. 26
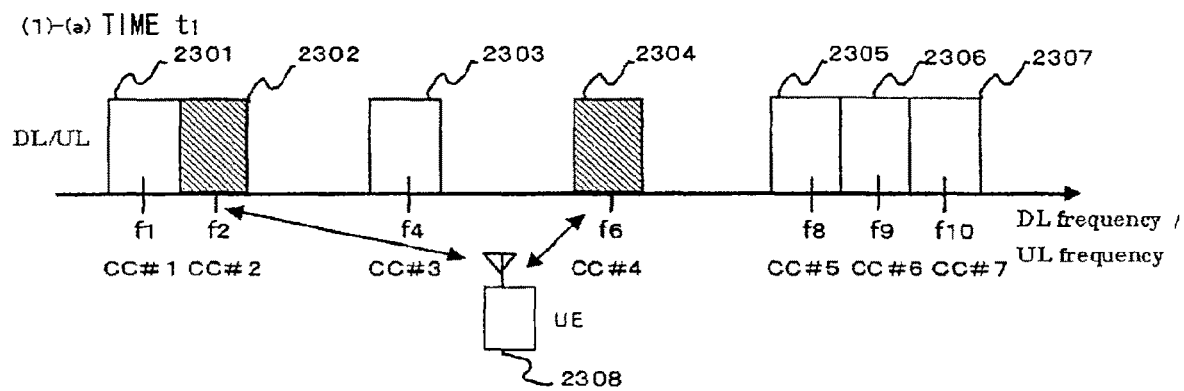
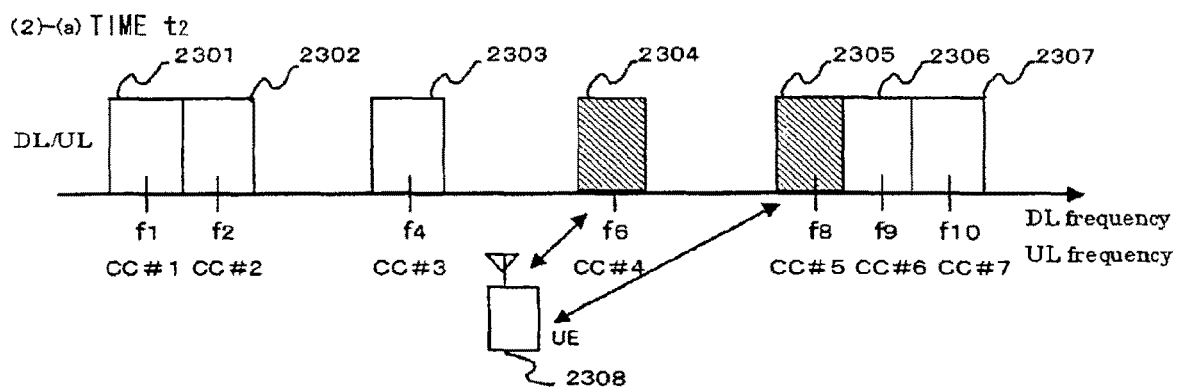

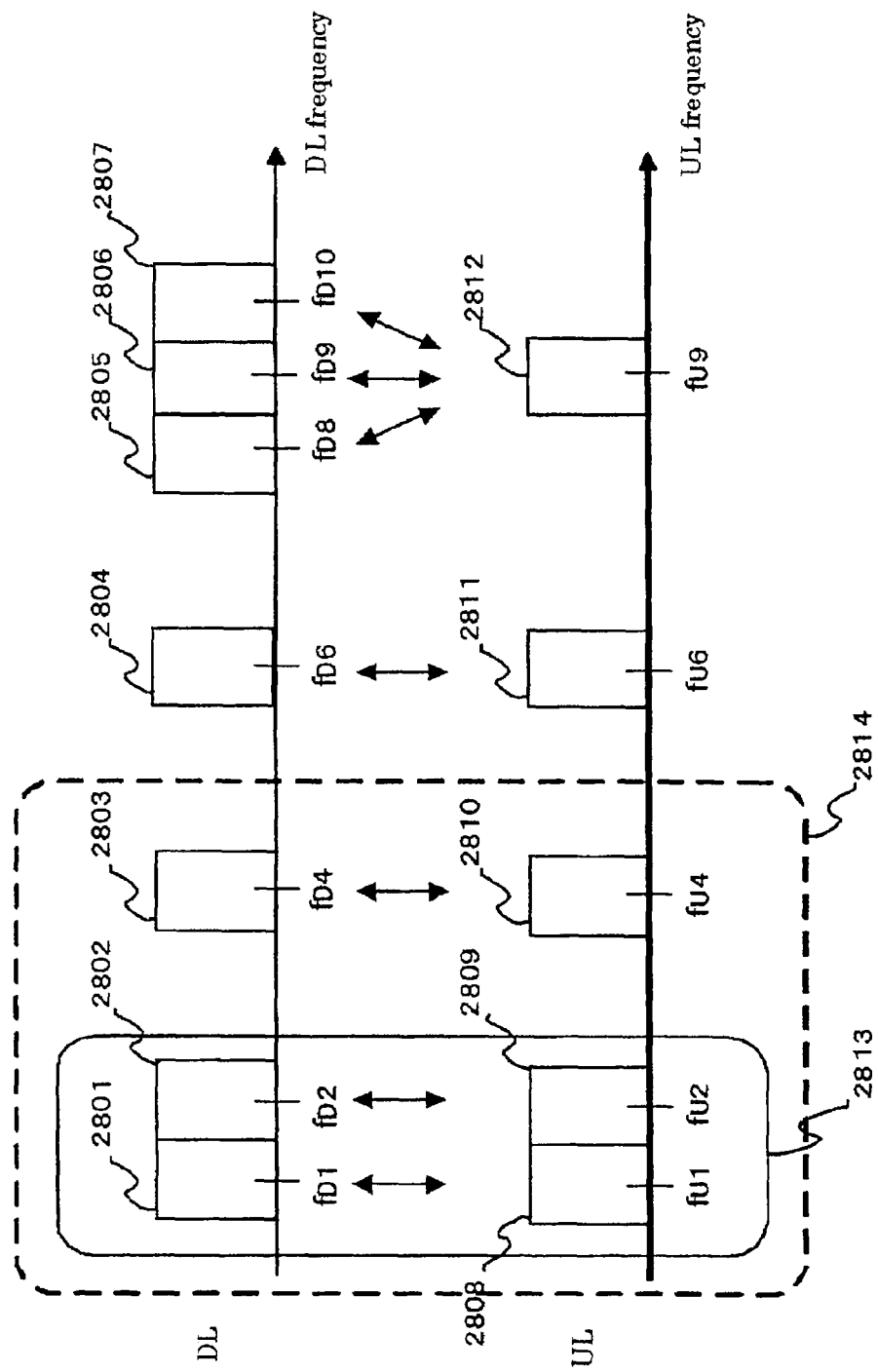

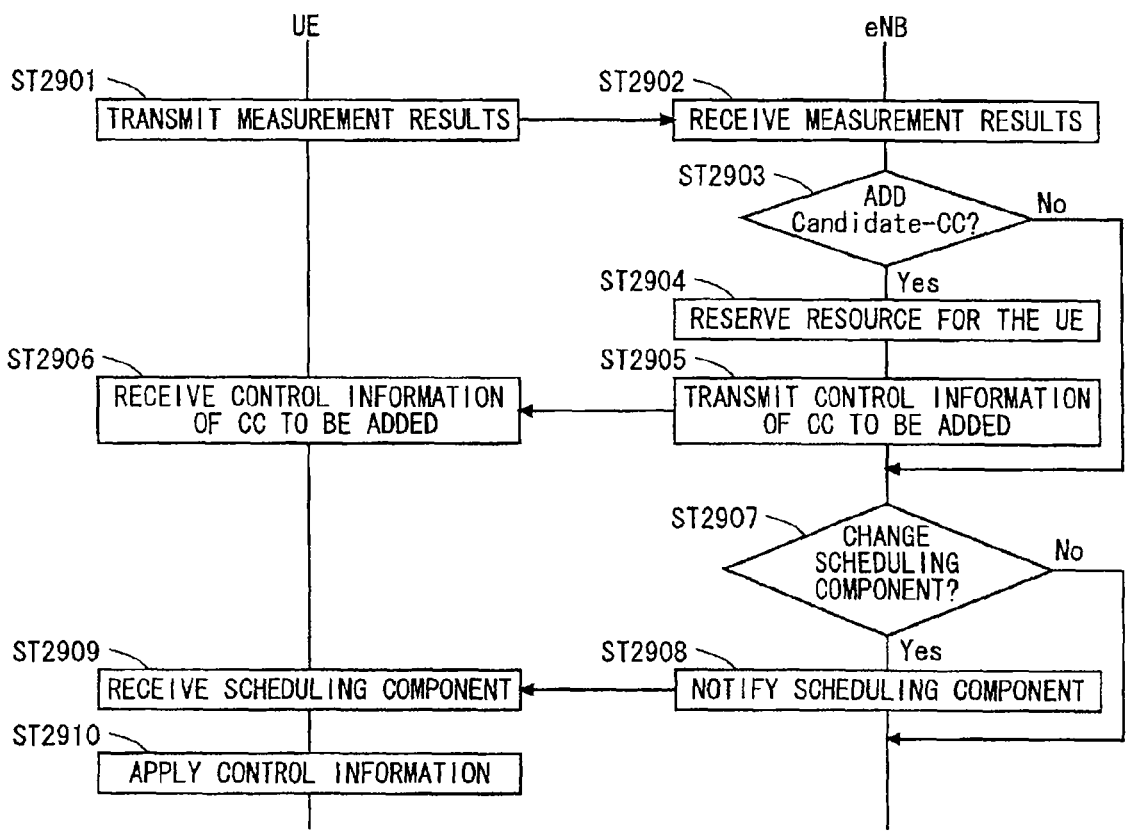
F I G . 2 9

MOBILE COMMUNICATION SYSTEM

CROSS-REFERENCE TO RELATED APPLICATIONS

This is a continuation application of U.S. application Ser. No. 15/164,586, filed on May 25, 2016, which is a divisional of U.S. application Ser. No. 14/531,516, filed on Nov. 3, 2014 (now U.S. Pat. No. 9,386,577), which is a divisional of U.S. application Ser. No. 13/378,380, filed on Dec. 15, 2011 (now U.S. Pat. No. 8,908,560), which is a U.S. national phase application of International Application PCT/JP2010/003969, filed on Jun. 15, 2010, and claims the benefit of priority from Japanese Application No. 2009-146295, filed on Jun. 19, 2009, and Japanese Application No. 2010-086195, filed on Apr. 2, 2010. The entire contents of each of which are incorporated herein by reference.

TECHNICAL FIELD

The present invention relates to a mobile communication system in which a base station performs radio communication with a plurality of user equipments.

BACKGROUND ART

Commercial service of a wideband code division multiple access (W-CDMA) system among so-called third-generation communication systems has been offered in Japan since 2001. In addition, high speed down link packet access (HSDPA) service for achieving higher-speed data transmission using a down link has been offered by adding a channel for packet transmission high speed-downlink shared channel (HS-DSCH)) to the down link (dedicated data channel, dedicated control channel). Further, in order to increase the speed of data transmission in an uplink direction, service of a high speed up link packet access (HSUPA) has been offered. W-CDMA is a communication system defined by the 3rd generation partnership project (3GPP) that is the standard organization regarding the mobile communication system, where the specifications of Release 8 version are produced.

Further, 3GPP is studying new communication systems referred to as "long term evolution (LTE)" regarding radio areas and "system architecture evolution (SAE)" regarding the overall system configuration including a core network (merely referred to as network as well) as communication systems independent of W-CDMA. In the LTE, an access scheme, radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC: also referred to as access gateway (aGW)), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of UEs. This is also referred to as point to multipoint service.

Non-Patent Document 1 describes the current decisions by 3GPP regarding an overall architecture in the LTE system. The overall architecture (Chapter 4 of Non-Patent Document 1) is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol (for example, radio resource management (RRC)) and a user plane (for example, packet data convergence protocol (PDCP), radio link control (RLC), medium access control (MAC), and physical layer (PHY)) for a UE 101 are terminated in the base station 102. The base stations 102 perform scheduling and transmission of paging signaling (also referred to as paging messages) notified from a mobility management entity (MME) 103. The base stations 102 are connected to each other by means of an X2 interface. In addition, the base stations 102 are connected to an evolved packet core (EPC) by means of an S1 interface, more specifically, connected to the mobility management entity (MME) 103 by means of an S1_MME interface and connected to a serving gateway (S-GW) 104 by means of an S1_U interface. The MME 103 distributes the paging signaling to multiple or a single base station 102. In addition, the MME 103 performs mobility control of an idle state. When the UE is in the idle state and an active state, the MME 103 manages a list of tracking areas. The S-GW 104 transmits/receives user data to/from one or a plurality of base stations 102. The S-GW 104 serves as a local mobility anchor point in handover between base stations. Moreover, there is provided a PDN gateway (P-GW), which performs per-user packet filtering and UE-ID address allocation.

The control protocol RRC between the UE 101 and the base station 102 performs broadcast, paging, RRC connection management and the like.

The states of the base station and the UE in RRC are classified into RRC_Idle and RRC_CONNECTED.

In RRC_IDLE, public land mobile network (PLMN) selection, system information (SI) broadcast, paging, cell re-selection, mobility and the like are performed.

In RRC_CONNECTED, the UE has RRC connection, is capable of transmitting/receiving data to/from a network, and performs, for example, handover (HO) and measurement of a neighbor cell.

The current decisions by 3GPP regarding the frame configuration in the LTE system are described in Non-Patent Document 1 (Chapter 5), which are described with reference to FIG. 2. FIG. 2 is a diagram illustrating the configuration of a radio frame used in the LTE communication system. With reference to FIG. 2, one radio frame is 10 ms. The radio frame is divided into ten equally sized sub-frames. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS). Multiplexing of channels for multimedia broadcast multicast service single frequency network (MBSFN) and for non-MBSFN is performed on a per-subframe basis. Hereinafter, a subframe for MBSFN transmission is referred to as an MBSFN sub-frame. Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. An MBSFN frame cluster is scheduled. A repetition period of the MBSFN frame cluster is allocated.

Non-Patent Document 1 describes the current decisions by 3GPP regarding the channel configuration in the LTE system. It is assumed that the same channel configuration is used in a closed subscriber group (CSG) cell as that of a non-CSG cell. A physical channel (Chapter 5 of Non-Patent Document 1) is described with reference to FIG. 4. FIG. 4 is a diagram illustrating physical channels used in the LTE communication system. With reference to FIG. 4, a physical broadcast channel 401 (PBCH) is a downlink channel transmitted from the base station 102 to the UE 101. A BCH transport block is mapped to four subframes within a 40 ms interval. There is no explicit signaling indicating 40 ms timing. A physical control format indicator channel 402 (PCFICH) is transmitted from the base station 102 to the UE 101. The PCFICH notifies the number of OFDM symbols used for PDCCHs from the base station 102 to the UE 101. The PCFICH is transmitted in each subframe. A physical downlink control channel 403 (PDCCH) is a downlink channel transmitted from the base station 102 to the UE 101. The PDCCH notifies the resource allocation, HARQ information related to DL-SCH (downlink shared channel that is one of the transport channels shown in FIG. 5) and the PCH (paging channel that is one of the transport channels shown in FIG. 5). The PDCCH carries an uplink scheduling grant. The PDCCH carries ACK/Nack that is a response signal to uplink transmission. The PDCCH is referred to as an L1/L2 control signal as well. A physical downlink shared channel 404 (PDSCH) is a downlink channel transmitted from the base station 102 to the UE 101. A DL-SCH (downlink shared channel) that is a transport channel and a PCH that is a transport channel are mapped to the PDSCH. A physical multicast channel 405 (PMCH) is a downlink channel transmitted from the base station 102 to the UE 101. A multicast channel (MCH) that is a transport channel is mapped to the PMCH.

A physical uplink control channel 406 (PUCCH) is an uplink channel transmitted from the UE 101 to the base station 102. The PUCCH carries ACK/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel 407 (PUSCH) is an uplink channel transmitted from the UE 101 to the base station 102. A UL-SCH (uplink shared channel that is one of the transport channels shown in FIG. 5) is mapped to the PUSCH. A physical hybrid ARQ indicator channel 408 (PHICH) is a downlink channel transmitted from the base station 102 to the UE 101. The PHICH carries ACK/Nack that is a response to uplink transmission. A physical random access channel 409 (PRACH) is an uplink channel transmitted from the UE 101 to the base station 102. The PRACH carries a random access preamble.

A downlink reference signal which is a known symbol in a mobile communication system is inserted in the first, third and last OFDM symbols of each slot. The physical layer measurement objects of a UE include, for example, reference symbol received power (RSRP).

The transport channel (Chapter 5 of Non-Patent Document 1) is described with reference to FIG. 5. FIG. 5 is a diagram illustrating transport channels used in the LTE communication system. FIG. 5A shows mapping between a downlink transport channel and a downlink physical channel. FIG. 5B shows mapping between an uplink transport channel and an uplink physical channel. A broadcast channel (BCH) is broadcast to the entire base station (cell) regarding the downlink transport channel. The BCH is mapped to the physical broadcast channel (PBCH). Retransmission control according to a hybrid ARQ (HARQ) is applied to a downlink shared channel (DL-SCH). Broadcast to the entire base station (cell) is enabled. The DL-SCH supports dynamic or semi-static resource allocation. The semi-static resource allocation is also referred to as persistent scheduling. The DL-SCH supports discontinuous reception (DRX) of a UE for enabling the UE to save power. The DL-SCH is mapped to the physical downlink shared channel (PDSCH). The paging channel (PCH) supports DRX of the UE for enabling the UE to save power. Broadcast to the entire base station (cell) is required. The PCH is mapped to physical resources such as the physical downlink shared channel (PDSCH) that can be used dynamically for traffic or physical resources such as the physical downlink control channel (PDCCH) of the other control channel. The multicast channel (MCH) is used for broadcast to the entire base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH). A random access channel (RACH) shown in FIG. 5B is limited to control information. There is a collision risk. The RACH is mapped to the physical random access channel (PRACH). The HARQ is described.

The HARQ is the technique for improving the communication quality of a channel by combination of automatic repeat request and forward error correction. The HARQ has an advantage that error correction functions effectively by retransmission even for a channel whose communication quality changes. In particular, it is also possible to achieve further quality improvement in retransmission through combination of the reception results of the first transmission and the reception results of the retransmission. An example of the retransmission method is described. In a case where the receiver fails to successfully decode the received data (in a case where a cyclic redundancy check (CRC) error occurs (CRC=NG)), the receiver transmits "Nack" to the transmitter. The transmitter that has received "Nack" retransmits the data. In a case where the receiver successfully decodes the received data (in a case where a CRC error does not occur (CRC=OK)), the receiver transmits "AcK" to the transmitter. The transmitter that has received "Ack" transmits the next data. Examples of the HARQ system include "chase combining". In chase combining, the same data sequence is transmitted in the first transmission and retransmission, which is the system for improving gains by combining the data sequence of the first transmission and the data sequence of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel (Chapter 6 of Non-Patent Document 1) is described with reference to FIG. 6. FIG. 6 is a diagram illustrating logical channels used in an LTE communication system. FIG. 6A shows mapping between a downlink logical channel and a downlink transport channel. FIG. 6B shows mapping between an uplink logical channel and an uplink transport channel. A broadcast control channel (BCCH) is a downlink channel for broadcast system control information. The BCCH that is a logical channel is mapped to the broadcast channel (BCH) or downlink shared channel (DL-SCH) that is a transport channel. A paging control channel (PCCH) is a downlink channel for transmitting paging signals. The PCCH is used when the network does not know the cell location of a UE. The PCCH that is a logical channel is mapped to the paging channel (PCH) that is a transport channel. A common control channel (CCCH) is a channel for transmission control information between UEs and a base station. The CCCH is used in a case where the UEs have no RRC connection with the network. In downlink, the CCCH is mapped to the downlink shared channel (DL-SCH) that is a transport channel. In uplink, the CCCH is mapped to the UL-SCH that is a transport channel.

A multicast control channel (MCCH) is a downlink channel for point-to-multipoint transmission. The MCCH is a channel used for transmission of MBMS control information for one or several MTCHs from a network to a UE. The MCCH is a channel used only by a UE during reception of the MBMS. The MCCH is mapped to the downlink shared channel (DL-SCH) or multicast channel (MCH) that is a transport channel. A dedicated control channel (DCCH) is a channel that transmits dedicated control information between a UE and a network. The DCCH is mapped to the uplink shared channel (UL-SCH) in uplink and mapped to the downlink shared channel (DL-SCH) in downlink. A dedicate traffic channel (DTCH) is a point-to-point communication channel for transmission of user information to a dedicated UE. The DTCH exists in uplink as well as downlink. The DTCH is mapped to the uplink shared channel (UL-SCH) in uplink and mapped to the downlink shared channel (DL-SCH) in downlink. A multicast traffic channel (MTCH) is a downlink channel for traffic data transmission from a network to a UE. The MTCH is a channel used only by a UE during reception of the MBMS. The MTCH is mapped to the downlink shared channel (DL-SCH) or multicast channel (MCH).

GCI represents a global cell identity. A closed subscriber group (CSG) cell is introduced in the LTE and universal mobile telecommunication system (UMTS). The CSG is described below (Chapter 3.1 of Non-Patent Document 4). The closed subscriber group (CSG) is a cell in which subscribers who are permitted to use are identified by an operator (cell for identified subscribers). The identified subscribers are permitted to access one or more E-UTRAN cells of a public land mobile network (PLMN). One or more E-UTRAN cells in which the identified subscribers are permitted to access are referred to as "CSG cell(s)". Note that access is limited in the PLMN. The CSG cell is part of the PLMN that broadcasts a specific CSG identity (CSG ID, CSG-ID). The authorized members of the subscriber group who have registered in advance access the CSG cells using the CSG-ID that is the access permission information. The CSG-ID is broadcast by the CSG cell or cells. A plurality of CSG-IDs exist in a mobile communication system. The CSG-IDs are used by UEs for making access from CSG-related members easier. 3GPP discusses in a meeting that the information to be broadcast by the CSG cell or cells is changed from the CSG-ID to a tracking area code (TAC). The locations of UEs are traced based on an area composed of one or more cells. The locations are traced for enabling tracing of the locations of UEs and calling (calling of UEs) even in an idle state. An area for tracing locations of UEs is referred to as a tracking area. A CSG whitelist is a list stored in the USIM containing all the CSG IDs of the CSG cells to which the subscribers belong. The whitelist of the UE is provided by a higher layer. By means of this, the base station of the CSG cell allocates radio resources to the UEs.

A "suitable cell" is described below (Chapter 4. 3 of Non-Patent Document 4). The "suitable cell" is a cell on which a UE camps to obtain normal service. Such a cell shall fulfill the following: (1) the cell is part of the selected PLMN or the registered PLMN, or part of the PLMN of an "equivalent PLMN list"; and (2) according to the latest information provided by a non-access stratum (NAS), the cell shall further fulfill the following conditions: (a) the cell is not a barred cell; (b) the cell is part of at least one tracking area (TA), not part of "forbidden LAs for roaming", where the cell needs to fulfill (1) above; (c) the cell shall fulfill the cell selection criteria; and (d) for a cell identified as CSG cell by system information (SI), the CSG-ID is part of a "CSG whitelist" of the UE (contained in the CSG whitelist of the UE).

An "acceptable cell" is described below (Chapter 4.3 of Non-Patent Document 4). This is the cell on which a UE camps to obtain limited service (emergency calls). Such a cell shall fulfill all the following requirements. That is, the minimum required set for initiating an emergency call in an E-UTRAN network are as follows: (1) the cell is not a barred cell; and (2) the cell fulfills the cell selection criteria.

Camping on a cell represents the state where a UE has completed the cell selection/reselection process and the UE has chosen a cell for monitoring the system information and paging information.

3GPP is studying base stations referred to as Home-NodeB (Home-NB, HNB) and Home-eNodeB (Home-eNB, HeNB). HNB/HeNB is a base station for, for example, household, corporation or commercial access service in UTRAN/E-UTRAN. Non-Patent Document 6 discloses three different modes of the access to the HeNB and HNB. Those are an open access mode, a closed access mode and a hybrid access mode. The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, the HeNB and HNB are CSG cells where non-CSG members are allowed access at the same time. In other words, a cell in the hybrid access mode is the cell that supports both the open access mode and the closed access mode.

PRIOR ART DOCUMENTS

Non-Patent Documents

Non-Patent Document 1: 3GPP TS36.300 V8.6.0 Chapter 4, 5 and 6
Non-Patent Document 2: 3GPP R1-072963
Non-Patent Document 3: TR R3.020 V0.6.0
Non-Patent Document 4: 3GPP TS36.304 V8.4.0 Chapter 3.1, Chapter 4.3, Chapter 5.2.4.2, Chapter 5.2.4.3, Chapter 5.2.4.6, Chapter 7.1 and Chapter 7.2
Non-Patent Document 5: 3GPP R2-082899
Non-Patent Document 6: 3GPP S1-083461
Non-Patent Document 7: TR 36.814 V1.0.0 Chapter 5
Non-Patent Document 8: 3GPP R1-090860
Non-Patent Document 9: 3GPP TS36.331 V8.5.0 Chapter 6.2.2 and Chapter 6.3.2
Non-Patent Document 10: 3GPP R2-093104
Non-Patent Document 11: 3GPP R2-092180
Non-Patent Document 12: 3GPP R2-093204
Non-Patent Document 13: TS36.321 V8.5.0
Non-Patent Document 14: R2-100812
Non-Patent Document 15: TS36.331 V9.1.0
Non-Patent Document 16: TR36.912 V9.1.0
Non-Patent Document 17: R2-101423
Non-Patent Document 18: R2-100531

SUMMARY OF INVENTION

Problem to be Solved by the Invention

In the long term evolution advanced (LTE-A) system, it is considered that a frequency bandwidth larger than the frequency bandwidth of the LTE system is supported. This is for improving a communication speed. Currently, 3GPP is discussing that the frequency bandwidth of the LTE-A system is equal to or smaller than 100 MHz.

Frequency usage situation varies from area to area. Therefore, it is conceivable that there is an area in which 100 MHz cannot be secured continuously for the frequency bandwidth. In addition, a compatible operation of an LTE-compliant UE is taken into account in the LTE-A system. Along with this, currently, 3GPP considers division of the frequency band (carrier) in units referred to as component carriers. 3GPP now aims to make an LTE-compliant UE to be operable on the component carrier. Further, it is intended to achieve an improvement in communication speed as an LTE-A system with the use of the aggregated carriers created by aggregating component carriers.

An object of the present invention is to provide a mobile communication system capable of efficiently controlling communication while achieving an improvement in communication speed correspondingly to aggregated carriers.

Means to Solve the Problem

The present invention relates to a mobile communication system in which, with the separate use of a plurality of component carriers or with the use of aggregated carriers including the plurality of component carriers aggregated, a base station performs radio communication with a user equipment corresponding to the component carrier or a user equipment corresponding to the aggregated carriers, wherein in a case where the base station performs radio communication with the user equipment corresponding to the aggregated carriers with the use of the aggregated carriers, each of a plurality of transport blocks created by dividing a transport channel is transmitted per each of the plurality of component carriers constituting the aggregated carriers, and control information related to radio communication between the base station and the user equipment corresponding to the aggregated carriers is transmitted so that physical information of the corresponding component carrier is identifiable.

Effects of the Invention

According to the present invention, the control information related to radio communication between the base station and the user equipment corresponding to the aggregated carriers is transmitted so that physical information of the corresponding component carrier is identifiable, whereby it is possible to perform efficient communication control.

BRIEF DESCRIPTION OF DRAWINGS

FIG. 5 is a diagram illustrating transport channels used in the LTE communication system.

FIG. 6 is a diagram illustrating logical channels used in the LTE communication system.

FIG. 7 is a block diagram showing the overall configuration of a mobile communication system currently under discussion of 3GPP.

FIG. 8 is a block diagram showing the configuration of a user equipment 311 according to the present invention.

FIG. 9 is a block diagram showing the configuration of a base station 312 according to the present invention.

FIG. 10 is a block diagram showing the configuration of an MME according to the present invention.

FIG. 11 is a block diagram showing the configuration of a HeNBGW according to the present invention.

FIG. 12 is a flowchart showing an outline of cell search performed by a user equipment (UE) in the LTE communication system.

FIG. 13 is a diagram showing a downlink layer 2 structure for carrier aggregation, which is currently under discussion of 3GPP.

FIG. 17 is a diagram illustrating a third specific example of the information indicating the control information corresponding to what component in the third solution according to the first embodiment.

FIG. 26 is a conceptual diagram showing association of component indices and scheduling components, which is performed in a component scheduling block in the second solution according to the third embodiment.

FIG. 28 is a conceptual diagram showing a solution according to a fourth embodiment.

FIG. 29 is a sequence diagram showing the operation of a mobile communication system in the solution according to the fourth embodiment.

EMBODIMENTS FOR CARRYING OUT THE INVENTION

First Embodiment

Figure 1:
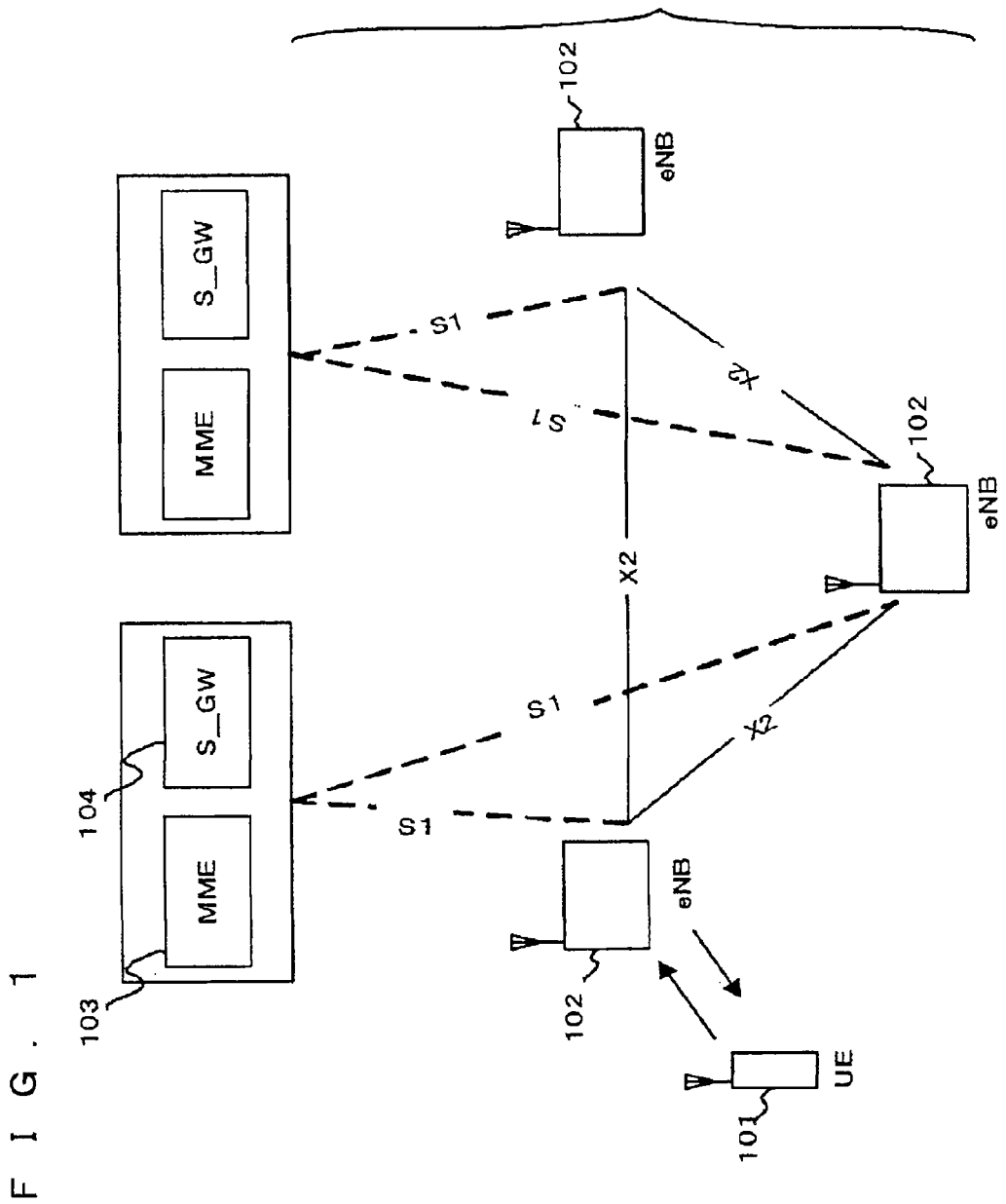
FIG. 1 is a diagram illustrating the configuration of an LTE communication system.
Figure 2:
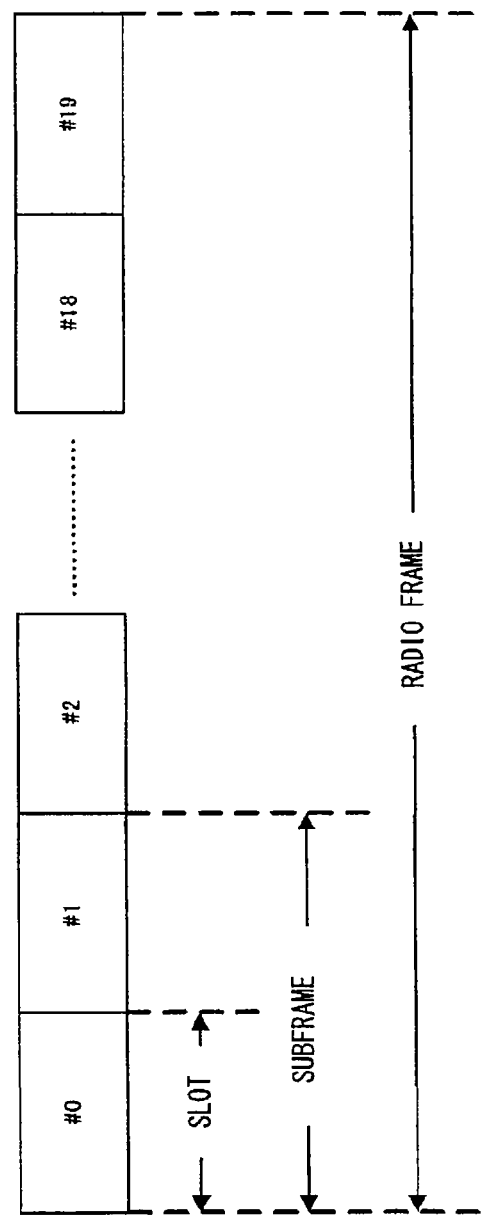
FIG. 2 is a diagram illustrating the configuration of a radio frame used in the LTE communication system.
Figure 3:
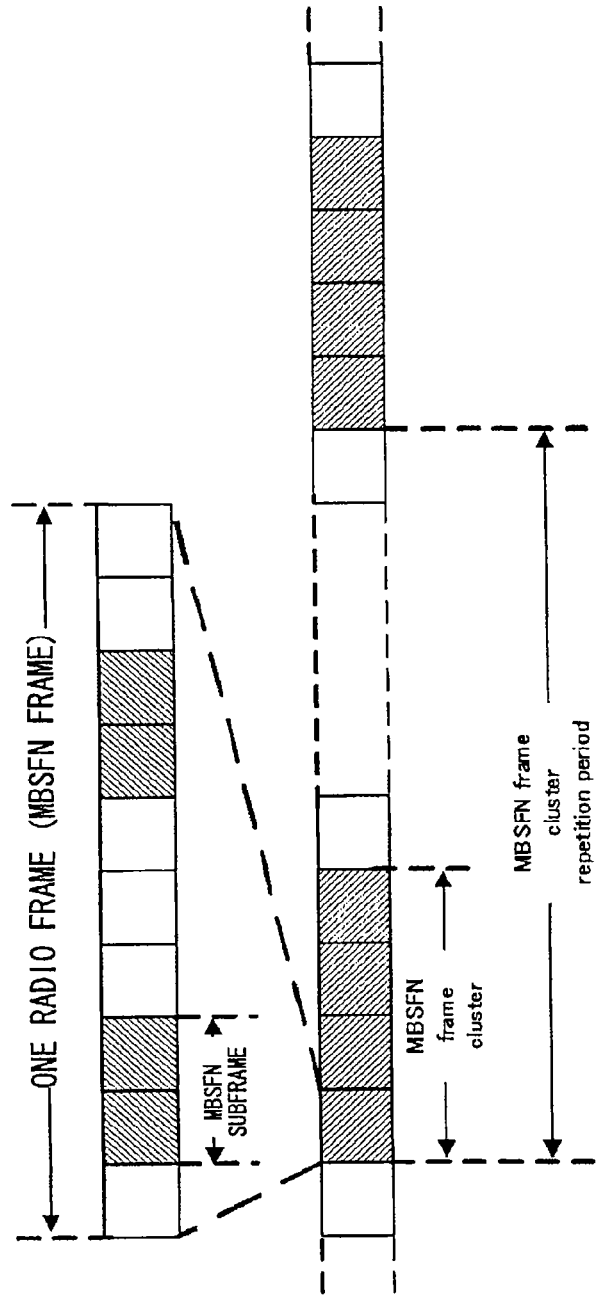
FIG. 3 is a diagram illustrating the configuration of a multimedia broadcast multicast service single frequency network (MBSFN) frame.
Figure 4:
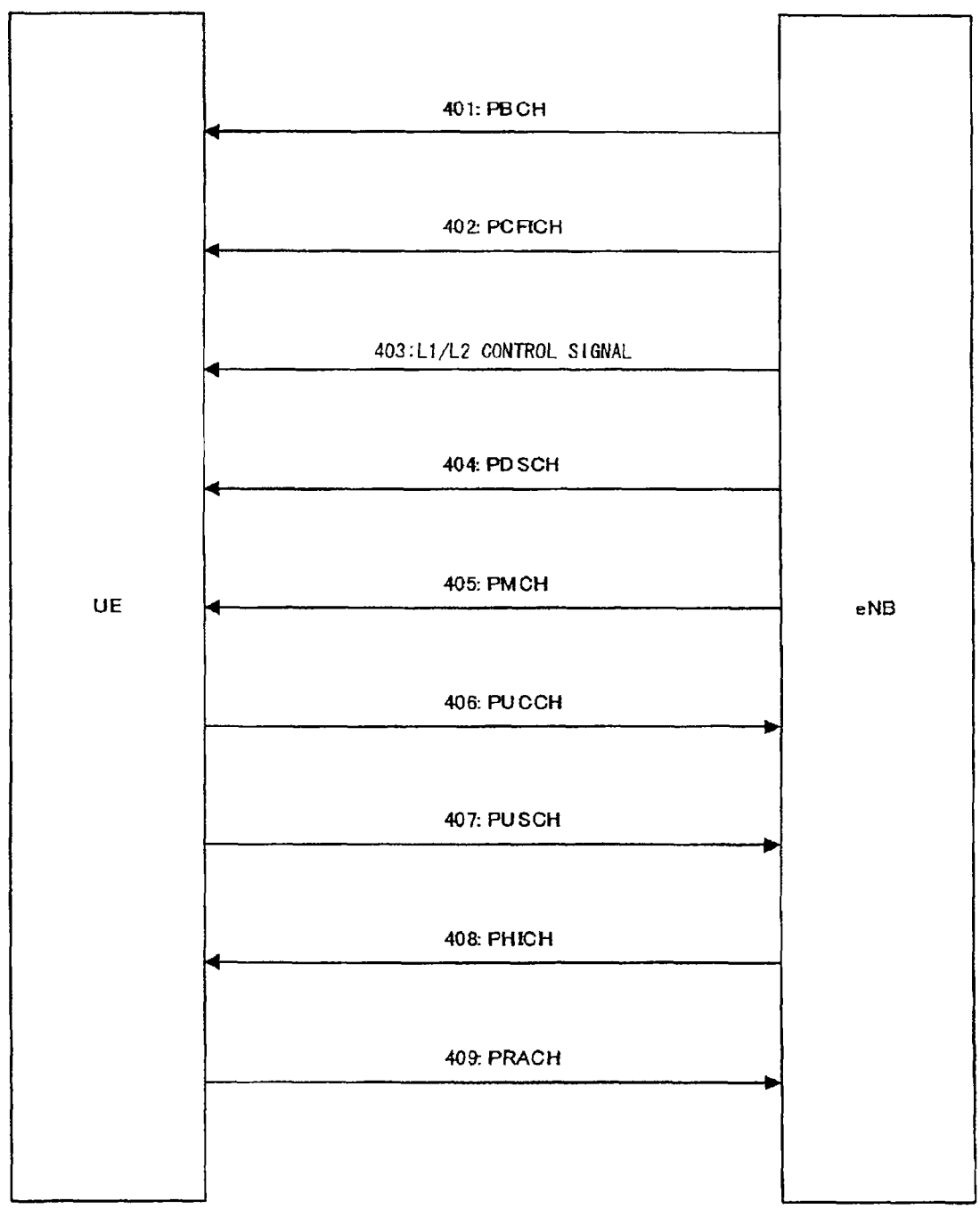
FIG. 4 is a diagram illustrating physical channels used in the LTE communication system.

FIG. 7 is a block diagram showing an overall configuration of an LTE mobile communication system, which is currently under discussion of 3GPP. Currently, 3GPP is studying an overall system configuration including closed subscriber group (CSG) cells (Home-eNodeBs (Home-eNB and HeNB) of e-UTRAN, Home-NB (HNB) of UTRAN) and non-CSG cells (eNodeB (eNB) of e-UTRAN, NodeB (NB) of UTRAN, and BSS of GERAN) and, as to e-UTRAN, is proposing the configurations of (a) and (b) of FIG. 7 (Non-Patent Document 1 and Non-Patent Document 3). FIG. 7A is now described. A user equipment (UE) 71 performs transmission/reception to/from a base station 72. The base stations 72 are classified into an eNB (non-CSG cell) 72-1 and Home-eNBs (CSG cells) 72-2. The eNB 72-1 is connected to MMEs 73 through interfaces S1, and control information is communicated between the eNB and the MMEs. A plurality of MMEs are connected to one eNB. The Home-eNB 72-2 is connected to the MME 73 through the interface S1, and control information is communicated between the Home-eNB and the MME. A plurality of Home-eNBs are connected to one MME.

Next, FIG. 7B is described. The UE 71 performs transmission/reception to/from the base station 72. The base stations 72 are classified into the eNB (non-CSG cell) 72-1 and the Home-eNBs (CSG cells) 72-2. As in FIG. 7A, the eNB 72-1 is connected to the MMEs 73 through the interface S1, and control information is communicated between the eNB and the MMEs. A plurality of MMEs are connected to one eNB. While, the Home-eNBs 72-2 are connected to the MMEs 73 through a Home-eNB Gateway (HeNBGW) 74. The Home-eNBs are connected to the HeGW by means of the interfaces S1, and the HeNBGW 74 is connected to the MMEs 73 through an interface S1_flex. One or a plurality of Home-eNBs 72-2 are connected to one HeNBGW 74, and information is communicated therebetween through S1. The HeNBGW 74 is connected to one or a plurality of MMEs 73, and information is communicated therebetween through S1_flex.

With the configuration of FIG. 7B, one HeNBGW 74 is connected to the Home-eNBs belonging to the same CSG-ID. As a result, in the case where the same information such as registration information is transmitted from the MME 73 to a plurality of Home-eNBs 72-2 belonging to the same CSG-ID, the information is transmitted to the HeNBGW 74 and then transmitted to the plurality of Home-eNBs 72-2, with the result that signaling efficiency is enhanced more compared with the case where the information is directly transmitted to each of the plurality of Home-eNBs 72-2. While, in the case where each Home-eNB 72-2 communicates dedicated information with the MME 73, the information is merely caused to pass through the HeNBGW 74 (to be transparent) without being processed, which allows communication in such a manner that the Home-eNB 72-2 is directly connected to the MME 73.

FIG. 8 is a block diagram showing the configuration of the UE (equipment 71 of FIG. 7) according to the present invention. The transmission process of the UE shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to encoding process such as error correction. There may exist the data output from the transmission data buffer unit 803 directly to a modulating unit 805 without encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to a base station 312. A UE 311 executes the reception process as follows. The antenna 807 receives the radio signal from the base station 312. The received signal is converted from a radio reception frequency to a baseband signal by the frequency converting unit 806 and is then demodulated by a demodulating unit 808. The demodulated data is transmitted to a decoding unit 809 and is subjected to decoding process such as error correction. Among the pieces of decoded data, the control data is transmitted to the protocol processing unit 801, while the user data is transmitted to the application unit 802. A series of process of the UE is controlled by a control unit 810. This means that, though not shown, the control unit 810 is connected to the respective units (801 to 809).

FIG. 9 is a block diagram showing the configuration of the base station (base station 72 of FIG. 7) according to the present invention. The transmission process of the base station shown in FIG. 9 is described. An EPC communication unit 901 performs data transmission/reception between the base station 72 and the EPCs (such as MME 73 and HeNBGW 74). A communication with another base station unit 902 performs data transmission/reception to/from another base station. The EPC communication unit 901 and the communication with another base station unit 902 respectively transmit/receive information to/from the protocol processing unit 903. The control data from the protocol processing unit 903, and the user data and control data from the EPC communication unit 901 and the communication with another base station unit 902 are stored in the transmission data buffer unit 904. The data stored in the transmission data buffer unit 904 is transmitted to an encoding unit 905 and is then subjected to encoding process such as error correction. There may exist the data output from the transmission data buffer unit 904 directly to a modulating unit 906 without encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of UEs 71. While, the reception process of the base station 72 is executed as follows. A radio signal from one or a plurality of UEs 311 is received by the antenna 908. The received signal is converted from a radio reception frequency into a baseband signal by the frequency converting unit 907, and is then demodulated by a demodulating unit 909. The demodulated data is transmitted to a decoding unit 910 and is then subjected to decoding process such as error correction. Among the pieces of decoded data, the control data is transmitted to the protocol processing unit 903, EPC communication unit 901, or communication with another base station unit 902, while the user data is transmitted to the EPC communication unit 901 and communication with another base station unit 902. A series of process by the base station 72 is controlled by a control unit 911. This means that, though not shown, the control unit 911 is connected to the respective units (901 to 910).

FIG. 10 is a block diagram showing the configuration of a mobility management entity (MME) according to the present invention. A PDN GW communication unit 1001 performs data transmission/reception between an MME 73 and a PDN GW. A base station communication unit 1002 performs data transmission/reception between the MME 73 and the base station 72 through the S1 interface. In the case where the data received from the PDN GW is user data, the user data is transmitted from the PDN GW communication unit 1001 to the base station communication unit 1002 through a user plane processing unit 1003 and is then transmitted to one or a plurality of base stations 72. In the case where the data received from the base station 72 is user data, the user data is transmitted from the base station communication unit 1002 to the PDN GW communication unit 1001 through the user plane processing unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005. A HeNBGW communication unit 1004 is provided in the case where the HeNBGW 74 is provided, which performs data transmission/reception by the interface (IF) between the MME 73 and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by the S1 interface through the base station communication unit 1002, and are transmitted to one or a plurality of HeNBGWs 74 through the HeNBGW communication unit 1004.

The control plane control unit 1005 includes a NAS security unit 1005-1, an SAE bearer control unit 1005-2 and an idle state mobility managing unit 1005-3, and performs overall process for the control plane. The NAS security unit 1005-1 provides, for example, security of a non-access stratum (NAS) message. For example, the SAE bearer control unit 1005-2 manages a system architecture evolution (SAE) bearer. For example, the idle state mobility managing unit 1005-3 performs mobility management of an idle state (LTE-IDLE state, which is merely referred to as idle as well), generation and control of paging signaling in an idle state, addition, deletion, update and search of a tracking area (TA) of one or a plurality of UEs 71 being served thereby, and TA list management. The MME begins a paging protocol by transmitting a paging message to the cell belonging to a TA) in which the UE is registered. The idle state mobility managing unit 1005-3 may manage the CSG of the Home-eNBs 72-2 to be connected to the MME, CSG-IDs and a whitelist. In the CSG-ID management, the relationship between a UE corresponding to the CSG-ID and the CSG cell is managed (added, deleted, updated or searched). For example, it may be the relationship between one or a plurality of UEs whose user access registration has been performed with a CSG-ID and the CSG cells belonging to this CSG-ID. In the whitelist management, the relationship between the UE and the CSG-ID is managed (added, deleted, updated or searched). For example, one or a plurality of CSG-IDs with which user registration has been performed by a UE may be stored in the whitelist. Although other part of the MME 73 may perform those types of CSG-related management, through execution by the idle state mobility managing unit 1005-3, the method of using a tracking area code in place of a CSG-ID, which is currently under discussion of 3GPP meeting, can be efficiently performed. A series of process by an MME 313 is controlled by a control unit 1006. This means that, though not shown, the control unit 1006 is connected to the respective units (1001 to 1005).

FIG. 11 is a block diagram showing the configuration of the HeNBGW according to the present invention. An EPC communication unit 1101 performs data transmission/reception between the HeNBGW 74 and the MME 73 by the S1_flex interface. A base station communication unit 1102 performs data transmission/reception between the HeNBGW 74 and the Home-eNB 72-2 by the S1 interface. A location processing unit 1103 performs the process of transmitting, to a plurality of Home-eNBs, the registration information or the like among the data transmitted from the MME 73 through the EPC communication unit 1101. The data processed by the location processing unit 1103 is transmitted to the base station communication unit 1102 and is transmitted to one or a plurality of Home-eNBs 72-2 through the S1 interface. The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of process by the HeNBGW 74 is controlled by a control unit 1104. This means that, though not shown, the control unit 1104 is connected to the respective units (1101 to 1103).

Next, an example of a typical cell search method in a mobile communication system is described. FIG. 12 is a flowchart showing an outline from cell search to idle state operation performed by a user equipment (UE) in the LTE communication system. When the cell search is started by the UE, in Step ST1201, the slot timing and frame timing are synchronized by a primary synchronization signal (P-SS) and a secondary synchronization signal (S-SS) transmitted from a nearby base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (identified). Next, in Step ST1202, a reference signal RS of the synchronized cells, which is transmitted from the base station per cell, is detected and the received power is measured. The code corresponding to the PCI one by one is used for the reference signal RS, and separation from other cell is enabled by correlation using the code. The code for RS of the cell is derived from the PCI identified in ST1201, which makes it possible to detect the RS and measure the RS received power. Next, in ST1203, the cell having the best RS reception quality (for example, cell having the highest RS received power; best cell) is selected from one or more cells that have been detected up to ST1202. In ST1204, next, the PBCH of the best cell is received, and the BCCH that is the broadcast information is obtained. A master information block (MIB) containing the cell configuration information is mapped on the BCCH over the PBCH. Examples of MIB information include the down link (DL) system bandwidth (also referred to as transmission bandwidth configuration (dl-bandwidth)), transmission antenna number and system frame number (SFN).

In 1205, next, the DL-SCH of the cell is received based on the cell configuration information of the MIB, to thereby obtain a system information block (SIB) 1 of the broadcast information BCCH. The SIB1 contains the information related to access to the cell, information related to cell selection and scheduling information of other SIB (SIBk; k is an integer equal to or larger than 2). In addition, the SIB1 contains a tracking area code (TAC). In ST1206, next, the UE compares the TAC received in ST1205 with the TAC that has been already possessed by the UE. In a case where they are identical to each other as a result of comparison, the UE enters an idle state operation in the cell. In a case where they are different from each other as a result of comparison, the UE requires a core network (EPC) (including MME and the like) to change a TA through the cell for performing tracking area update (TAU). The core network updates the TA based on an identification number (such as a UE-ID) of the UE transmitted from the UE together with a TAU request signal. The core network updates the TA, and then transmits the TAU received signal to the UE. The UE rewrites (updates) the TAC (or TAC list) of the UE. After that, the UE enters the idle state operation in the cell.

In the LTE and universal mobile telecommunication system (UMTS), the introduction of a closed subscriber group (CSG) cell is studied. As described above, access is permitted for only one or a plurality of UEs registered with the CSG cell. One or a plurality of UEs registered with the CSG cell constitute one CSG. A specific identification number referred to as CSG-ID is added to the thus constituted CSG. Note that one CSG may contain a plurality of CSG cells. After being registered with any one of the CSG cells, the UE can access the other CSG cells of the CSG to which the registered CSG cell belongs. Alternatively, the Home-eNB in the LTE or the Home-NB in the UMTS is used as the CSG cell in some cases. The UE registered with the CSG cell has a whitelist. Specifically, the whitelist is stored in the SIM/USIM. The CSG information of the CSG cell with which the UE has been registered is listed in the whitelist. Specific examples of CSG information include CSG-ID, tracking area identity (TAI) and TAC. Any one of the CSG-ID and TAC is adequate as long as they are associated with each other. Alternatively, GCI is adequate as long as the CSG-ID, TAC and global cell identity (GCI) are associated with each other. As can be seen from the above, the UE which does not have a whitelist (including a case where the whitelist is empty in the present invention) is not allowed to access the CSG cell but is allowed to access only the non-CSG cell. On the other hand, the UE which has a whitelist is allowed to access the CSG cell of the CSG-ID with which registration has been performed as well as the non-CSG cell.

3GPP discusses that all physical cell identities (PCIs) are split (referred to as PCI-split) into ones reserved for CSG cells and the others reserved for non-CSG cells (Non-Patent Document 5). Further, 3GPP discusses that the PCI split information is broadcast in the system information from the base station to the UEs being served thereby. Disclosed here is the basic operation of a UE by PCI split. The UE that does not have the PCI split information needs to perform cell search using all PCIs (for example, using all 504 codes). On the other hand, the UE that has the PCI split information is capable of performing cell search using the PCI split information.

As disclosed in Non-Patent Document 7 and Non-Patent Document 8, 3GPP is pursuing specifications standard of "long term evolution advanced (LTE-A)" as Release 10.

It is considered in the LTE-A system that frequency bandwidths wider than the frequency bandwidths (transmission bandwidths) of the LTE system are supported.

Therefore, an LTE-A-compliant UE is considered to simultaneously receive one or a plurality of component carriers (CCs).

The LTE-A-support UE is considered to have the capability of carrier aggregation for simultaneous reception and transmission, only reception or only transmission on a plurality of component carriers.

When the structure of the component carrier complies with the current 3GPP (Release 8) specifications, an LTE-compliant UE is capable of reception and transmission only on a single component carrier. The LTE-compliant UE is also referred to as a 3GPP-Release-8-compliant UE. That is, it is considered that an LTE-compliant UE is operable or compatible in the LTE-A system.

Non-Patent Document 8 describes the method of broadcasting the system information in the LTE-A system. In addition, Non-Patent Document 8 discloses a single carrier anchor and a multi carrier anchor in a base station supports to carrier aggregation.

The single carrier anchor is capable of reception and transmission with an LTE-compliant UE. The single carrier anchor notifies the information that points to the carrier of a multicarrier anchor. The single carrier anchor broadcasts the current system information (SI) of 3GPP (Release 8).

On the other hand, the multicarrier anchor is capable of reception and transmission with an LTE-compliant UE. The multicarrier anchor broadcasts the current system information (SI) of 3GPP (Release 8). The multicarrier anchor broadcasts the multicarrier system information.

Non-Patent Document 10 proposes that in a base station (which may be a cell) supports to carrier aggregation, a set of one or a plurality of component carriers, which are capable of data transmission/reception with a UE in RRC_CONNECTED state (merely referred to as RRC_CONNECTED as well), is defined as a candidate component carrier set.

Further, Non-Patent Document 10 proposes that one or a plurality of component carriers on which data transmission/reception is performed practically are defined as scheduling component carriers.

Non-Patent Document 11 discloses that, in supporting carrier aggregation, there is one transport block and one HARQ entity per component that performs data transmission/reception practically, that is, per scheduling component. It is also disclosed that a transport block is mapped to a single component only.

Note that the component is denoted by component carrier or CC in the following.

Figure 14:
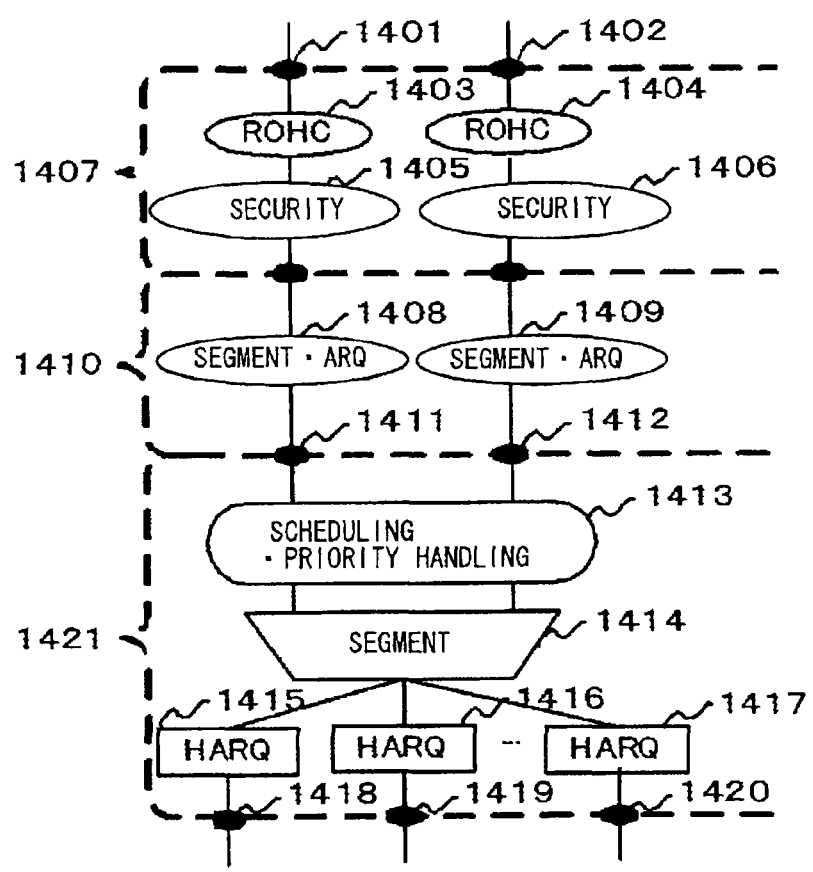
FIG. 14 is a diagram showing an uplink layer 2 structure for carrier aggregation, which is currently under discussion of 3GPP.

Non-Patent Document 12 discloses the layer 2 structure for carrier aggregation. FIG. 13 shows the downlink layer 2 structure disclosed in Non-Patent Document 12, and FIG. 14 shows the uplink layer 2 structure disclosed in Non-Patent Document 12.

In FIG. 13, 1301, 1302, 1303 and 1304 denote radio bearers. 1305, 1306, 1307 and 1308 denote robust header compression (ROCH) entities. ROHC is an algorithm for performing header compression. 1309, 1310, 1311 and 1312 denote security entities. 1313 is referred to as a packet data convergence protocol (PDCP) layer.

1314, 1315, 1316 and 1317 denote entities that perform segment, ARQ and the like. 1318 denotes the entity of the logical channel BCCH. 1319 denotes the entity of the logical channel PCCH. 1320 is referred to as an RLC layer.

1321, 1322, 1323 and 1324 denote logical channels.

1325 denotes the entity that performs scheduling and priority handling. 1326 and 1327 denote the entities that perform segment on a component basis per UE. 1328, 1329, 1330, 1331, 1332 and 1333 denote HARQ entities. 1334, 1335, 1336, 1337, 1338, 1339, 1340 and 1341 denote transport channels. 1342 is referred to as a MAC layer.

In FIG. 14, 1401 and 1402 denote radio bearers. 1403 and 1404 denote ROHC entities. 1405 and 1406 denote security entities. 1407 is referred to as a PDCP layer.

1408 and 1409 denote entities that perform segment, ARQ and the like. 1410 is referred to as an RLC layer.

1411 and 1412 denote logical channels.

1413 denotes the entity that performs scheduling and priority handling. 1414 denotes the entity that performs segment on a component basis. 1415, 1416 and 1417 denote HARQ entities. 1418, 1419 and 1420 denote transport channels. 1421 is referred to as a MAC layer.

A problem to be solved by the first embodiment is described.

In a case where each transport block is mapped to a single component only, the following problem occurs.

The control information, as a specific example, RRC message is segmented in the RLC layer, and then is mapped to the logical channel, for example, DCCH or CCCH. In the MAC layer, a plurality of logical channels DCCH or CCCH are multiplexed and are mapped to the transport channel DL-SCH. When being mapped to the transport channel DL-SCH, the plurality of logical channels DCCH or CCCH are segmented into one or a plurality of transport blocks (corresponding to MAC protocol data units (PDU)). Mapping of each transport block to one component results in that the control information for a component, for example, RRC message is mapped to a plurality of components to be transmitted/received.

As an example, the process of a receiver is described with a downlink RRC message.

A UE receives the physical channel PDSCH on one component, and obtains one transport block on the transport channel DL-SCH as a result of demodulation and decoding. Suppose a case where segment into a plurality of transport blocks in mapping to the transport channel by a transmitter, that is, base station. A UE processes the data segmented into transport blocks mapped on one or a plurality of components, to thereby obtain one transport channel. That is, there is no one-to-one correspondence between the RRC message and component used for transmission/reception.

Therefore, it is unclear that the RRC message notified by means of the DCCH or CCCH mapped to the transport channel is the control information corresponding to what component, which causes a problem that the control using the RRC message cannot be performed in the base station supports to carrier aggregation as a mobile communication system.

Further, the following problem occurs in a case where each transport channel is mapped to a single component only.

The control information, as a specific example, RRC message is segmented in the RLC layer, and then is mapped to the logical channel, for example, DCCH or CCCH. In the MAC layer, a plurality of logical channels DCCH or CCCH are multiplexed and are mapped to one or a plurality of transport channels DL-SCH. In a case where each transport channel is mapped to one component, the RRC message being the control information for a component may be mapped to a plurality of components, or the RRC message being the control information for a component, for example, component A may be transmitted by a component other than this component, for example, component A.

As an example, the process of a receiver is described with a downlink RRC message.

A UE receives the physical channel PDSCH on one component, and obtains one transport channel DL-SCH as a result of demodulation and decoding, to thereby obtain the RRC message notified by means of the DCCH or CCCH mapped to this transport channel. However, there is no one-to-one correspondence between the RRC message and component used for transmission/reception.

This causes a problem that the received RRC message is the control information corresponding to what component is unclear.

The above-mentioned problem is specific to a mobile communication system in which a frequency bandwidth is segmented in certain units, for example, is segmented into so-called components in the case of LTE-A system, and those are aggregated to be used.

The solutions in the first embodiment are described below.

The first solution is described below.

In a base station supports to carrier aggregation, the control information, as a specific example, the contents of the RRC message are made common to all components. This enables judgment as to whether the RRC message received by a receiver is the control information corresponding to what component even if there is no one-to-one correspondence between the RRC message and the component used for transmission/reception. Accordingly, there can be achieved an effect that the control using the RRC message is enabled in a carrier aggregation mobile communication system.

The second solution is described below.

It is considered that the RRC message contains the control information that is efficient in component units without being common to all components.

Description is given by taking the RRC message in the LTE system as a specific example (Chapter 6.3.2 of Non-Patent Document 9).

The configuration information related to radio resources of the RRC message, as a specific example, "Radio resource Configuration" is considered to be efficient when being controlled per component. This is because the number of UEs performing transmission/reception in respective components may vary, and accordingly the load status is not common to the respective components.

Further, as a specific example, it is considered to be efficient that the configuration information corresponding to a physical layer included in "Radio resource Configuration", as a specific example, "Physical config Dedicated", the configuration information related to the PDSCH included in "Physical config Dedicated" included in "Radio resource Configuration", as a specific example, "pdsch-configdedicated", or the transmission power information of a reference signal included in "pdsch-configdedicated" included in "Physical config Dedicated" included in "Radio resource Configuration", as a specific example, "reference Signal-Power" is controlled per component. This is because the carrier frequency varies among the respective components, and thus the radio propagation characteristics are considered to vary. Accordingly, in order to, for example, control the coverage areas within a substantially identical range in the respective components, it is considered that the transmission power of a reference signal in the respective components needs to be dedicatedly controlled.

Further, it is considered to be efficient that the configuration information related to radio link failure of an RRC message, as a specific example, "Radio link failure related action" or the configuration information related to measurement, as a specific example, "Measurement" is controlled per component. This is because the radio propagation characteristics vary due to a difference of the carrier frequency among the respective components, and thus dedicated control is considered to be efficient.

Accordingly, in a case of using the first solution, the control by an RRC message cannot be performed in component units. This causes a problem that control cannot be performed in accordance with a component load or control cannot be performed in accordance with the radio characteristics of carrier frequency of a component.

In the second solution for solving the above-mentioned problem, in a base station supports to carrier aggregation, one component transmits/receives the control information, as a specific example, one RRC message, or one component transmits/receives a plurality of RRC messages. That is, an RRC message is prevented from being segmented by a plurality of components to be transmitted/received.

Further, the logical channels to which an RRC message is mapped, for example, the DCCH or CCCH is mapped to one transport channel, for example, DL-SCH. That is, the logical channel to which an RRC message is mapped, for example, the DCCH or CCCH is not segmented into a plurality of transport channels, for example, DL-SCHs.

Further, the logical channel to which an RRC message is mapped, for example, the DCCH or CCCH is mapped on one transport block. That is, the RRC message is not segmented into a plurality of transport blocks but is mapped to one transport channel, for example, DL-SCH.

Further, an RRC message transmitted by a transmitter is mapped to the component controlled by the RRC message.

Further, the RRC message received by a receiver is the control information related to the component on which the RRC message has been received.

This enables a receiver to associate the component used for transmission/reception with the RRC message, specifically, identify the physical information (such as frequency) of the component associated with an RRC message. Therefore, it is possible to achieve an effect that communication control using an RRC message can be achieved efficiently in a carrier aggregation mobile communication system.

Moreover, the second solution allows the transmission/reception of the component-unit RRC message. This achieves effects that control can be performed in accordance with the component load and that control can be performed in accordance with the radio characteristics of carrier frequency of a component.

The third solution is described below.

An amount of information that can be transmitted/received by one transport block varies depending on a radio environment. That is, an amount of information that can be transmitted/received by one transport block is large in a case of a good radio environment between a base station and a UE, whereas an amount of information that can be transmitted/received by one transport block is small in a case of a poor radio environment.

Therefore, a case where the RRC message is transmitted/received by one transport block irrespective of a radio environment with the second solution causes a problem that the amount of information of an RRC message needs to be limited to the least amount of information that can be transmitted/received by one transport block.

The use of the second solution causes a problem that a mobile communication system becomes more complicated, for example, the control information transmitted/received with one RRC message in a current mobile communication system needs to be transmitted/received by a plurality of RRC messages.

In the third solution for solving the above-mentioned problem, in a base station supports to carrier aggregation, the information indicating that the RRC message is the control information corresponding to what component is added to the RRC message or as an element of the RRC message. In other words, the information for identifying the physical information of a corresponding component carrier is added.

Alternatively, another field different from that for RRC message is provided in a base station supports to carrier aggregation, and the information indicating that the RRC message is the control information corresponding to what component is added to the another area. Another area may be added to or multiplexed in the RLC layer, or may be added to or multiplexed in the MAC layer. Specific examples of another area include a header and a footer. Specific examples of the header include a header (RLC header) added to RLC SDU, a header (MAC header) added to MAC SDU and a header (MAC header) added to the MAC control area (MAC control element). Specific examples of the footer include a MAC control area.

This enables the receiver to associate the component used for transmission/reception with an RRC message, specifically, identify the physical information of a component associated with the RRC message. Accordingly, it is possible to achieve an effect that communication control with an RRC message can be efficiently performed in a carrier aggregation mobile communication system.

Further, it is possible to transmit/receive a component-unit RRC message. This results in effects that control can be performed in accordance with a component load and that control can be performed in accordance with the radio characteristics of carrier frequency of a component.

Moreover, it is not required to limit the amount of information of an RRC message, and an effect that a mobile communication system is prevented from becoming complicated can be achieved.

Specific examples of the information indicating the control information corresponding to what component are described below.

Figure 15:
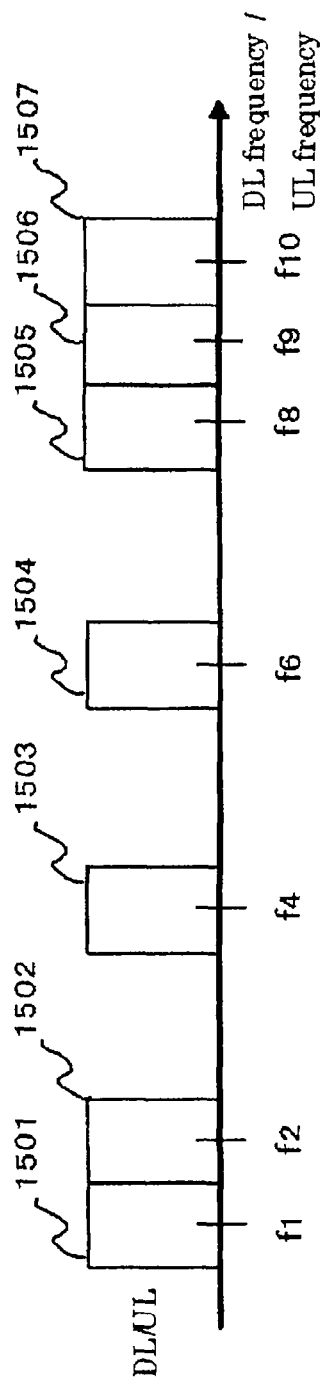
FIG. 15 is a diagram illustrating a first specific example of the information indicating the control information corresponding to what component in a third solution according to a first embodiment.

The first specific example is carrier frequency of a component. Description is given with reference to FIG. 15. 1501 to 1507 denote components capable of carrier aggregation in the base station. f1 to f10 denote carrier frequencies of components of the respective components. In the first specific example, the carrier frequency of a component shown in FIG. 15 is used as the information indicating the control information corresponding to what component. As a specific example, in a case of the control information corresponding to the component 1504 of FIG. 15, the information of the carrier frequency of a component f6 is added as the element in the RRC message. This specific example is advantageous in that a carrier frequency change of a mobile communication system can be responded in a flexible manner because values which are absolute are mapped.

The horizontal axis represents frequency in FIG. 15. The DL frequency is different from the UL frequency in FDD but, for simplification, the DL frequency and the UL frequency are shown on the same axis. Similarly, for simplification, downlink components (downlink CCs, DL CCs) are treated identically to uplink components (uplink CCs, UL CCs) respectively corresponding to (forming a pair of bands with) DL CCs, which are denoted by 1501 to 1507 in the diagram. Not only limited thereto, the arrangement order on the frequency axis may vary between the downlink CC and uplink CC corresponding thereto.

In this specification, downlink CC and uplink CC corresponding thereto (forming a pair of bands) together are referred to as CC unless otherwise noted.

Figure 16:
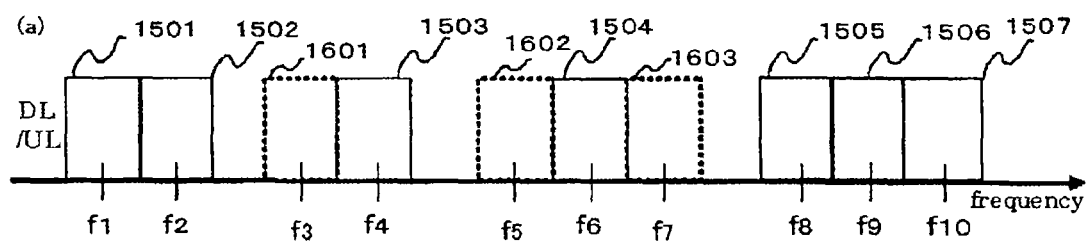
FIG. 16 is a diagram illustrating a second specific example of the information indicating the control information corresponding to what component in the third solution according to the first embodiment.

The second specific example is an identifier of a component. Description is given with reference to FIG. 16. The same reference symbols as those of FIG. 15 denote equivalent portions, and thus description thereof is omitted. 1501 to 1507 and 1601 to 1603 denote components used as a mobile communication system. In the second specific example, identifiers of components shown in FIG. 16B are used as the information indicating the control information corresponding to what component. Carrier frequencies being the physical information of the components (1501 to 1507 and 1601 to 1603) used as a mobile communication system, for example, LTE-A system are associated with identifiers of components (FIG. 16B). As a specific example, in the case of the control information corresponding to the component 1504 of FIG. 16, the information of an identifier of a component "CC #6" is added as the element of an RRC message. The receiver that has received the identifier of a component "CC #6" as the element of an RRC message recognizes that "CC #6" represents the carrier frequency of a component f6 based on the correspondence list of carrier frequencies of components used as a mobile communication system and identifiers of components, which is shown in FIG. 16B. The absolute value is mapped in the first specific example, whereas an identifier is mapped in the second specific example. Therefore, a smaller amount of information added as the element of an RRC message, that is, a smaller information bit number is required in the second specific example. This leads to an effect that radio resources are effectively used.

The correspondence list of carrier frequencies of components used as a mobile communication system and identifiers of components, which is shown in FIG. 16B, is notified from a network to a UE. As a specific example of the notification method, a base station may notify a UE by means of the broadcast information, as a specific example, BCCH (MIB or SIB). As a result of the network notifying the UE of the association, it is possible to achieve an effect that an amount of information added as the element of an RRC message is reduced while maintaining an advantage that a carrier frequency change of a mobile communication system can be responded in a flexible manner.

Alternatively, the correspondence list of carrier frequencies of components used as a mobile communication system and identifiers of components, which is shown in FIG. 16B, may be determined in a static manner as a mobile communication system. This eliminates the need to notify the correspondence list from a network to a UE, whereby it is possible to achieve effects that radio resources are effectively used and that a communication error accompanying radio communication does not occur.

The third specific example is an identifier of a component. Description is given with reference to FIG. 17. The same reference symbols as those of FIG. 15 denote equivalent portions, and thus description thereof is omitted. In the third specific example, identifiers of components shown in FIG. 17B are used as the information indicating the control information corresponding to what component. The carrier frequencies of components used in the base station are associated with the identifiers of components (FIG. 17B). As a specific example, in the case of the control information corresponding to the component 1504 of FIG. 17, the information of an identifier of a component "CC #4" is added as the element of an RRC message. The receiver that has received the identifier of a component "CC #4" as the element of an RRC message recognizes that "CC #4" represents the carrier frequency of a component f6 based on the correspondence list of carrier frequencies of components and identifiers of components, which is shown in FIG. 17B. The absolute value is mapped in the first specific example, and the identifier corresponding to the carrier frequency of a component that can be taken by a mobile communication system is mapped in the second specific example. On the other hand, in the third specific example, an identifier corresponding to carrier frequency of a component that can be taken by the base station is mapped. Therefore, a smaller amount of information added as the element of an RRC message, that is, a smaller information bit number is required in the third specific example. This achieves an effect that radio resources are effectively used.

The correspondence list of carrier frequencies of components and identifiers of components, which is shown in FIG. 17B, is notified from a network to a UE. As a specific example of the notification method, a base station notifies a UE by means of the broadcast information, as a specific example, BCCH (MIB or SIB). As a result of the network notifying the UE of the association information (correspondence list), it is possible to achieve an effect that an amount of information added as the element of an RRC message is reduced while maintaining the advantage that a carrier frequency change of a mobile communication system can be responded in a flexible manner.

Specific examples of numbering of identifiers of components are described below.

Figure 18:
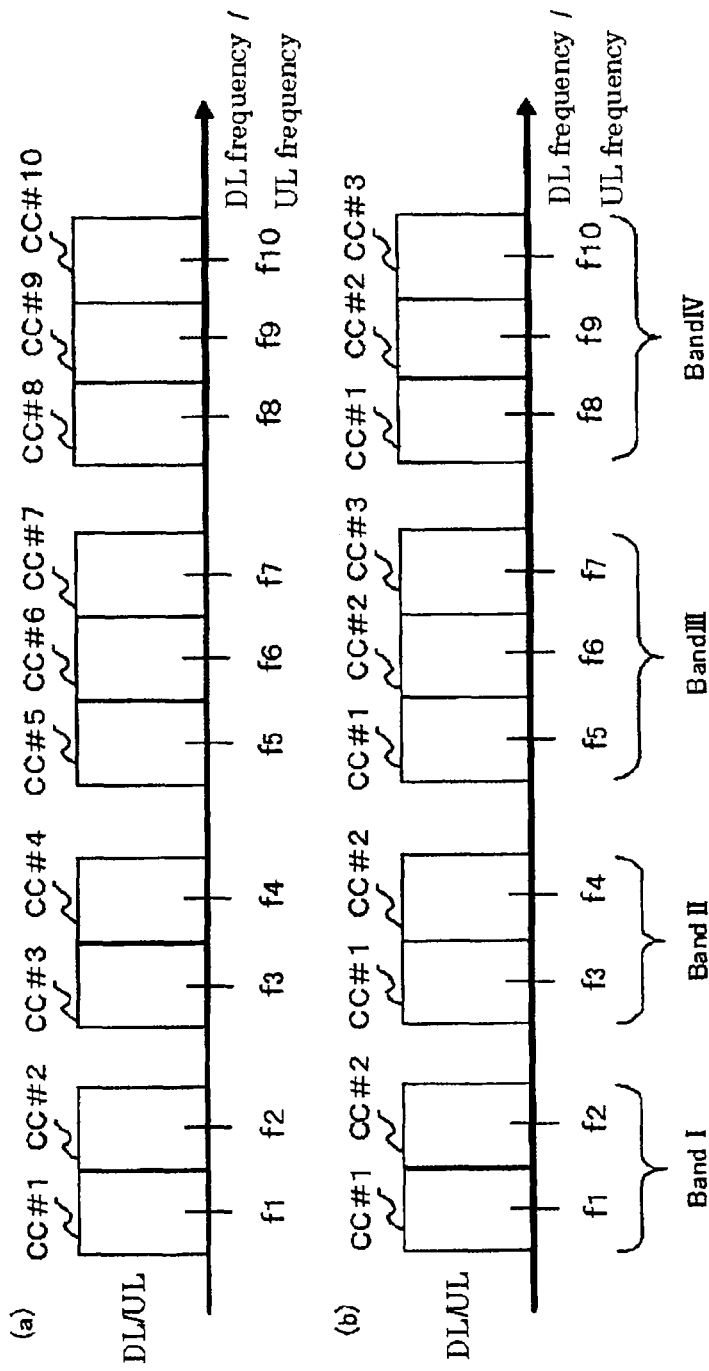
FIG. 18 is a diagram illustrating a specific example of numbering of identifiers of components in the third solution according to the first embodiment.

As the first specific example, components are numbered consecutively as a mobile communication system, as an LTE-A system or as the base station. As a specific example of consecutive numbering, numbering is performed in an ascending order from a low frequency as shown in FIG. 18A or in a descending order from a high frequency.

As the second specific example, components included in a frequency band are numbered consecutively per frequency band as a mobile communication system, as an LTE-A system or as the base station. The frequency band represents a partial set including one or more components with respect to all components, which represents a set of components having common physical characteristics or radio characteristics. In systems such as UTRA, LTE and LTE-A, uplink and downlink are designed so as to enable an operation at frequency bands composed of several consecutive frequencies. Each of those consecutive frequency bands is referred to as a frequency band. As a specific example of consecutive numbering, numbering is performed in an ascending order from a low frequency as shown in FIG. 18B or in a descending order from a high frequency per frequency band. In this case, when the identifiers of components described in the second specific example or third specific example are used as the information indicating the control information corresponding to what component, the frequency band and identifier of a component indicate the control information corresponding to what component.

Figure 19:
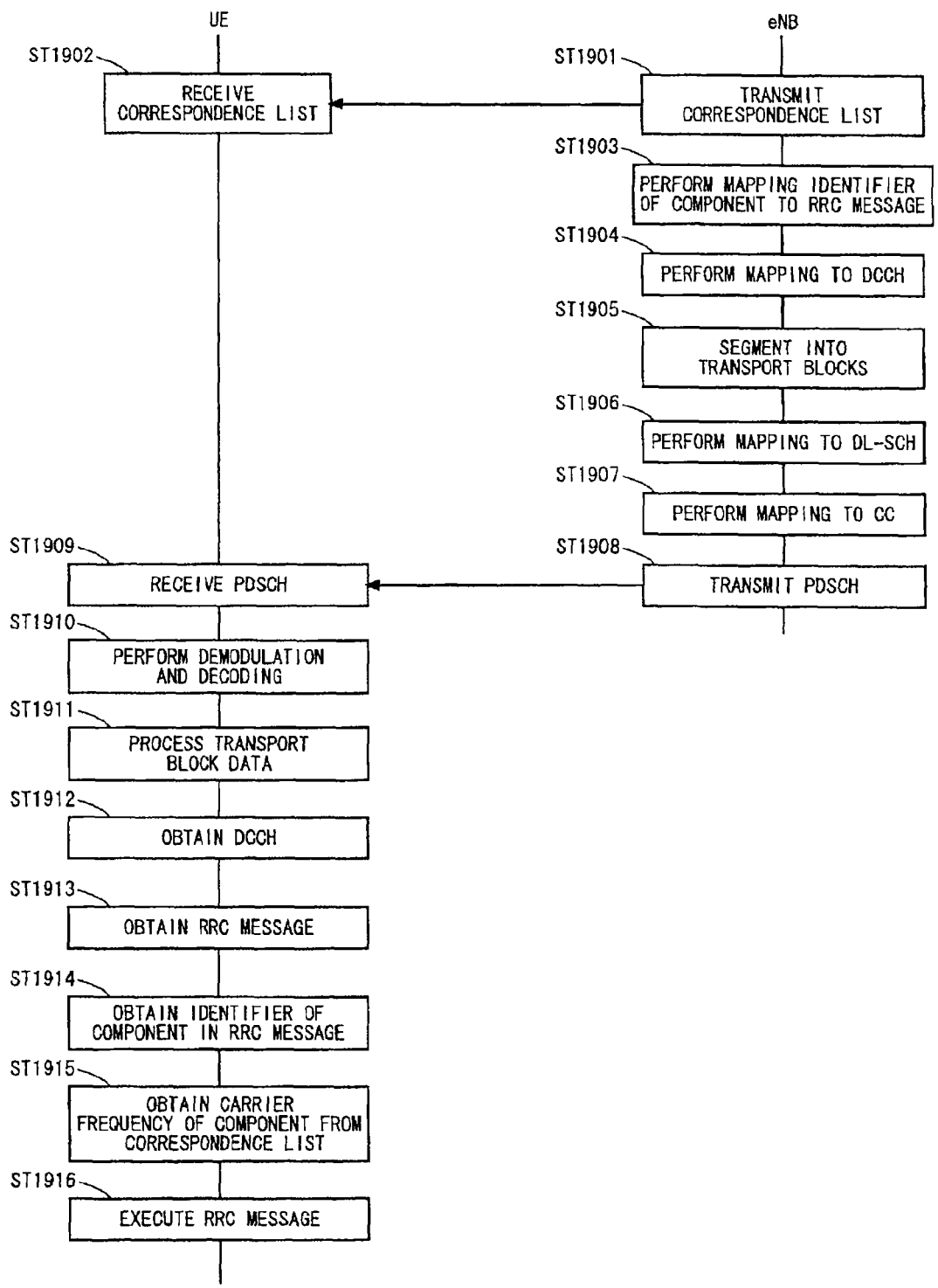
FIG. 19 is a sequence diagram showing the operation of a mobile communication system in the third solution according to the first embodiment.

FIG. 19 shows an example of the operation. Description is given using the third specific example as the information indicating the control information corresponding to what component.

In Step ST1901, a base station broadcasts the correspondence list of carrier frequencies of components used in the base station and identifiers of components, for example, FIG. 17B to UEs being served thereby.

In Step ST1902, the UE receives, from the base station, the correspondence list of carrier frequencies of components used in the base station and identifiers of components.

In Step ST1903, the base station adds the information indicating that the RRC message is the control information corresponding to what component, as the element of an RRC message being the component-unit control information. For example, in a case of the control information corresponding to the component 1504 of FIG. 17A, the base station adds the information of the identifier of a component "CC #4" as the element of an RRC message.

In Step ST1904, the base station segments the RRC message (RLC PDU) and maps those to the logical channel, for example, DCCH.

In Step ST1905, the base station multiplexes one or a plurality of logical channels and segments those into one or a plurality of transport blocks (MAC PDUs).

In Step ST1906, the base station maps the segmented transport blocks (MAC PDUs) to one transport channel DL-SCH or one of a plurality of transport channels DL-SCHs.

In Step ST1907, the base station maps the respective transport blocks to a physical channel PDSCH on one component (also referred to as CC).

In Step ST1908, the base station transmits the PDSCH to the UE.

In Step ST1909, the UE receives the PDSCH on each component.

In Step ST1910, the UE performs demodulation and decoding, to thereby obtain one transport block on the transport channel DL-SCH.

In Step ST1911, the UE processes the data segmented into the transport blocks mapped to the transport channel DL-SCH, and accordingly in Step ST1912, the UE obtains the DCCH.

In Step ST1913, the UE obtains the RRC message mapped on the DCCH.

In Step ST1914, the UE obtains an identifier of a component in the RRC message. For example, the UE obtains the identifier of a component "CC #4" of FIG. 17.

In Step ST1915, the UE obtains the carrier frequency of a component of the component controlled by the RRC message, based on the correspondence list of carrier frequencies of components used by the base station and identifiers of components, which has been received in Step ST1902. For example, the UE obtains the corresponding carrier frequency of a component "f6" based on the identifier of a component "CC #4" obtained in Step ST1914 from FIG. 17B.

In Step ST1916, the UE executes, on the carrier frequency of a component obtained in Step ST1915, the control instructed by the RRC message received in Step ST1913.

Further, in a case where the RRC message contains the component-unit control information and the control information for all components of the UE in a base station supports to carrier aggregation, the following problem occurs.

In a case where the solutions in the first embodiment are applied to the control information for all components, for example, the information indicating all carrier frequencies of components needs to be added as an element of an RRC message. This results in a large-volume information indicating that the RRC message is the control information corresponding to what component, leading to a problem that radio resources cannot be effectively used.

Solutions to this are described below.

In the first solution, in a base station supports to carrier aggregation, the information indicating that the RRC message is the control information for all components is added to the RRC message or as an element of the RRC message, separately from the information indicating that the RRC message is the control information corresponding to what component.

Alternatively, in a base station supports to carrier aggregation, another area is provided separately from that for RRC message, and the information indicating that the RRC message is the control information for all components is added separately from the information indicating that the RRC message is the control information corresponding to what component. A specific example of another area is similar to the above, and thus description thereof is omitted.

This enables to judge whether the RRC message received by the receiver is the control information corresponding to what component, and besides, enables to judge whether the received RRC message is the information corresponding to all components while preventing an increase in amount of information to be added as an element of the RRC message.

In the second solution, in a base station supports to carrier aggregation, only the information indicating that the RRC message is the control information corresponding to what component is added to an RRC message or as an element of the RRC message. In a case where the RRC message is the control information corresponding to all components, the information indicating that the RRC message is the control information corresponding to what component is not added to the RRC message or as an element of the RRC message.

As a result, if the information indicating the control information corresponding to what component is not added to the RRC message received by the receiver, it is possible to judge whether the RRC message is the control information corresponding to all components.

Differently from the first solution, the second solution eliminates the need to newly provide the information indicating that an RRC message is the control information corresponding to all components, whereby an effect that a mobile communication system is prevented from becoming complicated can be achieved. In addition, an effect that radio resources are effectively used can be achieved.

While the first embodiment has mainly described a downlink RRC message, the first embodiment is also applicable to an uplink RRC message.

In addition to the logical channels DCCH and CCCH, the logical channel MCCH and the logical channel BCCH are also mapped to the transport channel DL-SCH by the control information. The first embodiment is similarly applicable to the MCCH and BCCH.

The first embodiment can achieve the following effects.

The information indicating that the RRC message is the control information corresponding to what component is added to the RRC message or as an element of the RRC message. In other words, the physical information of the component corresponding to the RRC message is made identifiable, which allows the receiver to judge whether the RRC message notified by means of the DCCH or CCCH mapped to the transport channel is the control information corresponding to what component.

Therefore, it is possible to efficiently perform communication control with the use of an RRC message as a mobile communication system, which does not require the control by another message, leading to an effect that a mobile communication system is prevented from becoming complicated.

Second Embodiment

A problem to be solved by a second embodiment is described.

The following problem arises in a case where each transport block is mapped to a single component only.

The control information, as a specific example, MAC message is mapped to the transport channel, for example, DL-SCH. The MAC message is segmented into one or a plurality of transport blocks when being mapped to the transport channel DL-SCH. If each transport block is mapped to a component, the control information corresponding to this component, for example, MAC message is resultantly mapped to a plurality of components to be transmitted/received.

Description is given with the use of, for example, a downlink MAC message. A UE receives the physical channel PDSCH on one component and performs demodulation and decoding, to thereby obtain one transport block on the transport channel DL-SCH. Suppose the case where data has been segmented into a plurality of transport blocks when a transmitter, that is, a base station maps the data to a transport channel. The UE processes the data segmented into the transport blocks mapped to one or a plurality of components, to thereby obtain one transport channel. That is, the MAC message and the component used for transmission/reception have no one-to-one correspondence.

Accordingly, whether the MAC message mapped to the transport channel is the control information corresponding to what component is unclear, which causes a problem that control with the use of a MAC message cannot be performed as a mobile communication system.

Further, in a case where each transport channel is mapped to a single component only, the following problem arises.

The control information, as a specific example, a MAC message is mapped to a transport channel, for example, DL-SCH. If each transport channel is mapped to one component, the MAC message being the control information for a component may be resultantly mapped to a plurality of components, or the MAC message being the control information for a component, for example, component A may be resultantly transmitted by a component other than this component, for example, component A.

Description is given with the use of, for example, downlink. A UE receives the physical channel PDSCH on one component and obtains one transport channel DL-SCH as a result of demodulation and decoding, to thereby obtain a MAC message mapped to the transport channel. However, the MAC message and the component used for transmission/reception have no one-to-one correspondence.

Accordingly, there arises a problem as to whether the received MAC message is the control information corresponding to what component is unclear.

The above-mentioned problem is specific to a mobile communication system in which a frequency band is divided in certain units, which are referred to as components in the LTE-A system, and those are used by aggregation.

Solutions in the second embodiment are described below.

The first solution is described below.

In a base station which supports to carrier aggregation, the control information, as a specific example, the contents of a MAC message are made common to all components. As a result, even if the MAC message and the component used for transmission/reception have no one-to-one correspondence, it is possible to judge whether the MAC message received by a receiver is the control information corresponding to what component. There can be achieved an effect that control with the use of a MAC message is allowed in a carrier aggregation mobile communication system.

The second solution is described below.

Suppose the MAC message contains the control information that is efficient if it is not common to all components but is in component units.

Description is given by taking the MAC message of the LTE system as a specific example (Non-Patent Document 13).

It is considered efficient to control the information indicating channel coding and decoding, interleaving, rate matching and the like of the MAC message, as a specific example, "Transport format" and "Transport format set" per component. This is because the carrier frequency varies among components, and thus the radio propagation characteristics are considered to vary. Therefore, it is considered that "Transport format" needs to be dedicatedly selected by the respective components for the selection of optimum "Transport format" by the respective components.

Further, it is considered that the information used for reporting to a base station, by a UE, a difference between the UE maximum transmission power and the estimated transmission power used for UL-SCH transmission, as a specific example, "Power Headroom reporting" varies among components. This is because the carrier frequency varies among components, and thus radio propagation characteristics are considered to vary. Therefore, it may be considered that the transmission power used for UL-SCH transmission of a UE also varies from component to component, and thus it is necessary to allow "Power Headroom Reporting" to be reported dedicatedly on the respective components.

Accordingly, in a case of using the first solution, control by a MAC message cannot be performed in component units, causing a problem that control cannot be performed in accordance with radio characteristics of the carrier frequency of a component.

In the second solution for solving the above-mentioned problem, in a base station supports to carrier aggregation, the control information, as a specific example, one MAC message is transmitted/received by one component, or a plurality of MAC messages are transmitted/received by one component. That is, the MAC message is prevented from being transmitted/received by being segmented into a plurality of components.

Further, a transport channel to which a MAC message is mapped, for example, DL-SCH is mapped to one transport block. That is, a transport channel to which a MAC message is mapped, for example, DL-SCH is not divided into transport blocks.

Further, a MAC message transmitted by a transmitter is mapped to the component controlled by the MAC message.

Further, the MAC message received by a receiver is the control information related to the received component.

This enables association of the component used for transmission/reception and MAC message by a receiver. In other words, it is possible to identify the physical information of the component corresponding to a MAC message. This achieves an effect that the communication control using a MAC message can be performed efficiently in a mobile communication system supports to carrier aggregation.

Moreover, the second solution allows the transmission/reception of a component-unit MAC message. This achieves an effect that control can be performed in accordance with radio characteristics of component charier frequency.

The third solution is described below.

An amount of information that can be transmitted/received by one transport block depends on a radio environment. That is, an amount of information that can be transmitted/received by one transport block is large in a case of a good radio environment between a base station and a UE, whereas an amount of information that can be transmitted/received by one transport block is small in a case of a poor radio environment.

Therefore, a case where the MAC message is transmitted/received by one transport block irrespective of a radio environment with the second solution causes a problem that the amount of information of a MAC message needs to be limited to the least amount of information that can be transmitted/received by one transport block.

The use of the second solution causes a problem that a mobile communication system becomes more complicated, for example, the control information transmitted/received by one MAC message in a current mobile communication system needs to be transmitted/received by a plurality of MAC messages.

In the third solution for solving the above-mentioned problem, in a base station supports to carrier aggregation, the information indicating that the MAC message is the control information corresponding to what component is added to the MAC message or as an element of the MAC message. In other words, the information for identifying the physical information of a component corresponding to the MAC message is added.

Alternatively, another area different from that for MAC message is provided in a base station supports to carrier aggregation, and the information indicating that the MAC message is the control information corresponding to what component is added to the another area. Another area may be added to or multiplexed in the MAC layer. Specific examples of another area include a header and a footer. Specific examples of the header include a header (MAC header) added to MAC SDU and a header (MAC header) added to the MAC control area (MAC control element). Specific examples of the footer include a MAC control area.

This enables the receiver to associate the component used for transmission/reception with the MAC message. In other words, the physical information of a component corresponding to the MAC message is identifiable. Accordingly, it is possible to achieve an effect that communication control with a MAC message can be efficiently performed in a mobile communication system supports to carrier aggregation.

Further, it is possible to transmit/receive a component-unit MAC message. This results in an effect that control can be performed in accordance with the radio characteristics of carrier frequency of a component.

Moreover, it is not required to limit the amount of information of a MAC message, and an effect that a mobile communication system is prevented from becoming complicated can be achieved.

A similar method to that of the first embodiment can be used as a specific example of the information indicating the control information corresponding to what component. Therefore, description thereof is omitted.

A similar method to that of the first embodiment can be used as a specific example of numbering of identifiers of components. Therefore, description thereof is omitted.

Figure 20:
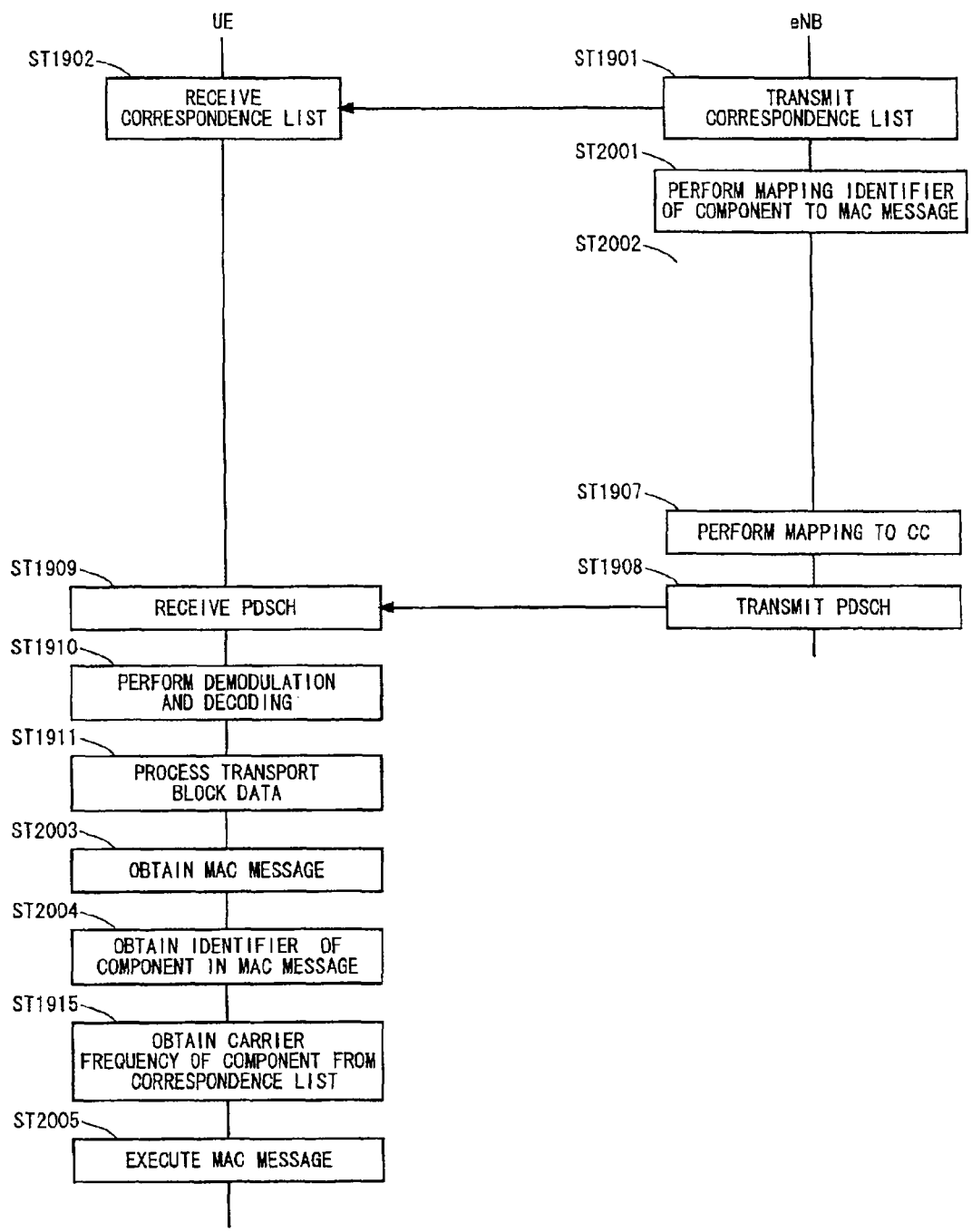
FIG. 20 is a sequence diagram showing the operation of a mobile communication system in a third solution according to a second embodiment.

FIG. 20 shows an example of the operation. Description is given with the use of the third specific example as the information indicating the control information corresponding to what component. In FIG. 20, identical or equivalent process is performed in the steps of the same reference numerals as those of FIG. 19, and thus description of the steps of the same reference numerals is omitted.

In Step ST2001, a base station adds the information indicating that the MAC message is the control information corresponding to what component as an element of the MAC message being the control component-unit information. For example, in the case of the control information corresponding to the component 1504 of FIG. 17, the base station adds the information of the identifier of a component "CC #4" as the element of a MAC message.

In Step ST2002, the base station segments the MAC message into one or a plurality of transport blocks (MAC PDUs).

In Step ST2003, the UE obtains the MAC message mapped on the DL-SCH.

In Step ST2004, the UE obtains an identifier of a component in the MAC message. For example, the UE obtains the identifier of a component "CC #4" of FIG. 17.

In Step ST2005, the UE executes, for the carrier frequency of a component obtained in Step ST1915, the control instructed by the MAC message received in Step ST2003.

Further, in a base station supports to carrier aggregation, it is possible to use a method similar to that of the first embodiment as the solution to a problem in a case where the MAC message contains the component-unit control information and the control information corresponding to all components of the base station. Therefore, description thereof is omitted.

While the downlink MAC message has been mainly described in the second embodiment, the second embodiment is similarly applicable to an uplink MAC message.

In addition to the logical channels DCCH and CCCH, the logical channel MCCH and logical channel BCCH are mapped to the transport channel DL-SCH by the control information. The second embodiment is similarly applicable to the MCCH and BCCH.

The second embodiment can achieve the following effects.

The information indicating that the MAC message is the control information corresponding to what component is added to the MAC message or as an element of the MAC message, which allows the receiver to judge whether the MAC message notified by means of the transport channel is the control information corresponding to what component. In other words, the information for identifying the physical information of a component corresponding to the MAC message is added, whereby it is possible to identify the physical information of a component corresponding to the MAC message by the receiver.

Therefore, it is possible to efficiently perform communication control with the use of a MAC message as a mobile communication system, and thus the control by another message is not required. Accordingly, an effect that a mobile communication system is prevented from becoming complicated can be achieved.

First Modification of Second Embodiment

A problem to be solved by a first modification of the second embodiment is similar to that of the second embodiment, and thus description thereof is omitted.

A solution in the first modification of the second embodiment is described below.

A base station supports to carrier aggregation has a MAC layer structure so as to separate the portion into which a MAC message being the component-unit control information is inserted from the portion into which a MAC message being the control information for all components of the base station is inserted.

A specific example of the method of separating the MAC layer structure is described below.

Figure 21:
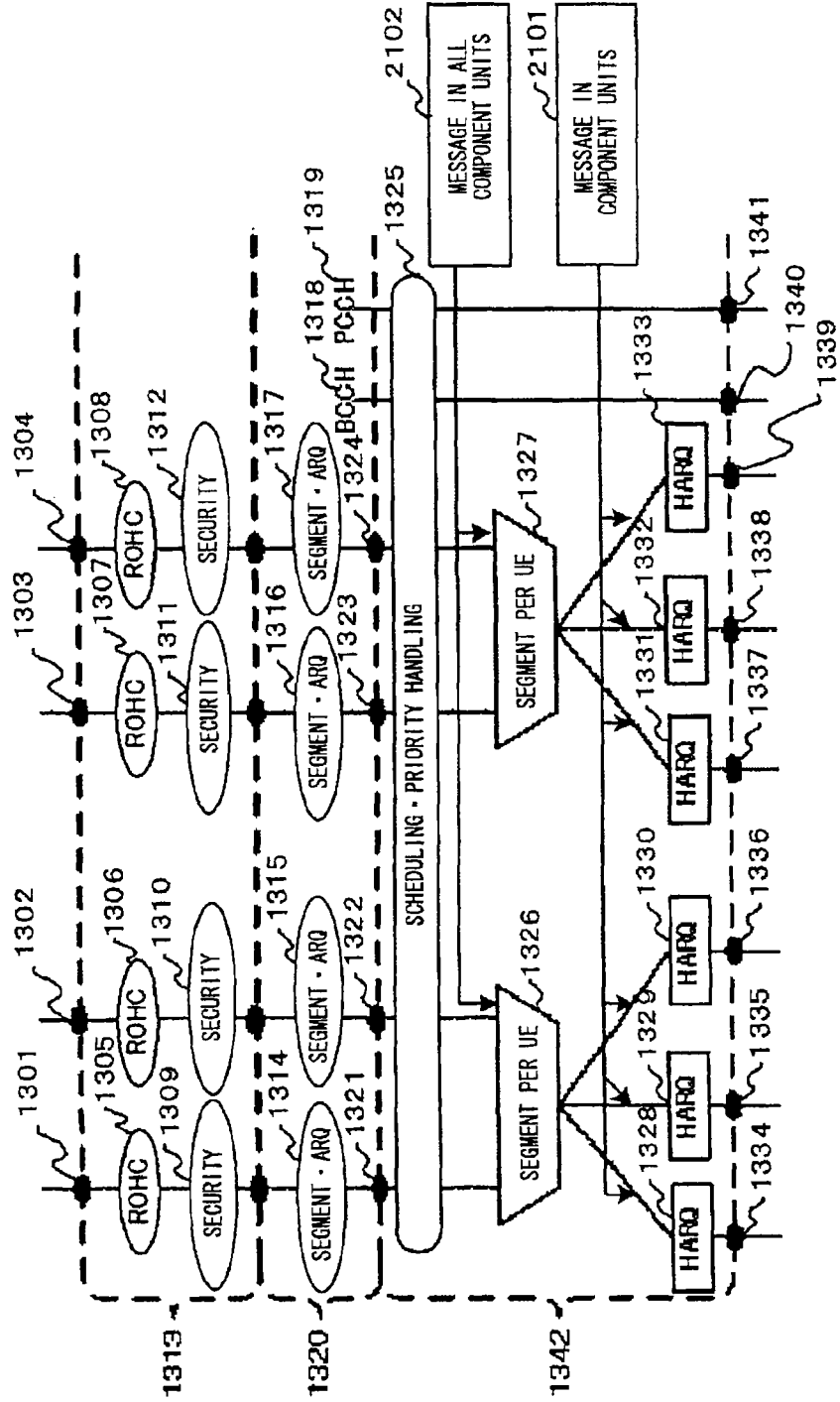
FIG. 21 is a diagram showing a downlink layer 2 structure for carrier aggregation, which is disclosed in a first modification of the second embodiment.
Figure 22:
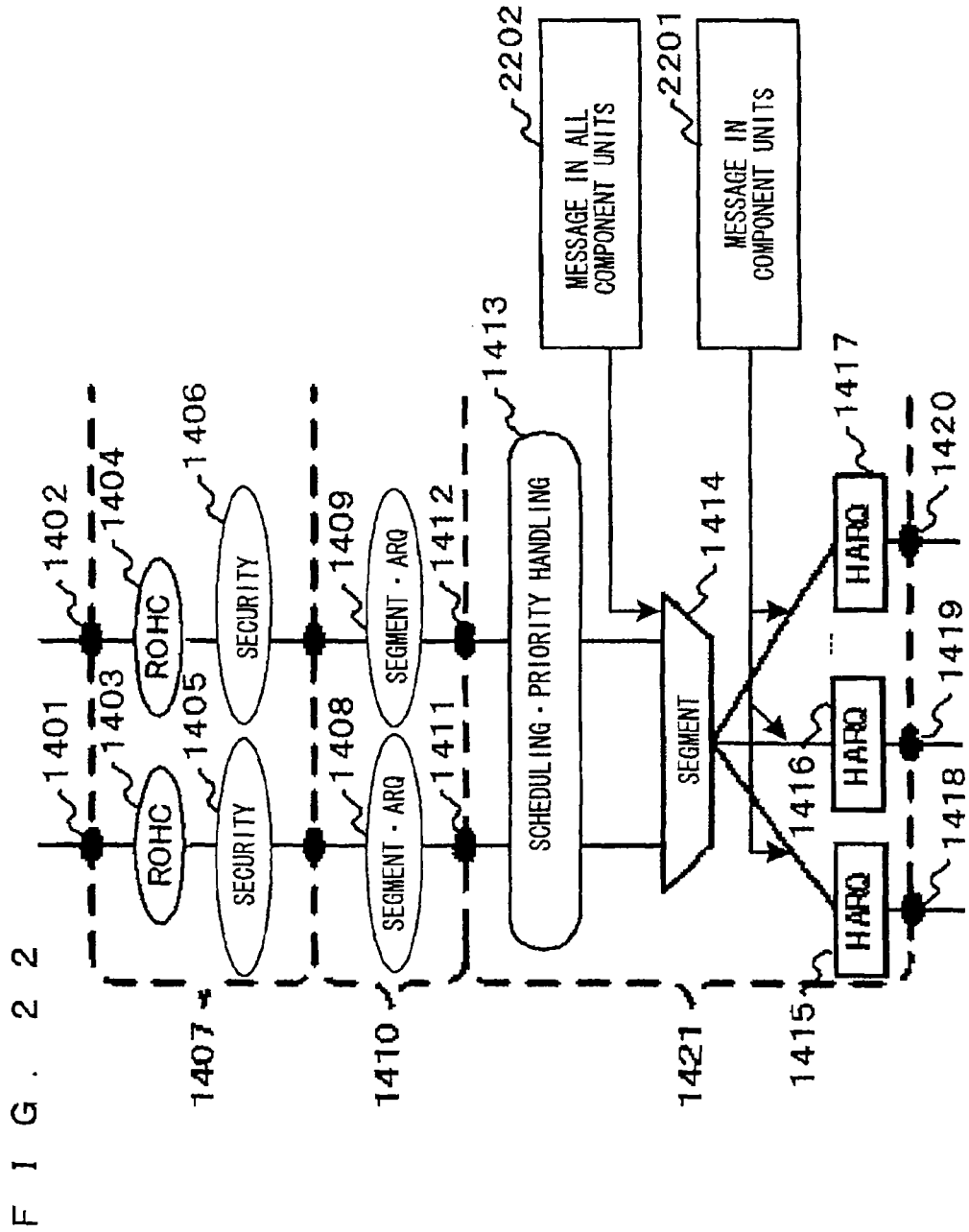
FIG. 22 is a diagram showing an uplink layer 2 structure for carrier aggregation, which is disclosed in the first modification of the second embodiment.

FIG. 21 shows the downlink MAC layer structure, and FIG. 22 shows the uplink MAC layer structure. The same reference numerals as those of FIG. 13 denote equivalent portions in FIG. 21, and thus description thereof is omitted. The same reference numerals as those of FIG. 14 denote equivalent portions in FIG. 22, and thus description thereof is omitted.

The portion into which a MAC message being the component-unit control information in the transmitter is positioned downstream of the position for the separation in component units per UE. 2101 of FIG. 21 and 2201 of FIG. 22 denote the portions into which a MAC message being the component-unit control information is inserted. The MAC message to be transmitted is inserted so as to be transmitted by the component controlled by the MAC message.

The portion into which a MAC message being the control information for all components is inserted in the transmitter is positioned upstream of the separation in component units per UE. 2102 of FIG. 21 and 2202 of FIG. 22 denote the portions into which a MAC message being the control information for all components is inserted.

The MAC message that can be received by the physical channel PDSCH on one component in the receiver is judged as a component-unit message. The component-unit MAC message can be judged as the control information for the component that has received the MAC message.

On the other hand, the MAC message that can be received by the physical channels PDSCH on a plurality of components in the receiver is judged as the MAC message being the control information for all components.

The first modification of the second embodiment can achieve similar effects to those of the second embodiment.

The receiver can identify the physical information of the component corresponding to the MAC message.

Therefore, it is possible to efficiently perform communication control with the use of a MAC message as a mobile communication system, and thus control by another message is not required. This achieves an effect that a mobile communication system is prevented from becoming complicated.

Differently from the second embodiment, it is not necessary to add the information for identifying the physical information of a component corresponding to a MAC message. This achieves effects that radio resources are effectively used and that a mobile communication system is prevented from becoming complicated.

Third Embodiment

A problem to be solved by the third embodiment is described.

In a case of using the solutions of the first embodiment, the problem as to whether the RRC message received by the receiver is the control information corresponding to what component is unclear is solved.

In a base station supports to carrier aggregation, one or a plurality of components are scheduled for a UE in accordance with a change in radio environment, as a specific example, in accordance with the CQI measured by a UE and measurement results. Therefore, the component to be scheduled varies in time for a UE.

In the solutions of the first embodiment, higher layers, as a specific example thereof, higher layers that control an RRC message need to recognize the scheduling results of components for a UE. Therefore, a case where a component carrier scheduled for a UE varies leads to a case where, in the solutions of the first embodiment, the layer that controls an RRC message does not follow scheduling of component carriers. As a result, there occurs a case where the component, which has been specified by the information indicating that the RRC message is the control information corresponding to what component in the RRC message, is not included in the component that has been practically allocated to a UE.

Accordingly, in a case where, for example, a component scheduled for a UE varies, a problem as to whether the received RRC message is the control information corresponding to what component is unclear arises again.

Solutions in the third embodiment are described below.

The first solution is described below.

The layer that performs scheduling of components notifies a higher layer, as a specific example, a layer into which an RRC message is inserted of the scheduling results of components for a UE. As a specific example, a MAC layer being a layer that schedules components notifies an RRC layer being a layer into which an RRC message is inserted of the scheduling results of components for a UE.

An RRC message is used for notification of components scheduled for a UE from a base station. The RRC message is notified by the method disclosed in the first embodiment simultaneously with the notification of the components to be scheduled. The notification of components to be scheduled and the notification of an RRC message disclosed in the first embodiment may be performed simultaneously or not.

This allows the layer that controls an RRC message to always know scheduling of component carriers. That is, the layer can follow scheduling.

Accordingly, the above-mentioned problem in the third embodiment is solved.

The second solution is described below.

In a case of using the first solution, the layer that controls an RRC message cannot notify the components to be scheduled and cannot notify the RRC message before recognizing the scheduling results of components for a UE, causing a problem of an increase in control delay as a mobile communication system.

In the second solution for solving the above-mentioned problem, in a base station supports to carrier aggregation, not the information indicating that the RRC message is the control information corresponding to what component, but a component index is added to another area different from that for an RRC message, for example, a header or footer, to the RRC message or as an element of the RRC message.

A component index is an identifier that should satisfy the following requirements: (1) it should be an identifier mainly used by a higher layer; (2) it should be irrelevant to the physical information (for example, frequency) of a component carrier; and (3) it should be the information for identifying a component (information by which the physical information of a component carrier cannot be identified).

As to the component index, a higher layer notifies a MAC layer of the control information corresponding to the same component with the use of the same component index, and the control information corresponding to a different component with the use of a different component index.

A higher layer shows the control information corresponding to the same component or the control information corresponding to a different component by a component index. A specific example of the MAC layer to which a higher layer notifies a component index is described below.

(1) Scheduling of components is performed, which is referred to as a component scheduling block. Scheduling of components is performed by CQI and measurement report in which a UE measures a radio environment and reports to a base station.

(2) Component-unit segmentation is performed per UE, which are denoted by, for example, 1326 and 1327 of FIG. 13.

Hereinafter, description is given with the use of a "component scheduling block" as a specific example of the MAC layer.

The component scheduling block associates a component index with a component to be scheduled to a UE. The component scheduled to a UE and a component used for data transmission/reception between a UE and a base station are referred to as scheduling components.

A specific example of association of a component index with a scheduling component is described below. (1) One type of component index is associated with one scheduling component. (2) One type of component index is associated with a plurality of types of scheduling components.

Specific examples of the information indicating a scheduling component are described below.

Figure 23:
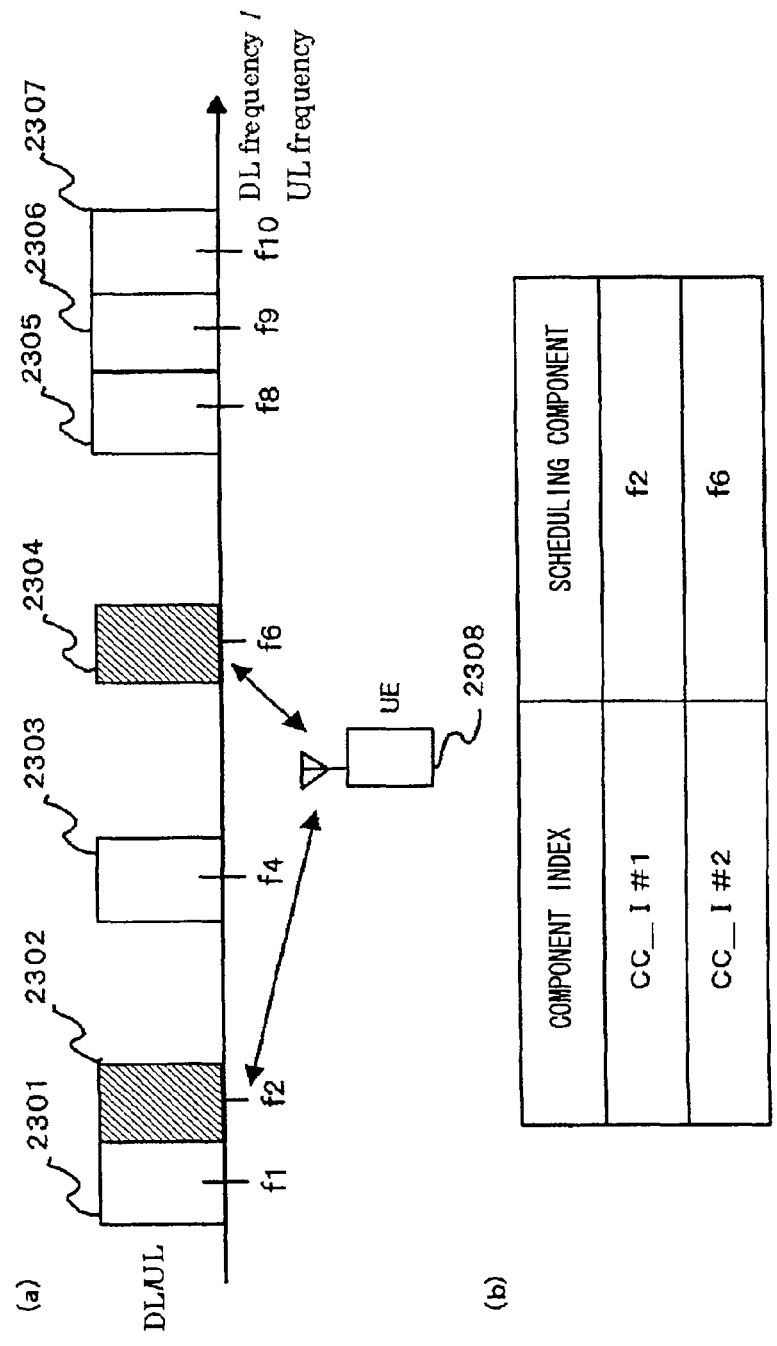
FIG. 23 is a diagram illustrating a first specific example of the information indicating scheduling components in a second solution according to a third embodiment.

The first specific example is carrier frequency of a component. Description is given with reference to FIG. 23A. 2301 to 2307 denote components that perform carrier aggregation in the base station. f1 to f10 denote carrier frequencies of components of the respective components. In the first specific example, the carrier frequencies of components shown in FIG. 23 are used as the information indicating the scheduling components. As a specific example, in a case where the scheduling components allocated to a UE 2308 are the component 2302 and the component 2304, the information indicating the scheduling component is "f2" and "f6". This specific example is advantageous that a carrier frequency change of a mobile communication system can be responded in a flexible manner because values which are absolute are used.

As shown in FIG. 23B, the carrier frequencies of components are used as the information indicating the scheduling component used for association of a component index and a scheduling component.

Figure 24:
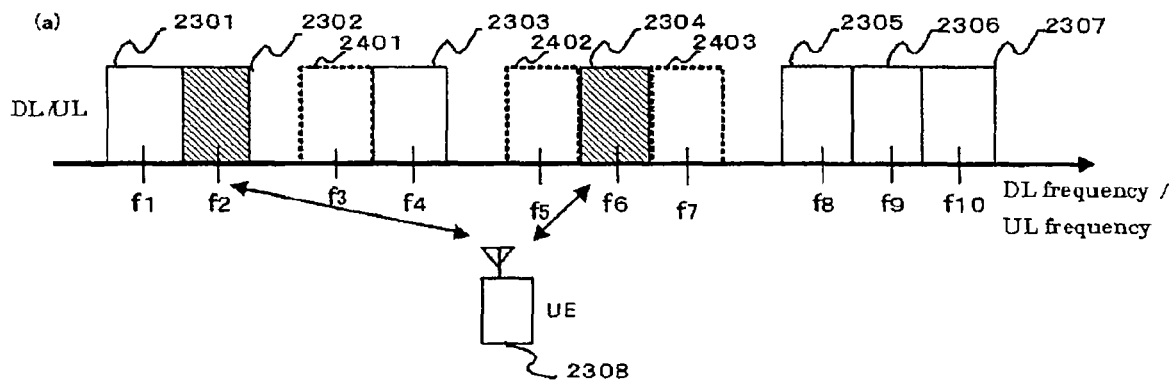
FIG. 24 is a diagram illustrating a second specific example of the information indicating the scheduling components in the second solution according to the third embodiment.

The second specific example is an identifier of a component. Description is given with reference to FIG. 24A. The same reference symbols as those of FIG. 23 denote the equivalent portions, and thus description thereof is omitted. 2301 to 2307 and 2401 to 2403 denote components used as a mobile communication system. In the second specific example, the identifiers of components shown in FIG. 24B are used as the information indicating the scheduling components. The carrier frequencies of components (2301 to 2307 and 1401 to 2403) used as a mobile communication system, for example, an LTE-A system are associated with the identifiers of components. As a specific example, an identifier of a component "CC #2" corresponds to the information indicating the scheduling component 2302 of FIG. 24A. An identifier of a component "CC #6" corresponds to the information indicating the scheduling component 2304 of FIG. 24A.

Differently from the first specific example using values which are absolute, identifiers are mapped in the second specific example. Therefore, an amount of information indicating scheduling components, that is, the information bit number is smaller in the second specific example. This has an effect that radio resources are effectively used.

The correspondence list of carrier frequencies of components and identifiers of components, which is shown in FIG. 24B, is notified from a network to a UE. As a specific example of the notification method, notification is made from the base station to the UE by means of the use of broadcast information, as a specific example, the BCCH (MIB or SIB). The association is notified from the network to the UE, which achieves an effect that an amount of information indicating scheduling components can be reduced while maintaining an advantage that a carrier frequency change of a mobile communication system.

Alternatively, the correspondence list of carrier frequencies of components and identifiers of components, which is shown in FIG. 24B, may be determined in a static manner as a mobile communication system. This eliminates the need to notify the correspondence list from a network to a UE, leading to effects that radio resources are effectively used and that a communication error does not occur accompanying radio communication.

As shown in FIG. 24C, the above-mentioned identifiers of components are used as the information indicating the scheduling components used for association of component indices and scheduling components.

Figure 25:
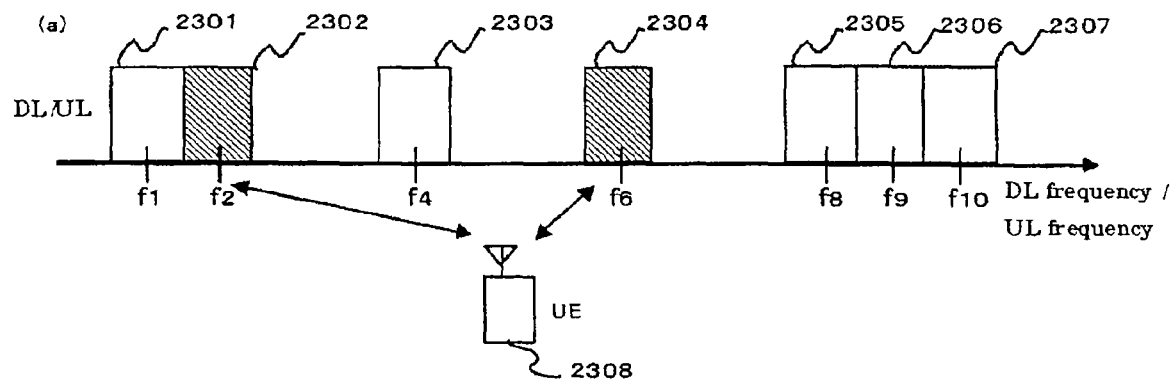
FIG. 25 is a diagram illustrating a third specific example of the information indicating the scheduling components in the second solution according to the third embodiment.

The third specific example is an identifier of a component. Description is given with reference to FIG. 25. The same reference symbols as those of FIG. 23 denote the equivalent portions, and thus description thereof is omitted. In the third specific example, identifiers of components shown in FIG. 25B are used as the information indicating scheduling components. The carrier frequencies of components used in the base station are associated with the identifiers of components (FIG. 25B). As a specific example, the identifier of a component "CC #2" corresponds to the information indicating the scheduling component 2302 of FIG. 25. The identifier of a component "CC #4" corresponds to the information indicating the scheduling component 2304 of FIG. 25.

Differently from the first specific example in which values which are absolute are mapped, and also differently from the second specific example in which the identifies corresponding to the carrier frequencies of components that can be taken by a mobile communication system are mapped, identifiers corresponding to the carrier frequencies of components that can be taken by the base station are mapped in the third specific example. Therefore, an amount of information indicating scheduling components, that is, an information bit number is smaller in the third specific example. This achieves an effect that radio resources are effectively used.

The correspondence list of carrier frequencies of components and identifiers of components, which is shown in FIG. 25B, is notified from a network to a UE. As a specific example of the notification method, notification is made from the base station to the UE by means of the broadcast information, as a specific example, the BCCH (MIB or SIB). The association is notified from the network to the UE, which achieves an effect that an amount of information indicating scheduling components can be reduced while maintaining an advantage that a carrier frequency change of a mobile communication system can be responded in a flexible manner.

As shown in FIG. 25C, the identifiers of components are used as the information indicating the scheduling components used for association of component indices and scheduling components.

A similar method to that of the first embodiment can be used as a specific example of numbering of identifiers of components. Therefore, description thereof is omitted.

FIG. 26 is a conceptual diagram of association of the component indices and scheduling components, which is performed in a component scheduling block. Description is given with the use of, as a specific example, the identifiers of components in the third specific example as the information indicating the scheduling components.

The scheduling components allocated to the UE 2308 at a time t1 in (1)-(a) are the CC #2 (2302) and a CC #4 (2304). The component scheduling block associates the component index notified from a higher layer with the scheduling component. A specific example there of is shown in FIG. 23(1)-(b), where the component scheduling block associates a component index "CC_I #1" with the scheduling component CC #2 and a component index "CC_I #2" with the scheduling component CC #4.

The radio environment between a UE and a base station varies, and the scheduling components are changed in accordance with the CQI measured by a UE and measurement results.

The scheduling components allocated to the UE 2301 at a time t2 in (2)-(a) are the CC #4 (2304) and CC #5 (2305). The component scheduling block associates the component index notified from a higher layer with the scheduling component. A specific example thereof is shown in FIG. 23(2)-(b), where the component scheduling block associates the component index "CC_I #1" with the scheduling component CC #5 and the component index "CC_I #2" with the scheduling component CC #4.

That is, the component scheduling block changes the scheduling component associated with the component index CC_I #1 from CC #2 (time t1) to CC #5 (time t2). The higher layer that adds the component index to, for example, an RRC message is not required to know that the scheduling component allocated to the UE (2308) has been changed on the physical layer.

Figure 27:
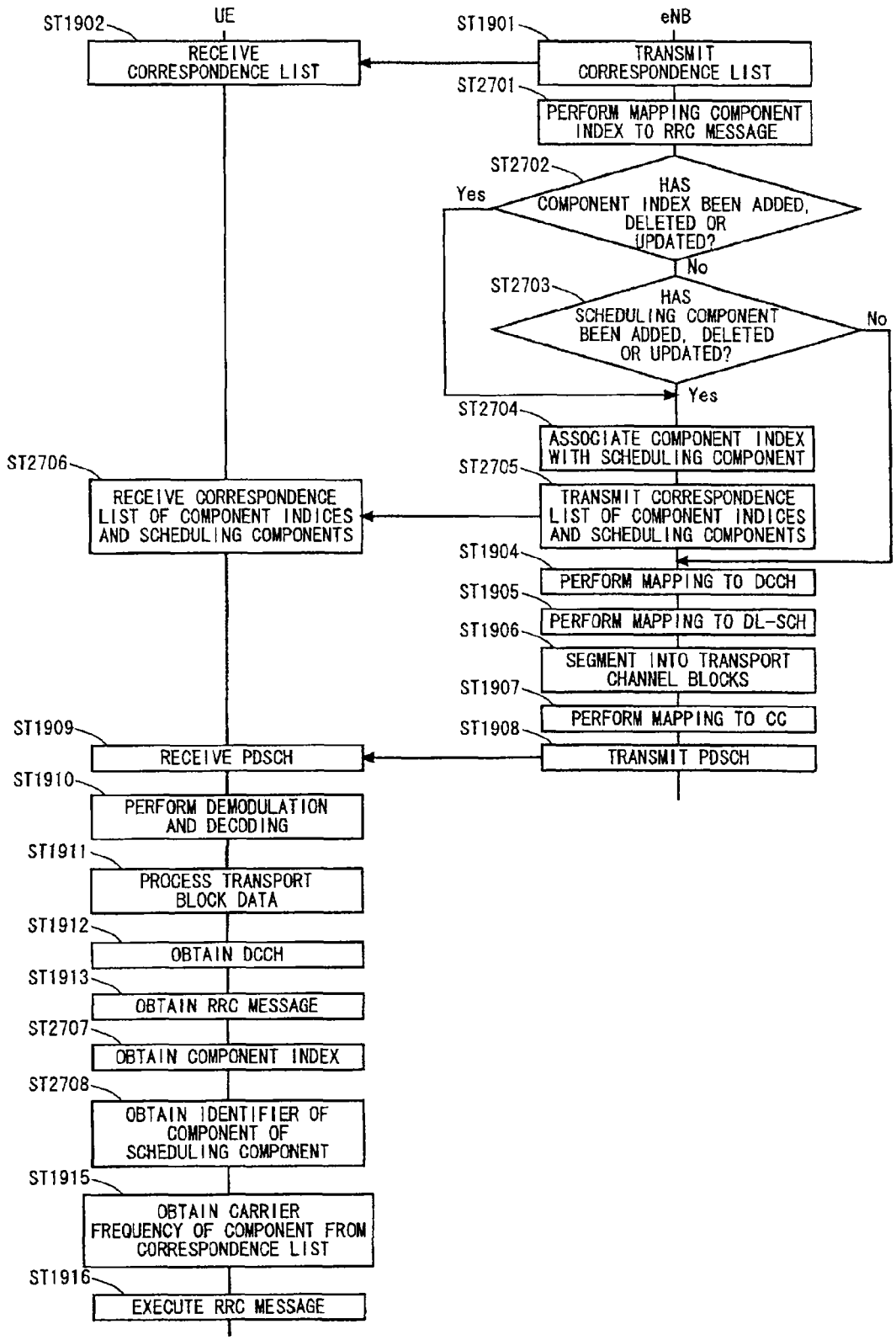
FIG. 27 is a sequence diagram showing the operation of a mobile communication system in the second solution according to the third embodiment.

FIG. 27 shows an example of the operation. As one example, description is given by using the identifiers of components in the third specific example as the information indicating the scheduling component. In FIG. 27, identical or equivalent process is performed in the steps of the same reference numerals as those of FIG. 19, and thus description of the steps of the same reference numerals is omitted.

In Step ST2701, a base station adds the information indicating a component index as an element in the RRC message being the component-unit control information. For example, in the description by taking FIG. 26(1) as an example, the information of the component index "CC_I #1" is added as an element in the RRC message.

In Step ST2702, the base station judges whether or not the types of component indices have been added, deleted or updated. Alternatively, the base station judges whether or not to associate component indices with scheduling components again as a result of a change of component indices. The base station moves to Step ST2704 in a case where the types of component indices have been added, deleted or updated. The base station moves to Step ST2703 in a case where the types of component indices have not been added, deleted or updated.

In Step ST2703, the base station judges whether or not the scheduling components have been added, deleted or updated. Alternatively, the base station judges whether or not to associate component indices with scheduling components again as a result of a change of scheduling components. The base station moves to Step ST2704 in a case where the types of scheduling components have been added, deleted or updated. The base station moves to Step ST1904 in a case where the types of component indices have not been added, deleted or updated.

In Step ST2704, the base station associates the component indices with the scheduling components.

In Step ST2705, the base station notifies the UE of the correspondence list (for example, FIG. 26(1)-(b)) that shows the results of association of component indices and scheduling components (Step ST2704). A specific example of the notification method is described below.

It is conceivable that a notification is made from the base station to the UE by a dedicated control signal. The scheduling components may be changed as required in consideration of a radio environment per UE, which results in that unnecessary information is transmitted to the other UE by a common control signal and broadcast information. Accordingly, the radio resources are wasted. It is therefore possible to obtain an effect that radio resources are effectively used by notification by a dedicated control signal.

The notification method in which a control delay is shorter compared with the RRC message is used for a dedicated control signal. This prevents a control delay from increasing as a mobile communication system, which is a problem to be solved by the second solution of the third embodiment.

It is conceivable that the PDCCH or MAC message is used as a specific example of the dedicated control signal.

Specific examples of the notification method in a case of using the PDCCH are described below.

(1) Notification is made by means of the PDCCH of the component included in a candidate component carrier set. The candidate component is a component capable of data transmission/reception between a base station and a UE. Differently from the case where notification is made by means of all components of the base station, this achieves an effect that radio resources are effectively used and does not cause a problem that the UE cannot receive the notification due to the UE making a notification from the component capable of transmission/reception. Further, a UE is not required to monitor the PDCCH included in the component other than the candidate component, leading to an effect of less power consumption of a UE.

(2) Notification is made by means of the PDCCH of the component included in scheduling components. The scheduling component is a component where data transmission/reception is practically performed. This achieves an effect that radio resources are effectively used differently from the case where notification is made by means of all components of the base station, and achieves an effect that radio resources are used more effectively differently from the case where notification is made by means of a candidate component. Besides, this does not cause a problem that the UE cannot receive the notification due to the UE making a notification from the component where data transmission/reception is practically performed. Further, a UE is not required to monitor the PDCCH included in the component other than the scheduling component, leading to an effect of less power consumption of a UE.

(3) Notification is made by means of the PDCCH of the component included in an anchor component during communication. The anchor component is defined as a component for enabling the UE during communication to monitor the PDCCH or the component for performing a measurement. In that case, the UE does not need to monitor the PDCCH included in the component other than the anchor component, leading to an effect of less power consumption of a UE.

In Step ST2706, the UE receives the correspondence list that shows the results of association of component indices and scheduling components (Step ST2704) from the base station.

In Step ST2707, the UE obtains the component index in the RRC message. In the description given by taking FIG. 26(1) as an example, the UE obtains the component index "CC_I #1" as an element in the RRC message.

In Step ST2708, the UE obtains the component identifier of the component controlled by the RRC message, based on the correspondence list (for example, FIG. 26(1)-(*b*)) that shows the results of association of component indices and scheduling components (Step ST2704) received in Step ST2706. For example, the UE obtains the identifier of a component "CC #2" of the scheduling component corresponding to the component index "CC_I #1" from FIG. 26(1)-(*b*).

The third embodiment can be used in combination with the first embodiment.

Alternatively, whether the solutions of the first embodiment are used or the solutions of the third embodiment is used may be discriminated depending on the control information in the RRC message or the contents of control.

A specific example of discriminating solutions is described below.

(1) The second solution of the third embodiment in which scheduling of components can be quickly followed is used for the control information required to quickly follow a change of scheduling components, whereas the first solution of the first embodiment or third embodiment is used for the control information that is not required to quickly follow a change of scheduling components. As specific examples thereof, the second solution of the third embodiment may be used for "Radio resource Configuration", whereas the first solution of the first embodiment or third embodiment may be used for "Radio link failure related action" and "Measurement".

(2) The first solution of the first embodiment or third embodiment in which a higher layer, as a specific example, a layer that controls an RRC message recognizes the scheduling results of components to a UE may be used for the control information related to carrier frequency of a component or related to frequency characteristics. While, the second solution of the third embodiment may be used for the control information irrelevant to carrier frequency of a component or irrelevant to frequency characteristics.

This achieves an effect that the optimum RRC message notification method can be used depending on the control information in an RRC message or the contents of control.

While the third embodiment has mainly described a downlink RRC message, the third embodiment is similarly applicable to an uplink RRC message.

In addition to the logical channels DCCH and CCCH, the logical channel MCCH and the logical channel BCCH are mapped to the transport channel DL-SCH by the control information. The third embodiment is similarly applicable to the MCCH and BCCH.

While the third embodiment has mainly described an RRC message, it is also applicable to a MAC message.

In a case of application to a MAC message, in a base station supports to carrier aggregation, it suffices that not the information indicating the MAC message is the control information corresponding to what component, but a component index is added to a MAC message, as an element in the MAC message, or in an area different from that for the MAC message, for example, a header or footer. Detailed description is similar to that in the case of RRC message and is accordingly omitted.

The third embodiment can achieve the following effects in addition to the effects of the first embodiment and the second embodiment.

A higher layer does not need to recognize the scheduling results of components to a UE. This enables to follow the scheduling of components more quickly compared with the first embodiment and the second embodiment, and thus an effect of preventing a control delay in a mobile communication system can be achieved. That is, scheduling of components can be responded in a flexible manner.

Even in a case where the components scheduled to a UE may vary in a short period of time, a problem as to whether the RRC message received by a receiver is the control information corresponding to what component is unclear can be solved.

Fourth Embodiment

A problem to be solved by the fourth embodiment is described.

The use of the solutions of the third embodiment enable to solve a problem as to whether the received RRC message is the control information corresponding to what component is unclear is solved, even in a case where a scheduling change of component carriers for a UE may occur in a short period of time. However, the third embodiment does not work effectively unless the correspondence list, which shows the results of association of component indices and scheduling components, has been notified from a transmitter to a receiver.

For example, in a case where the control information, as a specific example, the RRC message or MAC message is notified from a transmitter to a receiver before the completion of notification of the correspondence list, there occurs a problem that the received control information, as a specific example, the RRC message or MAC message is recognized as the control information for an irrelevant component.

If the control information, as a specific example, the RRC message or MAC message is not notified until the completion of notification of the correspondence list for preventing the above-mentioned problem, a problem of an increase in control delay occurs as a mobile communication system.

A solution in the fourth embodiment is described below.

In a base station supports to carrier aggregation, the control information corresponding to the components included in a candidate component carrier set of a UE, as a specific example, the RRC message or MAC message is transmitted in advance to components included in the candidate component carrier set.

A scheduling component including one or a plurality of components where data transmission/reception is practically performed is selected from a candidate component carrier set (candidate set) being a set of one or a plurality of component candidates capable of data transmission/reception with the UE. The selection is performed as a result of measurements of a UE, based on the CQI.

FIG. 28 is a conceptual diagram of the solution in the fourth embodiment. 2801 to 2807 denote downlink components capable of carrier aggregation in the base station. 2808 to 2812 denote uplink components capable of carrier aggregation in the base station. fD1 to fD10 denote carrier frequencies of components of the respective downlink components. fU1 to fU9 denote carrier frequencies of components of the respective uplink components.

The components 2801 and 2808, 2802 and 2809, 2803 and 2810, and 2804 and 2811 form a pair of downlink and uplink bands. 2805, 2806 and 2807 form an asymmetric pair of bands with 2812.

2813 denotes a scheduling component being a component where data transmission/reception with a UE is practically performed. The scheduling component 2813 includes the components 2801, 2802, 2808 and 2809. 2814 denotes a candidate component carrier set capable of transmitting/receiving data to/from a UE. The candidate carrier set 2814 includes the components 2801, 2802, 2803, 2808, 2809 and 2810.

FIG. 29 shows an example of the operation.

In Step S2901, the UE transmits the measurement results on the reception quality, CQI or the like to the base station.

In Step ST2902, the base station receives the measurement results on the reception quality, CQI or the like from the UE.

In Step ST2903, the base station judges whether or not a component to be added to the component included in a candidate component carrier set corresponding to the UE is present based on the measurement results of a UE or the CQI received in Step ST2902. In the case where there is a component to be added, the base station moves to Step ST2904. In the case where there is no component to be added, the base station moves to Step ST2907. Alternatively/Further, in Step ST2903, the base station judges whether or not to newly create a candidate component carrier set for the UE. In the case of newly creating one, the base station moves to Step ST2904. In the case of not newly creating one, the base station may move to Step ST2907.

In Step ST2904, the base station reserves a radio resource for the UE in the component to be added to the candidate component carrier set if necessary. Specific examples of the radio resource required to be reserved include a resource for a scheduling request.

In Step ST2905, the base station transmits the control information related to a component to be added to the component included in the candidate component carrier set, as a specific example, the RRC message or MAC message. The first embodiment, the second embodiment including modifications or the third embodiment can be used as the solution to the problem as to whether control information, as a specific example, the RRC message or MAC message is the control information corresponding to what component is unclear. Thus, description thereof is omitted. A specific example of the method of notifying the correspondence list, which shows the results of association of the component indices and scheduling components in the third embodiment, can be used as the notification method. Thus, description thereof is omitted.

There is another conceivable case where a base station notifies a UE of a component to be added to the component included in a candidate component carrier set. In that case, the control information related to the component to be added to the component included in the candidate component carrier set is transmitted together with the RRC message or MAC message. Note that the control information related to the component to be added and the RRC message or MAC message may be transmitted simultaneously or not.

In Step ST2906, the UE receives the control information related to the component to be added to the component included in the candidate component carrier set, as a specific example, the RRC message or MAC message from the base station.

In Step ST2907, the base station judges whether or not to change the component included in the scheduling components for the UE based on the measurement results of a UE or CQI received in Step ST2902. The base station moves to Step ST2908 in a case where a change is made. The base station ends the process in a case where no change is made.

In Step ST2908, the base station notifies the UE of the components included in the scheduling components. The base station may notify the information related to all components included in the scheduling components after change, or may notify the information related to the component only for an amount of a difference between before and after change. In the case where the base station notifies the information related to all components, an effect of greater resistance to radio communication error can be achieved. In addition, in the case where the base station notifies the information related to the component for only amount of a difference between before and after change, an amount of information to be notified can be reduced, leading to an effect that radio resources are effectively used. The information "carrier frequency of a component" and "identifier of a component" that indicate the control information corresponding to what component in the first embodiment can be used as a specific example of the information related to the component included in the scheduling components, and thus detailed description thereof is omitted. The method of notifying the correspondence list that shows the results of association of the component indices and scheduling components in the third embodiment can be used as a specific example of the notification method, and thus description thereof is omitted.

In Step ST2909, the UE receives the information related to the component included in the scheduling components from the base station.

In Step ST2910, the UE applies the control information received in Step ST2906, as a specific example, the RRC message or MAC message to the component included in the scheduling components.

The fourth embodiment can be used in combination with the first embodiment, the second embodiment including modifications or the third embodiment.

Alternatively, whether the solutions of the first embodiment or the second embodiment are used, the solutions of the third embodiment are used, or the fourth embodiment is used may be discriminated depending on the control information of the RRC message or MAC message, or the contents of control.

A specific example of discriminating solutions is described below.

(1) As to the control information required to quickly follow a change of scheduling component, the fourth embodiment or the second solution of the third embodiment, which enables component scheduling to be quickly followed, may be used. Meanwhile, as to the control information that is not required to quickly follow a change of scheduling component, the first solution of the first embodiment or third embodiment may be used.

(2) As to the control information related to carrier frequency of a component or frequency characteristics, the first embodiment or the first solution of the third embodiment in which a higher layer, as a specific example, the layer that controls the RRC message obtains the scheduling results of a component for a UE may be used. Meanwhile, as to the control information that is not related to carrier frequency of a component or frequency characteristics, the second solution of the third embodiment or the fourth embodiment may be used.

(3) As to the control information in which contents of control are not frequently changed, the fourth embodiment may be used. Meanwhile, as to the control information in which the contents of control are frequently changed, the third embodiment or the first embodiment may be used.

This achieves an effect that the method of notifying an optimum RRC message can be used depending on the control information of the RRC message or the contents of control.

The fourth embodiment can achieve the following effect in addition to the effects of the first embodiment, second embodiment and third embodiment.

A scheduling component is selected from the components included in a candidate component carrier set, and the control information corresponding to the components included in a candidate component carrier set is notified from a transmitter to a receiver in advance. Accordingly, the fourth embodiment can achieve an effect that component scheduling can be quickly followed.

It is not required for a transmitter to notify a receiver of a correspondence list that shows the results of association of the component indices and scheduling components, which is required in the third embodiment. This solves a problem that in a case where, for example, a transmitter notifies a receiver of the control information, as a specific example, the RRC message or MAC message until the completion of the notification of the correspondence list, the received control information, as a specific example, the received RRC message or MAC message is recognized as the control information corresponding to an irrelevant component.

In addition, a problem of an increase in control delay as a mobile communication system can be solved because the notification of the control information, as a specific example, the RRC message or MAC message does not need to be held until the completion of notification of the correspondence list.

A specific effect in a case where the fourth embodiment is used for the RRC message, which is disclosed in Non-Patent Document 9, is described below.

First, the control information corresponding to downlink is described using a specific example.

With the use of the fourth embodiment, the base station notifies in advance the UE of the configuration information related to a radio resource corresponding to a component included in a candidate component carrier set, as a specific example, "Radio resource Configuration", the configuration information related to a physical layer included in "Radio resource Configuration", as a specific example, "Physical config Dedicated", the configuration information related to the PDSCH included in "Physical config Dedicated" included in "Radio resource Configuration", as a specific example, "pdsch-configdedicated", or the transmission power information of a reference signal included in "pdsch-configdedicated" included in "Physical config Dedicated" included in "Radio resource Configuration", as a specific example, "referenceSignalPower".

Description is given with reference to FIG. 28, where the control information corresponding to the downlink components 2801, 2802 and 2803 that are included in the candidate component carrier set 2814 is notified in advance. Accordingly, even when the downlink scheduling components are changed from 2801 and 2802 to 2802 and 2803 shown in FIG. 28, the UE recognizes the control information of 2803 in advance.

Therefore, the use of the fourth embodiment achieves an effect that a UE is capable of control using, for example, the configuration information related to the PDSCH in 2803, as a specific example, "pdsch-configdedicated" immediately after 2803 is included in the scheduling components.

Further, "referenceSignal Power" is used as reference power of downlink transmission power control. Therefore, the use of the fourth embodiment achieves an effect that downlink transmission power control is enabled using the transmission power information of a reference signal in 2803, as a specific example, "referenceSignalPower" immediately after 2803 is included in the scheduling components.

Next, the control information corresponding to uplink is described with a specific example.

With the use of the fourth embodiment, the base station notifies in advance the UE of the configuration information related to a radio resource corresponding to a component included in a candidate component carrier set, as a specific example, "Radio resource Configuration", the configuration information related to a physical layer included in "Radio resource Configuration", as a specific example, "Physical config Dedicated", the configuration information related to the PUSCH included in "Physical config Dedicated" included in "Radio resource Configuration", as a specific example, "pusch-configdedicted", or the control information related to hopping included in "pusch-configdedicated" included in Physical config Dedicated" included in "Radio resource Configuration", as a specific example, "hopping-Mode" and "pusch-hopping Offset". Description is given with reference to FIG. 28, where the control information corresponding to the uplink components 2808, 2809 and 2810 that are included in the candidate component carrier set 2814 is notified in advance. Accordingly, even when the uplink scheduling components are changed from 2808 and 2809 to 2809 and 2810 shown in FIG. 28, the UE recognizes the control information of 2810 in advance.

Therefore, the use of the fourth embodiment achieves an effect that a UE is capable of control using the configuration information related to the PUSCH in 2810, as a specific example, "pusch-configdedicated" immediately after 2810 is included in the scheduling components.

The control information related to hopping cannot be accurately received unless a UE being a transmitter and a base station being a receiver perform transmission/reception by sharing the same recognition. In addition, hopping is introduced for alleviating an effect of frequency phasing.

Therefore, the use of the fourth embodiment achieves an effect that hopping control is enabled with the use of the control information related to hopping in 2810 immediately after 2810 is included in the scheduling components. This enables the transmission of the PUSCH using hopping in 2810 immediately after 2810 is included in the scheduling components, leading to an effect that the transmission of PUSCH resistant to frequency phasing is enabled. This leads to an effect that radio resources are effectively used.

With the use of the fourth embodiment, the base station notifies in advance the UE of the configuration information related to a radio resource corresponding to a component included in a candidate component carrier set, as a specific example, "Radio resource Configuration", the configuration information related to a physical layer included in "Radio resource Configuration", as a specific example, "Physical config Dedicated", or the configuration information related to the PUCCH included in "Physical config Dedicated" included in "Radio resource Configuration", as a specific example, "pucch-configdediated".

Description is given with reference to FIG. 28, where the control information corresponding to the uplink components 2808, 2809 and 2810 that are included in the candidate component carrier set 2814 is notified in advance. Accordingly, even when the uplink scheduling components are changed from 2808 and 2809 to 2809 and 2810 shown in FIG. 28, the UE recognizes the control information of 2810 in advance.

Therefore, the use of the fourth embodiment achieves an effect that a UE is capable of control using the configuration information related to the PUCCH in 2810, as a specific example, "pucch-configdedicated" immediately after 2810 is included in the scheduling components.

With the use of the fourth embodiment, the base station notifies in advance the UE of the configuration information related to a radio resource corresponding to a component included in a candidate component carrier set, as a specific example, "Radio resource Configuration", the configuration information related to a physical layer included in "Radio resource Configuration", as a specific example, "Physical config Dedicated", the configuration information related to a scheduling request included in "Physical config Dedicated" included in "Radio resource Configuration", as a specific example, "schedulingRequestconfig", or the resource information related to a scheduling request included in "schedulingRequestconfig" included in "Physical config Dedicated", as a specific example, "sr-PUCCH-ResoruceIndex".

Description is given with reference to FIG. 28, where the control information corresponding to the uplink components 2808, 2809 and 2810 that are included in the candidate component carrier set 2814 is notified in advance. Accordingly, even when the uplink scheduling components are changed from 2808 and 2809 to 2809 and 2810 shown in FIG. 28, the UE recognizes the control information of 2810 in advance.

The scheduling request is a signal for requesting uplink resource allocation to a base station by a UE. In a case where the UE requests uplink resource allocation, when allocation is not performed for the UE in response to the scheduling request, the UE is required to request uplink resource allocation by means of the RACH. In the uplink resource allocation request by means of the RACH, a control delay is increased compared with the uplink resource allocation request using a scheduling request.

Therefore, the use of the fourth embodiment enables to achieve an effect that the UE can perform control with the use of the configuration information related to a scheduling request in 2810, as a specific example, "schedulingRequest config" immediately after 2810 is included in the scheduling components. Along with this, the UE is capable of requesting uplink resource allocation using a scheduling request in 2803 immediately after being included in the scheduling component, achieving an effect that an increase in control delay can be prevented.

While the fourth embodiment has mainly described the downlink RRC message, the fourth embodiment is also applicable to the downlink MAC message, uplink RRC message and uplink MAC message.

In addition to the logical channels DCCH and CCCH, the logical channel MCCH and logical channel BCCH are mapped to the transport channel DL-SCH as the control information. The fourth embodiment is similarly applicable to the MCCH and BCCH.

First Modification of Fourth Embodiment

A problem to be solved in a first modification of the fourth embodiment is described.

In a case of using the solution of the fourth embodiment, in some cases, the component to be added to a candidate component carrier set needs to reserve a radio resource for the UE. In this case, at times, a radio resource for the UE is reserved also in the component where data transmission/reception is not practically performed between the UE and the base station. This causes a problem that radio resources are wasted.

Further, the UE is required to store the control information corresponding to the components included in the candidate component carrier set. The UE needs to reserve a large storage area for control information along with an increase of the components included in the candidate component carrier set, causing a problem of an increase in hardware of a UE, for example, memory and CPU or an increase in load of software of the UE.

The solution in the first modification of the fourth embodiment is described below.

Figure 30:
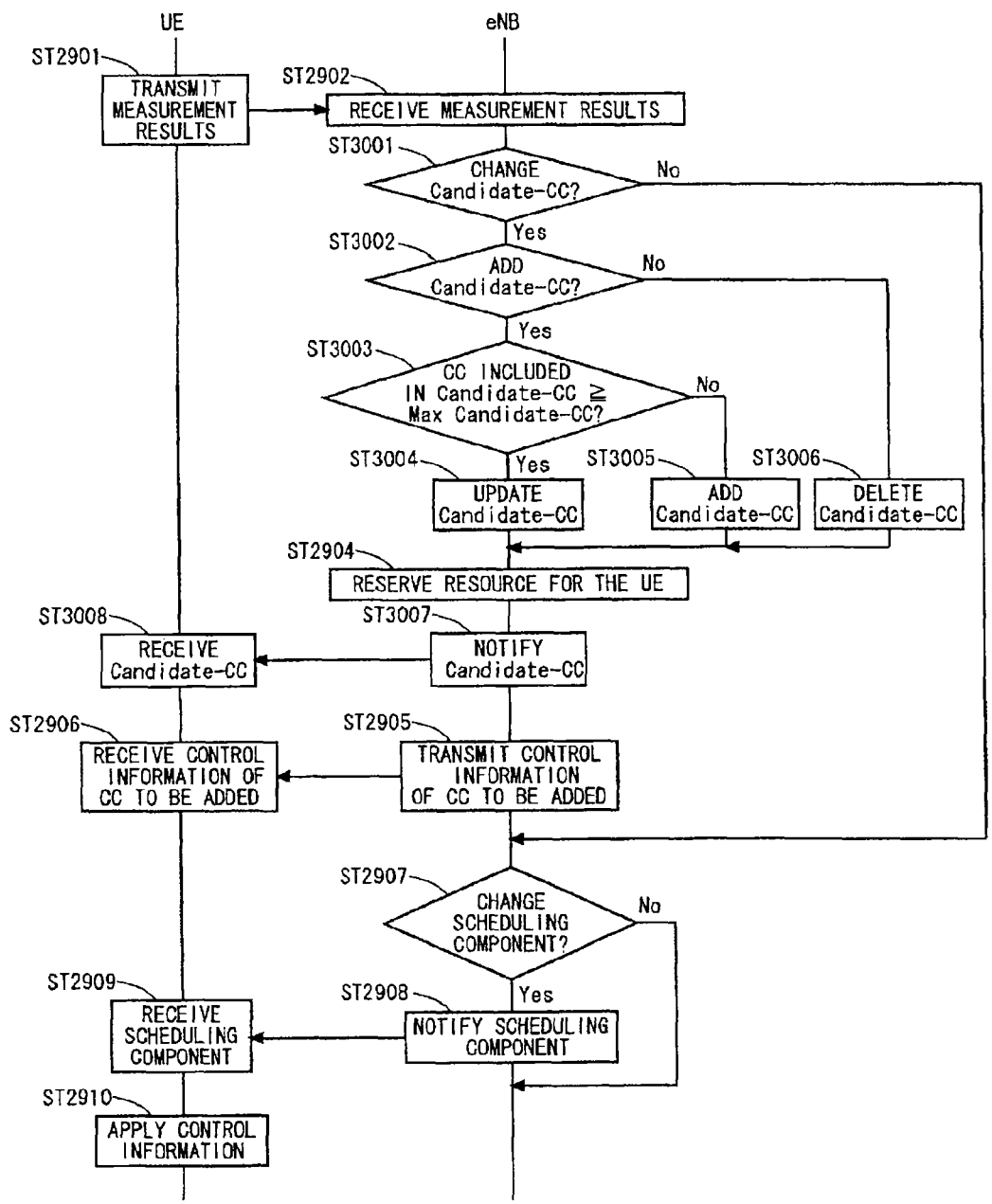
FIG. 30 is a sequence diagram showing the operation of a mobile communication system in a solution according to a first modification of the fourth embodiment.

An upper limit is provided to the number of components that can be included in a candidate component carrier set in the base station which supports to carrier aggregation. An example of the operation is shown in FIG. 30. The same reference symbols as those of FIG. 29 denote equivalent portions, and thus description thereof is omitted.

In Step ST3001, the base station judges whether or not it is required to change the candidate component carrier set corresponding to the UE based on the measurement results of the UE or CQI received in Step ST2902. In the case where a change is required, the base station moves to Step ST3002. In the case where a change is not required, the base station moves to Step ST2907.

The candidate component carrier sets may be provided separately for uplink and downlink. In the case where those are provided separately, the judgment of Step ST3001 may be performed separately for uplink and downlink. Alternatively/Further, in Step ST3001, the base station judges whether or not to newly create a candidate component carrier set for the UE. In the case of newly creating one, the base station moves to Step ST3003. In the case of not newly creasing one, the base station may move to Step ST2907.

In Step ST3002, the base station judges whether or not there is a component to be added to the components included in a candidate component carrier set based on the measurement results of a UE or CQI received in Step ST2902. In the case where there is a component to be added, the base station moves to Step ST3003. In the case where there is no component to be added, the base station moves to Step ST3006.

In Step ST3003, the base station judges whether or not the number of components included in the current candidate component carrier set is equal to or larger than the upper limit of the number of components that can be included in the candidate component carrier set. In the case where the number is equal to or larger than the upper limit, the base station moves to Step ST3004. In the case where the number is not equal to or larger than the upper limit, the base station moves to Step ST3005.

The upper limit may be determined in a static manner as a mobile communication system, may be determined in a static manner or semi-static manner per base station which supports to carrier aggregation, or may be determined in accordance with the capability of a UE. In the case where the upper limit is determined in accordance with the capability of a UE, the UE may notify the base station of the number of components that can be subjected to carrier aggregation, or a UE itself may determine an upper limit in accordance with the capability of a UE to notify the base station of the upper limit. In the case where an upper limit is determined in a static manner as a mobile communication system and in the case where an upper limit is determined in accordance with the capability of a UE, an upper limit can be provided to hardware or software in designing of a UE, leading to an effect that a UE is prevented from becoming complicated. In the case where an upper limit is determined in a static manner or semi-static manner per base station supports to carrier aggregation, the control can be performed in accordance with, for example, a load status of a radio resource of a base station, leading to an effect that a mobile communication system can be constructed flexibly. Conceivable specific examples of the capability of a UE include the size of a storage area (such as memory) for control information, a compliant release number and a compliant communication speed.

In Step ST3004, the base station adds a new component to the candidate component carrier set corresponding to the UE based on the measurement results of the UE or CQI received in Step ST2902, and deletes the component included in the candidate component carrier set. That is, the base station updates the component included in the candidate component carrier set.

In Step ST3005, the base station adds a new component to the candidate component carrier set corresponding to the UE based on the measurement results of the UE or CQI received in Step ST2902.

In Step ST3006, the base station deletes the component included in the candidate component carrier set corresponding to the UE based on the measurement results of the UE or CQI received in Step ST2902.

In Step ST3007, the base station notifies the UE of the components included in the candidate component carrier set. The base station may notify the information related to all components included in the candidate component after changing, or may notify the information related to the component for only an amount of a difference between before and after change. In the case where the information related to all components is notified, an effect of greater resistance to a radio communication error can be achieved. Alternatively, in the case where the information related to the component for only an amount of a difference between before and after change is notified, an amount of information to be notified can be reduced, leading to an effect that radio resources are effectively used. A specific example of the correspondence list, which shows results of association of the component indices and scheduling components in the third embodiment, can be used as the notification method. Therefore, description thereof is omitted.

In Step ST3008, the UE receives the components included in the candidate component carrier set from the base station.

The first modification of the fourth embodiment can be used in combination with the first embodiment, the second embodiment including modifications or the third embodiment.

Alternatively, whether the solutions of the first embodiment or the second embodiment, the solutions of the third embodiment or the first modification of the fourth embodiment is used may be discriminated depending on the control information of the RRC message or MAC message, or the contents of control. A specific example for discriminating the solutions is similar to that of the fourth embodiment, and thus description thereof is omitted.

In addition to the effects of the first embodiment, second embodiment, third embodiment and fourth embodiment, the following effects can be achieved by the first modification of the fourth embodiment.

An upper limit number of components included in a candidate component carrier set is determined, whereby it is possible to provide an upper limit to reserving of a radio resource for the UE in the component where data transmission/reception is not practically performed between the UE and the base station. This achieves an effect that radio resources are effectively used.

Further, an upper limit number of components included in the candidate component carrier set is determined, whereby the UE can provide an upper limit to the storage area for control information corresponding to the components included in the candidate component carrier set. This enables to provide an upper limit to hardware or software in designing of a UE, leading to an effect that the UE can be prevented from becoming complicated.

Second Modification of Fourth Embodiment

A problem to be solved by a second modification of the fourth embodiment is similar to that of the fourth embodiment, and thus description thereof is omitted.

A solution in the second modification of the fourth embodiment is described below.

In a base station supports to carrier aggregation, the control information corresponding to components included in a candidate component carrier set of a UE, as a specific example, the RRC message or MAC message is made common to the components included in the candidate component carrier set.

An example of the operation is similar to that of the fourth embodiment. Only a different portion is described with reference to FIG. 29.

In Step ST2904, the base station reserves a similar radio resource to that of the components included in the candidate component carrier set for the UE, in the component to be added to the candidate component carrier set. Specific examples of the radio resource to be reserved include a resource for a scheduling request.

The control information is common to the components included in the candidate component carrier set, and thus Step ST 2905 and Step ST2906 are not required. In the case where a candidate component carrier set is newly created for the UE, the base station transmits the control information related to a component to be added to the components included in the candidate component carrier set, as a specific example, the RRC message or MAC message.

The second modification of the fourth embodiment and the first modification of the fourth embodiment can be used in combination.

An example of the operation is similar to that of the first modification of the fourth embodiment. Only a different portion is described with reference to FIG. 30.

In Step ST2904, the base station reserves a similar radio resource to that of the components included in the candidate component carrier set for the UE, in the component to be added to the candidate component carrier set. Further, the base station makes open the radio resource for the UE in the component to be deleted from the candidate component carrier set. Specific examples of the radio resource required to be reserved include a resource for a scheduling request.

The second modification of the fourth embodiment can be used in combination with the first embodiment, the second embodiment including modification or the third embodiment.

Alternatively, whether the solutions of the first embodiment or the second embodiment, the solutions of the third embodiment or the second modification of the fourth embodiment is used may be discriminated depending on the control information of the RRC message or MAC message, or depending on the contents of control. A specific example for discriminating the solutions is similar to that of the fourth embodiment, and thus description thereof is omitted.

In addition to the effects of the first embodiment, second embodiment, third embodiment and fourth embodiment, the following effect can be achieved by the first modification of the fourth embodiment.

The control information for the components included in the candidate component carrier set of a UE is common to the components included in the candidate component carrier set, whereby it is possible to reduce the storage area for control information in the UE. This enables to reduce hardware or software in designing of a UE, leading to an effect that the UE can be prevented from becoming complicated.

Third Modification of Fourth Embodiment

A problem to be solved by a third modification of the fourth embodiment is described.

In the case where the solution of the fourth embodiment or the third modification of the fourth embodiment is used, in some cases, it is necessary to secure a radio resource for the UE in the component to be added to the candidate component carrier set. In this case, also in the component where data transmission/reception is not practically performed between a UE and a base station, the radio resource for the UE is secured at times. This causes a problem that radio resources are wasted.

A solution in the third modification of the fourth embodiment is descried below.

In a base station supports to carrier aggregation, a radio resource for a UE is reserved for a part of the components included in the candidate component carrier set or for a single component only. Alternatively, a radio resource for a UE is reserved for a part of the components included in the scheduling components or for a single component only.

Specific examples of the radio resource reserved for a UE in a base station supports to carrier aggregation include a resource for a scheduling request.

An anchor component is a specific example of a part of the components or one component included in a candidate component carrier set or a part of the components or one component included in the scheduling components.

In other words, in a base station supports to carrier aggregation, the component where a scheduling request is transmitted from a UE to a base station is a part of the components or a single component only included in the candidate component carrier set or a part of the components or a single component only included in the scheduling components.

The third modification of the fourth embodiment can be used in combination with the first embodiment, second embodiment including modifications, third embodiment or fourth embodiment including modifications.

The third modification of the fourth embodiment can achieve the following effect.

It is possible to reduce reserving of a radio resource for the UE in a component where data transmission/reception is not practically performed between a UE and a base station. This achieves an effect that radio resources can be effectively used.

Fifth Embodiment

A problem to be solved by a fifth embodiment is described.

As described in the first embodiment, carrier aggregation in reception and transmission on a plurality of component carriers, in reception only or in transmission only is supported in the LTE-A system.

As a specific example of the measurement required for a UE in performing carrier aggregation, 3GPP has discussed the following in a meeting (Non-Patent Document 14).

In order to support different coverages, there is a need to compare measurement objects on the same frequency with a configured component carrier. For the sake of convenience, this measurement is referred to as the first measurement. The first measurement can be used to know the best cell in a UE on a given frequency.

Figure 31:
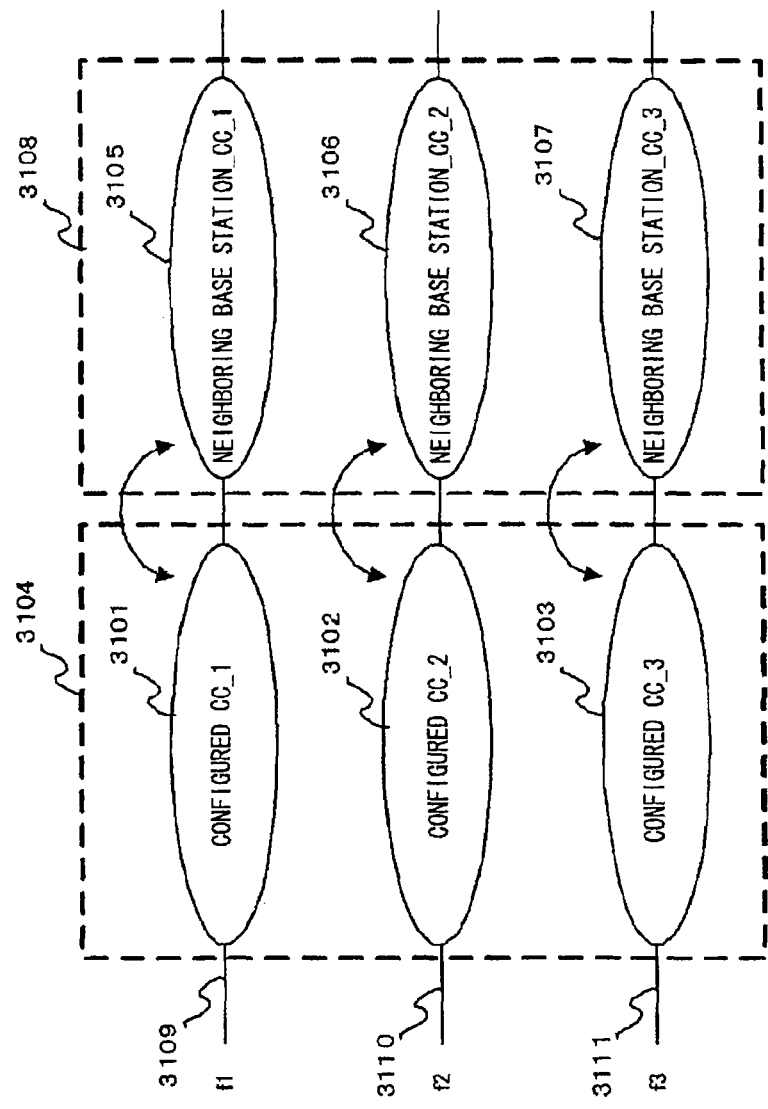
FIG. 31 is a conceptual diagram in a case where comparison is made between a set component carrier and a measurement object on the same frequency, which is currently under discussion of 3GPP.

A specific example is shown in FIG. 31. Suppose a case where a configured component carrier 1 (configured CC_1) 3101, a configured component carrier 2 (configured CC_2) 3102 and a configured component carrier 3 (CC_3) 3103 are present as the component carriers configured for a UE in a serving base station 3104 of the UE. In addition, suppose a case where a component carrier 1 (neighboring base station_CC_1) 3105, a component carrier 2 (neighboring base station_CC_2) 3106 and a component carrier 3 (neighboring base station_CC_3) 3107 are present in a neighboring base station 3108 of the UE. The configured CC_1 and the neighboring base station_CC_1 are present on the same frequency layer 3109 (f1). The configured CC_2 and the neighboring base station_CC_2 are present on the same frequency layer 3110 (f2). The configured CC_3 and the neighboring base station_CC_3 are present on the same frequency layer 3111 (f). In the first measurement, the measurement objects on the same frequency are compared with the configured component carrier. Specifically, the UE performs measurement of comparing the configured CC_1 being the configured component carrier and the neighboring base station_CC_1 present on the same frequency f1. The UE performs measurement of comparing the configured CC_2 being the configured component carrier and the neighboring base station_CC_2 present on the same frequency f2. The UE performs measurement of comparing the configured CC_3 being the configured component carrier and the neighboring base station_CC_3 present on the same frequency B.

It is required to compare the configured component carrier with a component carrier on a different frequency for supporting inter-base-station handover, inter-frequency handover and inter-system handover. For the sake of convenience, this measurement is referred to as the second measurement. A specific example is shown in FIG. 32.

Figure 32:
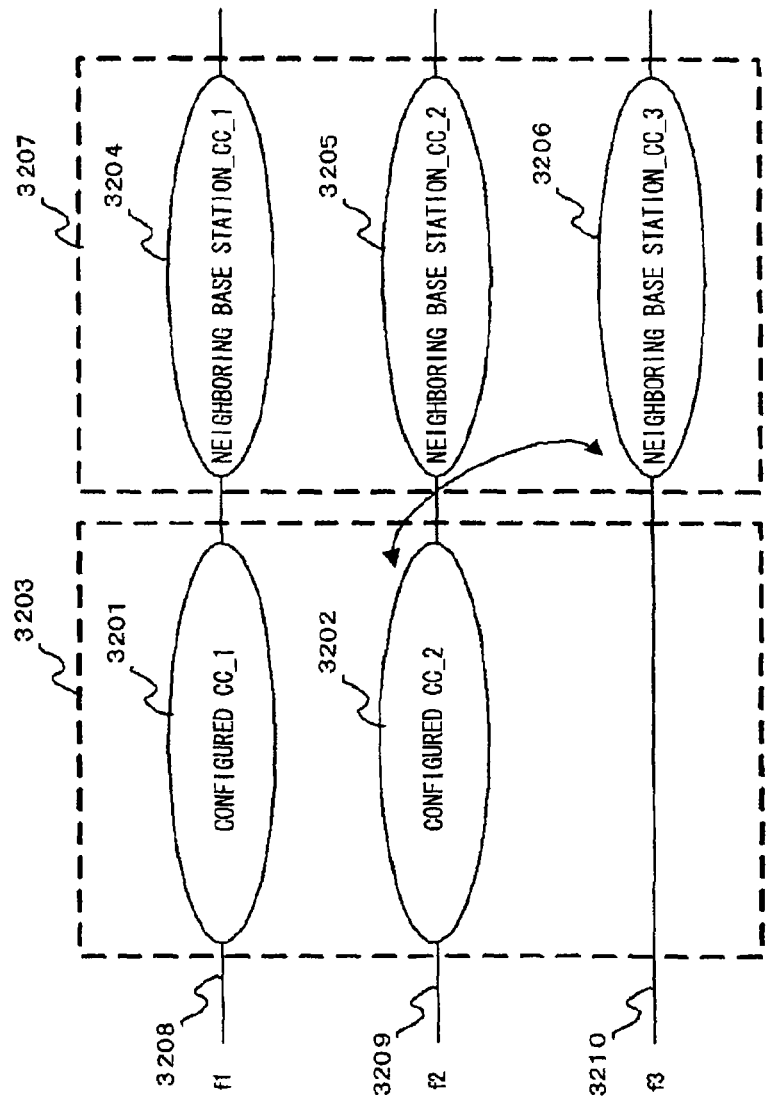
FIG. 32 is a conceptual diagram in a case where comparison is made between a set component carrier and a component carrier on different frequency, which is currently under discussion of 3GPP.

The specific example is shown in FIG. 32. Suppose a case where a configured component carrier (configured CC_1) 3201 and a configured component carrier 2 (configured CC_2) 3202 are present as component carriers configured for a UE in a serving base station 3203 of the UE. In addition, suppose a case where a component carrier 1 (neighboring base station_CC_1) 3204, a component carrier 2 (neighboring base station_CC_2) 3205 and a component carrier 3 (neighboring base station_CC_3) 3206 are present in a neighboring base station 3207 of the UE. The configured CC_1 and the neighboring base station_CC_1 are present on the same frequency layer 3208 (f1). The configured CC_2 and the neighboring base station_CC_2 are present on the same frequency layer 3209 (f2). The neighboring base station_CC_3 is present on the same frequency layer 3110 (f3). In the second measurement, measurement objects on a different frequency from that of the configured component carrier are compared. Specifically, the UE performs measurement of comparing the configured CC_2 being a configured component carrier on the frequency f2 and the neighboring base station_CC_3 present on the frequency f3 different from the frequency f2.

As to carrier aggregation, how to identify a measurement reference component carrier in a case where a plurality of component carrier are configured is discussed. The following is described as specific methods (Non-Patent Document 14).

In the first method, the measurement reference component carrier is configured by a network. No change is made without reconfiguration by the network. The component carrier is also referred to as a primary component carrier (PCC).

In the second method, the measurement reference component carrier is configured per measurement identity by a network. The measurement identity is described below in detail. However, specific configuration method is not disclosed.

In the third method, the measurement reference component carrier is made the best component carrier within the UE. This is autonomously updated by the UE and can be changed without reconfiguration by a network.

The following has been determined as to measurement in the current specifications of 3GPP (Non-Patent Document 15).

The network specifies a single E-UTRA carrier frequency as a measurement object for a UE. There is a list of measurement objects.

The network specifics reporting criterion, reporting format and the like that trigger the UE to transmit a measurement report by reporting configurations. The reporting format includes the number of cells to report. In addition, there is a list of reporting configurations.

The network links one measurement object with one reporting configuration by a measurement identity for a UE and specifies those. There is a list of measurement identities.

The UE provides a measurement report to the network. The measurement report includes the measurement identity that triggered the measurement report to be transmitted, the PCI of a neighboring cell, and the measurement results of a serving base station.

The UE manages one list of measurement objects, one list of reporting configurations and one list of measurement identities.

In the case of component carriers of the same base station, carrier aggregation of a different number of component carriers is supported between uplink and downlink (Non-Patent Document 16). For the sake of convenience, the above-mentioned carrier aggregation is referred to as asymmetric carrier aggregation.

Figure 33:
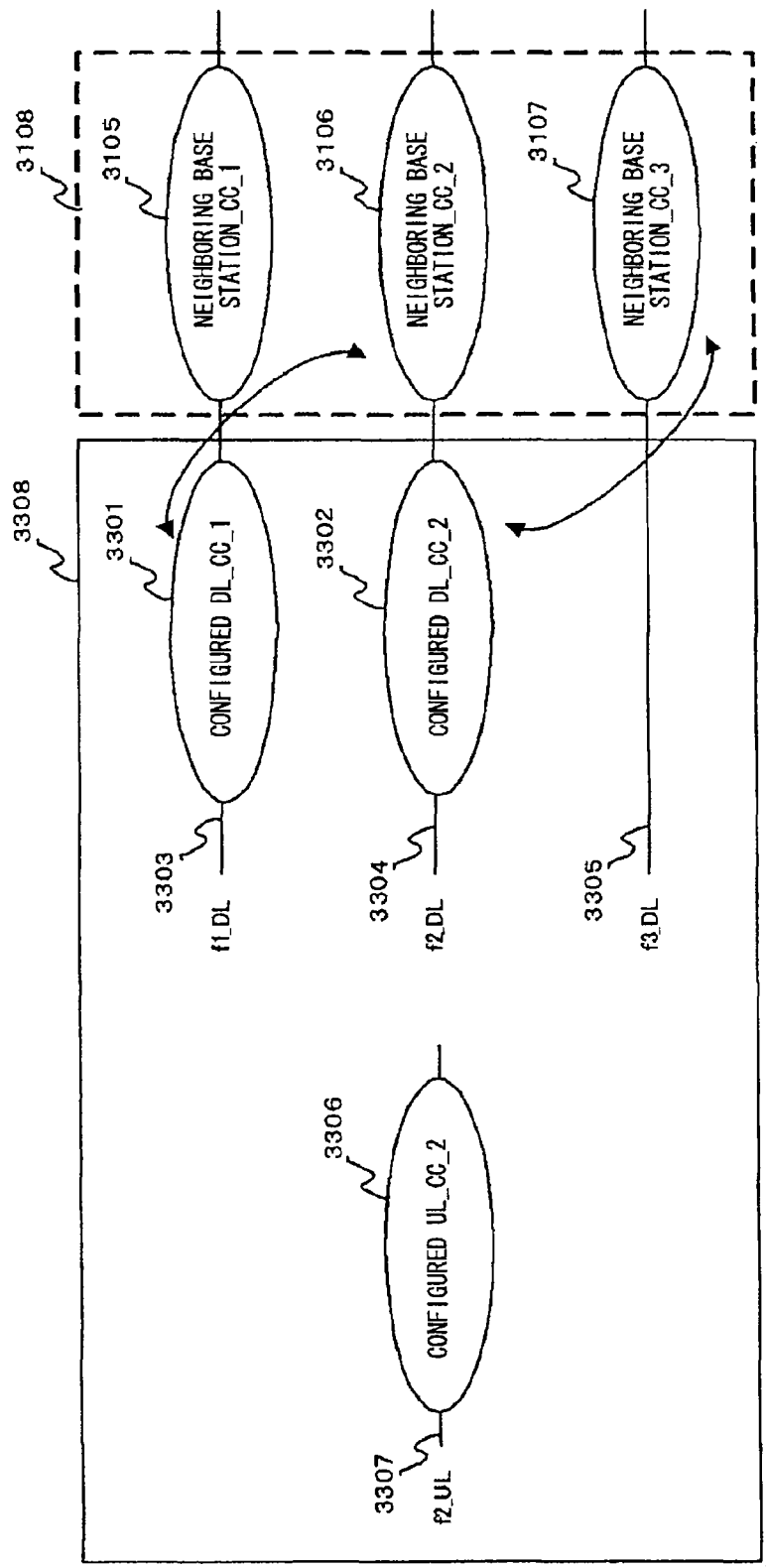
FIG. 33 is a conceptual diagram illustrating a problem to be solved by a fifth embodiment.

Suppose a case where asymmetric carrier aggregation is performed. The case of FIG. 33 is described as an example. The same reference symbols as those of FIG. 31 denote equivalent portions, and thus description thereof is omitted.

Suppose a case where a configured downlink component carrier (configured DL_CC_1) 3301 and a configured downlink component carrier 2 (configured DL_CC_2) 3302 are present as downlink component carriers configured for a UE in a serving base station 3308 of the UE. In addition, suppose a case where a configured uplink component carrier 2 (configured UL_CC_2) 3306 is present as the uplink component carrier set in the UE.

The configured DL_CC_1 and the neighboring base station_CC_1 are present on the same frequency layer 3303 (f1_DL). The configured DL_CC_2 and the neighboring base station_CC_2 are present on the same frequency layer 3304 (f2_DL). A configured DL_CC_3 and the neighboring base station_CC_3 are present on the same frequency layer 3305 (f3_DL). The configured UL_CC_2 is present on a frequency layer 3307 (f2_UL).

That is, the UE aggregates two component carriers on a receiver side and uses one uplink component carrier on a transmitter side. Therefore, the UE performs asymmetric carrier aggregation.

A problem to be solved by the fifth embodiment is described with reference to FIG. 33.

The case where the above-mentioned second measurement is performed is discussed with reference to FIG. 33. The UE compares the configured component carrier with a measurement object on a different frequency. Specifically, the UE performs measurement of comparing the configured DL_CC_1 being the configured downlink component carrier with the neighboring base station_CC_2 present on the different frequency f2_DL. For the sake of convenience, this is referred to as DL_CC_1 comparison measurement. Further, the UE performs measurement of comparing the configured DL_CC_2 being the configured downlink component carrier with the neighboring base station_CC_3 present on the different frequency f3_DL. For the sake of convenience, this is referred to as DL_CC_2 comparison measurement.

The UE is required to perform the above-mentioned two measurements to the network and provide measurement reports related to the DL_CC_1 comparison measurement and DL_CC_2 comparison measurement on one uplink component carrier (configured UL_CC_2). That is, the UE needs to notify the network of the comparison results of the configured DL_CC_1 and configured DL_CC_2 being two different measurement reference component carriers, on one uplink component carrier.

Accordingly, in a case where asymmetric carrier aggregation is performed, the network has no way to know a measurement reference component carrier even when the UE provides a measurement report to the network.

This causes a problem that mobility management such as handover and component carrier management such as addition, deletion or switch of component carriers cannot be performed properly as a mobile communication system.

Non-Patent Document 14, Non-Patent Document 15 and Non-Patent Document 16 do not point out this problem.

The above-mentioned problem arises even in a case where the method of Non-Patent Document 14 as to how to identify a measurement reference component carrier is applied.

In the LTE system, carrier aggregation is not supported. That is, uplink and downlink have one-to-one relation. Therefore, in a case where the UE provides a measurement report to the network, it is possible to implicitly show that the frequency of a measurement reference component carrier is the downlink carrier frequency of a pair with an uplink carrier frequency on which a measurement report is provided. In asymmetric carrier aggregation supported in the LTE-A system, on the other hand, the uplink and downlink do not have one-to-one relation, and thus the conventional method of implicitly showing a measurement reference cannot be used.

In the current specifications, the UE allows the measurement report for the network to include the measurement identity that triggered the transmission of a measurement report, the PCI of a neighboring cell, and the measurement results of a serving cell. The UE manages one list of measurement objects, one list of reporting configurations and one list of measurement identities. As described above, in the current specifications, the network that has received a measurement report in asymmetric carrier aggregation has no way to recognize a measurement reference component carrier.

As described above, the problem of the fifth embodiment does not arise in the LTE system, but a new problem arises in the system for supporting carrier aggregation, as a specific example, LTE-A system.

A solution in the fifth embodiment is described below.

A UE allows the measurement report to include the information of a measurement reference component carrier. Simultaneously, the UE may allow the measurement report to include the measurement identity that triggered the transmission of a measurement report, the PCI of a neighboring cell, and the measurement results of a serving cell, as in the conventional technique. The network performs mobility management, component carrier management or the like based on the measurement report. Specific examples of the entity of the network include a base station.

As specific examples of the types of measurement reference component carriers, five examples are disclosed below.

(1) A cell that has the best reception quality in a UE (best cell). The best cell may be selected from the configured component carriers. Alternatively, the best cell may be selected from scheduling component carriers. Still alternatively, the best cell may be selected from a candidate component carrier set.

(2) A cell that has the worst reception quality in a UE (worst cell). The worst cell may be selected from the configured component carriers. Alternatively, the worst cell may be selected from scheduling component carriers. Still alternatively, the worst cell may be selected from a candidate component carrier set.

(3) A configured component carrier corresponding to a measurement object. A configured component carrier on a carrier frequency specified by the measurement object. Non-Patent Document 17 proposes that the component carrier is referred to as a serving cell. Alternatively, it may be a scheduling component carrier on a carrier frequency specified by a measurement object. Still alternatively, it may be a candidate component carrier on a carrier frequency specified by a measurement object.

(4) A downlink component carrier where measurement configuration has been made.

(5) A measurement reference component carrier configured from a network to a UE. The information on one measurement reference component carrier is newly provided for a measurement configuration. The information on a measurement reference component carrier may be newly provided within a measurement object.

The following two examples are disclosed as specific examples of the information of a measurement reference component carrier. (1) A specific example of the "information indicating the control information corresponding to what component" of the first embodiment can be used. (2) PCI. Non-Patent Document 18 proposes that different PCIs are allocated even to the component carriers belonging to the same base station.

A UE may change the type of a measurement reference component carrier included in a measurement report per measurement configuration or measurement report triggering. The combination may be determined in a mobile communication system in a semi-static manner or in a static manner.

The following two examples are disclosed as specific examples of the configuration method in a case where determination is made in a semi-static manner. (1) Notification is made by means of the broadcast information. (2) Notification is made by a measurement configuration. The information indicating the combination of measurement report triggering and measurement reference component carrier type is newly provided in the measurement configuration. The information indicating a measurement reference component carrier type may be newly provided in the measurement configuration per measurement report triggering.

Conventional measurement report triggering, which is disclosed in Non-Patent Document 15, is described.

An event A1 refers to a fact that the reception quality of a serving cell becomes better than a threshold. Specifically, the condition for the event A1 to be satisfied is obtained when Expression (A1-1) below is fulfilled, while the condition for the event A1 to be satisfied is lost when Expression (A1-2) below is fulfilled.

$$Ms - Hys > Thresh \qquad \text{Expression (A1-1)}$$

The condition for the event A1 to be satisfied is obtained when a value obtained by subtracting a hysteresis value (Hys) from the reception quality (Ms, which is RSRP, RSRQ or the like) of the serving cell becomes better than the threshold (Thresh).

$$Ms+Hys<Thresh \quad \text{Expression (A1-2)}$$

The condition for the event A1 to be satisfied is lost when a value obtained by adding the hysteresis value (Hys) to the reception quality (Ms) of the serving cell becomes worse than the threshold (Thresh).

An event A2 refers to a fact that the reception quality of the serving cell becomes worse than a threshold. Specifically, the condition for the event A2 to be satisfied is obtained when Expression (A2-1) below is fulfilled, while the condition for the event A2 to be satisfied is lost when Expression (A2-2) below is satisfied.

$$Ms+Hys<Thresh \quad \text{Expression (A2-1)}$$

The condition for the event A2 to be satisfied is obtained when a value obtained by adding the hysteresis value (Hys) to the reception quality (Ms) of the serving cell becomes worse than the threshold (Thresh).

$$Ms-Hys>Thresh \quad \text{Expression (A2-2)}$$

The condition for the event A2 to be satisfied is lost when a value obtained by subtracting the hysteresis value (Hys) from the reception quality (Ms) of the serving cell becomes better than the threshold (Thresh).

An event A3 refers to a fact that the reception quality of a neighboring cell becomes better than the reception quality of the serving cell. Specifically, the condition for the event A3 to be satisfied is obtained when Expression (A3-1) below is fulfilled, while the condition for the event A3 to be satisfied is lost when Expression (A3-2) below is fulfilled.

$$Mn+Ofn+Ocn-Hys>Ms+Ofs+Ocn+Off \quad \text{Expression (A3-1)}$$

The condition for the event A3 to be satisfied is obtained when a value obtained by adding a frequency specific offset value (Ofn) of a neighboring cell to the reception quality (Mn) of the neighboring cell, adding a cell specific offset value (Ocn) of the neighboring cell thereto and subtracting a hysteresis value (Hys) therefrom becomes better than a value obtained by adding a frequency specific offset value (Ofs) of the serving cell to the reception quality (Ms) of the serving cell, adding a cell specific offset value (Ocs) of the serving cell thereto and adding an offset value (Off) of this event thereto.

$$Mn+Ofn+Ocn+Hys<Ms+Ofs+Ocn+Off \quad \text{Expression (A3-2)}$$

Meanwhile, the condition for the event A3 to be satisfied is lost when a value obtained by adding the frequency specific offset value (Ofn) of a neighboring cell to the reception quality (Mn) of the neighboring cell, adding the cell specific offset value (Ocn) of the neighboring cell thereto and adding the hysteresis value (Hys) thereto becomes worse than a value obtained by adding the frequency specific offset value (Ofs) of the serving cell to the reception quality (Ms) of the serving cell, adding the cell specific offset value (Ocs) of the serving cell thereto and adding the offset value (Off) of this event thereto.

An event A4 refers to a fact that the reception quality of a neighboring cell becomes better than a threshold. Specifically, the condition for the event A4 to be satisfied is obtained when Expression (A4-1) below is fulfilled, while the condition for the event A4 to be satisfied is lost when Expression (A4-2) below is fulfilled.

$$Mn+Ofn+Ocn-Hys>Thresh \quad \text{Expression (A4-1)}$$

The condition for the event A4 to be satisfied is obtained when a value obtained by adding the frequency specific offset value (Ofn) of the neighboring cell to the reception quality (Mn) of the neighboring cell, adding the cell specific offset value (Ocn) of the neighboring cell thereto and subtracting the hysteresis value (Hys) therefrom becomes better than a threshold (Thresh).

$$Mn+Ofn+Ocn+Hys<Thresh \quad \text{Expression (A4-2)}$$

Meanwhile, the condition for the event A4 to be satisfied is lost when a value obtained by adding the frequency specific offset value (Ofn) of the neighboring cell to the reception quality (Mn) of the neighboring cell, adding the cell specific offset value (Ocn) of the neighboring cell thereto and adding the hysteresis value (Hys) thereto becomes worse than the threshold (Thresh).

An event A5 refers to a fact that the reception quality of the serving cell becomes worse than a threshold 1 and that the reception quality of the neighboring cell becomes better than a threshold 2. Specifically, the condition for the event A5 to be satisfied is obtained when Expression (A5-1) and Expression (A5-2) below are fulfilled, while the condition for the event A5 to be satisfied is lost when Expression (A5-3) or expression (A5-4) below is fulfilled.

$$Ms+Hys<Thresh1 \quad \text{Expression (A5-1)}$$

The condition for Expression (A5-1) to be satisfied is obtained when a value obtained by adding the hysteresis value (Hys) to the reception quality (Ms) of the serving cell becomes worse than the threshold 1 (Thresh1).

$$Mn+Ofn+Ocn-Hys>Thresh2 \quad \text{Expression (A5-2)}$$

The condition for Expression (A5-2) to be satisfied is obtained when a value obtained by adding the frequency specific offset value (Ofn) of the neighboring cell to the reception quality (Mn) of the neighboring cell, adding the cell specific offset value (Ocn) of the neighboring cell thereto and subtracting the hysteresis value (Hys) therefrom becomes better than the threshold 2 (Thresh2).

$$Ms-Hys>Thresh1 \quad \text{Expression (A5-3)}$$

The condition for the event A5 to be satisfied is lost when a value obtained by subtracting the hysteresis value (Hys) from the reception quality (Ms) of the serving cell becomes better than the threshold 1 (Thresh1).

$$Mn+Ofn+Ocn+Hys<Thresh2 \quad \text{Expression (A5-4)}$$

The condition for the event A5 to be satisfied is lost when a value obtained by adding the frequency specific offset value (Ofn) of the neighboring cell to the reception quality (Mn) of the neighboring cell, adding the cell specific offset value (Ocn) of the neighboring cell thereto and adding the hysteresis value (Hys) thereto becomes worse than the threshold 2 (Thresh2).

An event B1 refers to a fact that the reception quality of a neighboring cell in a different system becomes better than a threshold. Conceivable examples of a different system include UTRA and CDMA2000. Specifically, the condition for the event B1 to be satisfied is obtained when Expression (B1-1) below is fulfilled, while the condition for the event B1 to be satisfied is lost when Expression (B1-2) below is fulfilled.

$$Mn+Ofn-Hys>Thresh \quad \text{Expression (B1-1)}$$

The condition for the event B1 to be satisfied is obtained when a value obtained by adding the frequency specific offset value (Ofn) of the neighboring cell to the reception quality (Mn) of the neighboring cell in UTRA or CDMA2000 being a different system and subtracting the hysteresis value (Hys) therefrom becomes better than the threshold (Thresh).

$$Mn+Ofn+Hys>\text{Thresh} \quad \text{Expression (B1-2)}$$

The condition for the event B1 to be satisfied is lost when a value obtained by adding the frequency specific offset value (Ofn) of the neighboring cell to the reception quality (Mn) of the neighboring cell in UTRA or CDMA2000 being a different system and adding the hysteresis value (Hys) thereto becomes worse than the threshold (Thresh).

An event B2 refers to a fact that the reception quality of the serving cell becomes worse than the threshold 1 and that the reception quality of the neighboring cell in a different system becomes better than the threshold 2. Conceivable examples of a different system include UTRA and CDMA2000. Specifically, the condition for the event B2 to be satisfied is obtained when Expression (B2-1) and Expression (B2-2) below are fulfilled, while the condition for the event B2 to be satisfied is lost when Expression (B2-3) or Expression (B2-4) below is fulfilled.

$$Ms+Hys<\text{Thresh1} \quad \text{Expression (B2-1)}$$

The condition for Expression (B2-1) to be satisfied is obtained when a value obtained by adding the hysteresis value (Hys) to the reception quality (Ms) of the serving cell becomes worse than the threshold 1 (Thresh1).

$$Mn+Ofn-Hys>\text{Thresh2} \quad \text{Expression (B2-2)}$$

The condition for Expression (B2-2) to be satisfied is obtained when a value obtained by adding the frequency specific offset value (Ofn) of the neighboring cell to the reception quality (Mn) of the neighboring cell of UTRA or CDMA2000 being a different system and subtracting the hysteresis value (Hys) therefrom becomes better than the threshold 2 (Thresh2).

$$Ms-Hys>\text{Thresh1} \quad \text{Expression (B2-3)}$$

The condition for the event B2 to be satisfied is lost when a value obtained by subtracting the hysteresis value (Hys) from the reception quality (Ms) of the serving cell becomes better than the threshold 1 (Thresh1).

$$Mn+Ofn+Hys<\text{Thresh2} \quad \text{Expression (B2-4)}$$

The condition for the event B2 to be satisfied is lost when a value obtained by adding the frequency specific offset value (Ofn) of the neighboring cell to the reception quality (Mn) of the neighboring cell in UTRA or CDMA2000 being a different system and adding the hysteresis value (Hys) thereto becomes worse than the threshold 2 (Thresh2).

An event A3-bis disclosed in Non-Patent Document 14 refers to a fact that the reception quality of the neighboring cell on a frequency different from that of the serving cell becomes better than the reception quality of the serving cell.

Specific examples of the combination of measurement report triggering and the type of a measurement reference component carrier that is included in a measurement report by a UE are described below.

(1) As to the event A2, the specific example (2) of the types of measurement reference component carriers is used. This allows the network to recognize that the reception quality of the measurement reference component carrier in the UE becomes worse than a threshold. This enables appropriate component carrier management such as deletion of the measurement reference component carrier from the configured component carrier. Alternatively, appropriate component carrier management can be performed, such as deletion of the measurement reference component carrier from a scheduling component carrier. Still alternatively, appropriate component carrier management can be performed, such as deletion of the measurement reference component carrier from a candidate component carrier.

(2) As to the event A3, the specific example (2) of the types of measurement reference component carriers is used. This allows the network to recognize that there is a good neighboring cell from the reception quality of the measurement reference component carrier in the UE. This enables appropriate component carrier management such as deletion of the measurement reference component carrier from the configured component carrier and addition of the neighboring cell to the configured component carrier, that is, switch of component carriers. Alternatively, appropriate component carrier management can be performed, such as deletion of the measurement reference component carrier from a scheduling component carrier and addition of the neighboring cell to the scheduling component carrier, that is, switch of component carriers. Still alternatively, appropriate component carrier management can be performed, such as deletion of the measurement reference component carrier from a candidate component carrier and addition of the neighboring cell to the candidate component carrier, that is, switch of component carriers. Yet still alternatively, appropriate mobility management can be performed, such as handover to the neighboring cell.

(3) As to the event A5, the specific example (2) of the types of measurement reference component carriers is used. Detailed description thereof is similar to that of the event A3, which is omitted.

(4) As to the event B2, the specific example (2) of the types of measurement reference component carriers is used. Detailed description thereof is similar to that of the event A3, which is omitted.

(5) As to the event A3-bis, the specific example (2) of the types of measurement reference component carriers is used. Detailed description thereof is similar to that of the event A3, which is omitted.

Figure 34:
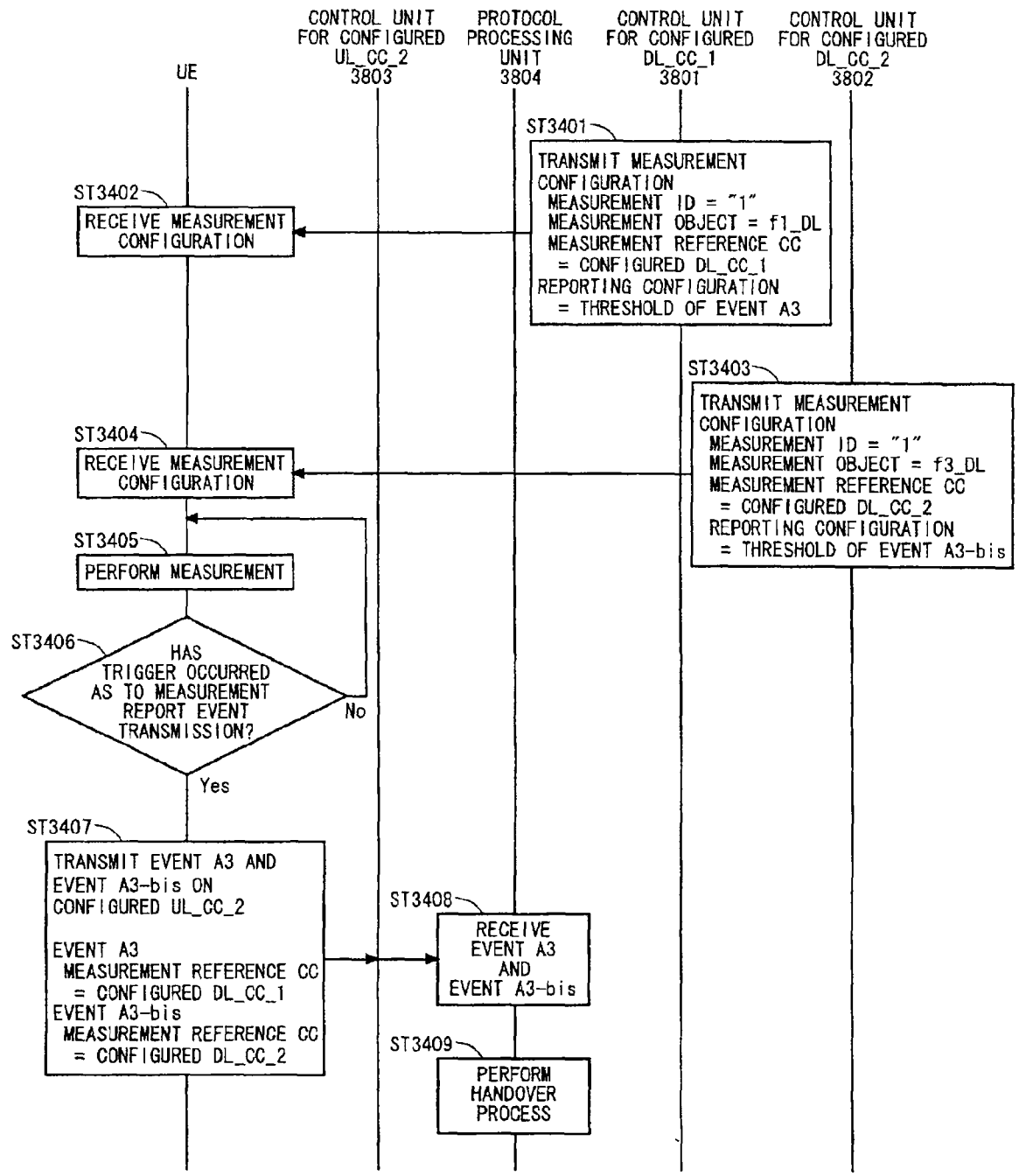
FIG. 34 is a sequence diagram showing the operation of a mobile communication system in a solution according to the fifth embodiment.

FIG. 34 shows an example of the operation. In this operation example, the specific example (5) is used for the type of a measurement reference component carrier. Further, the specific example (2) is used for the information of a measurement reference component carrier.

Figure 35:
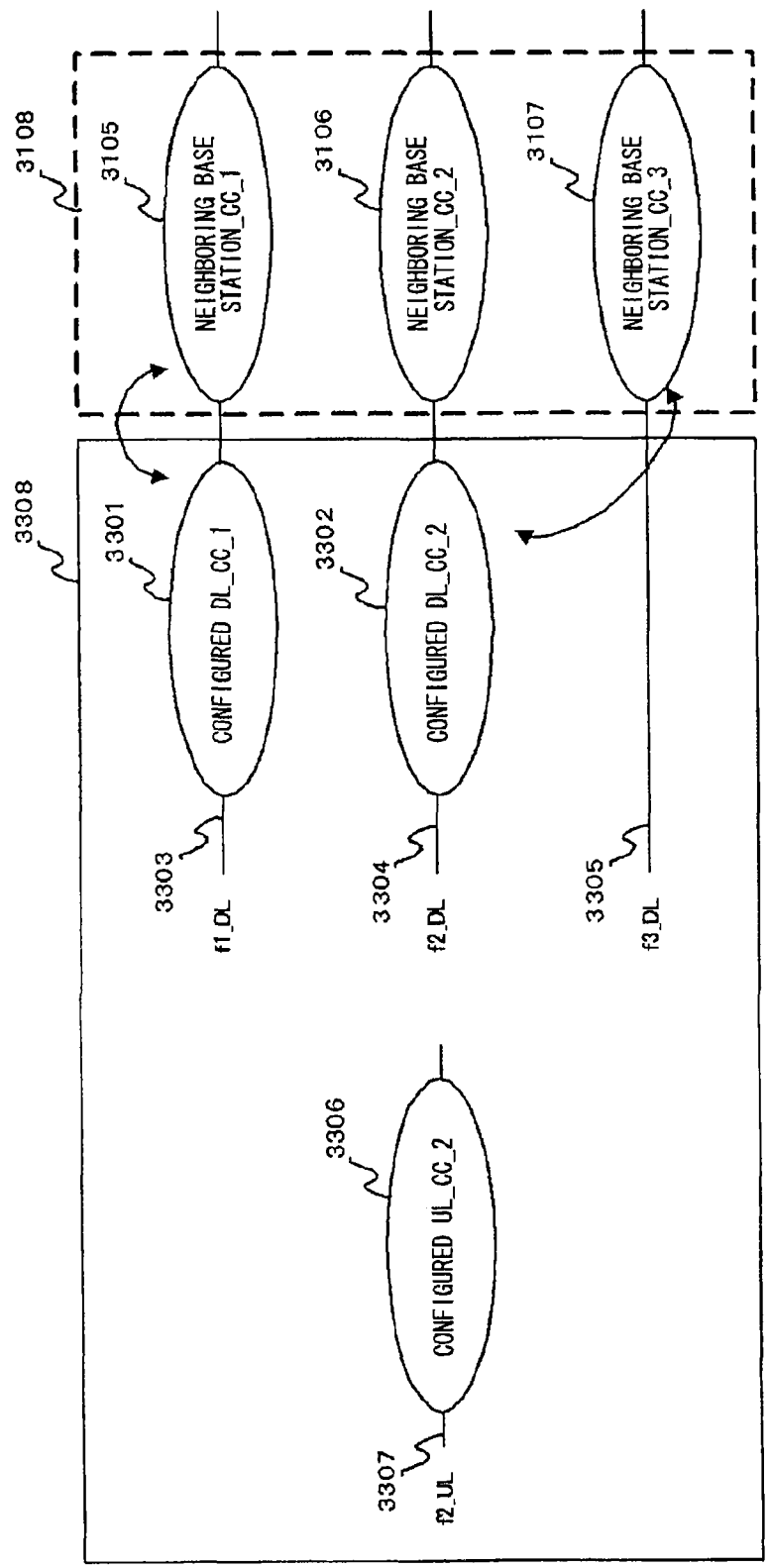
FIG. 35 is a conceptual diagram showing the state of a serving base station and a neighbor base station in the solution according to the fifth embodiment.

FIG. 35 shows the state of the serving base station and the neighboring base station. The same reference symbols as those of FIG. 33 denote equivalent portions, and thus description thereof is omitted.

FIG. 35 shows the case where the reception quality of the 3105 neighboring base station_CC_1 becomes better than the reception quality of the 3301 configured DL_CC_1 and the reception quality of the 3107 neighboring base station_CC_3 becomes better than the reception quality of the 3302 configured DL_CC_2.

Figure 38:
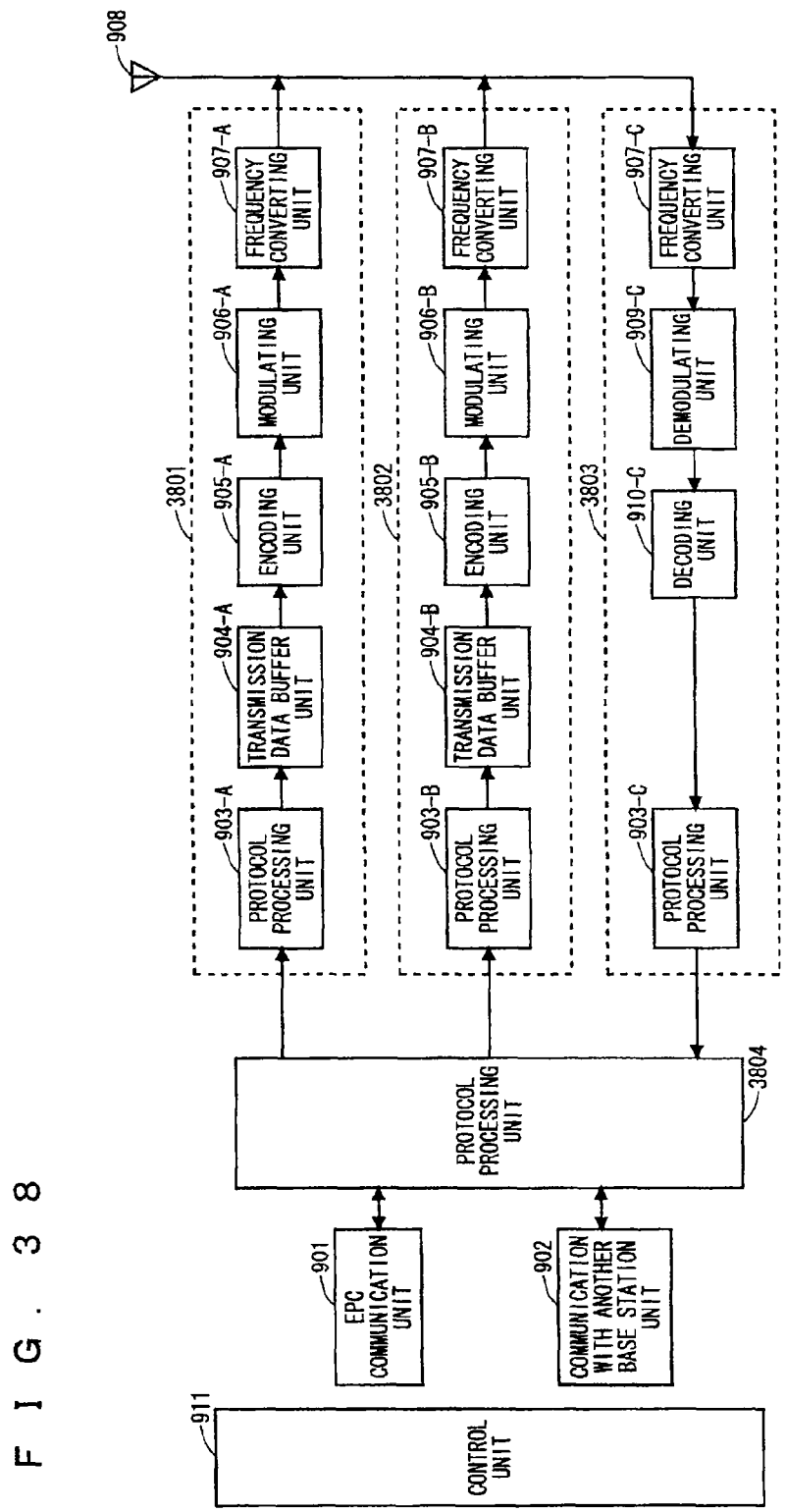
FIG. 38 is a block diagram showing the configuration of a base station 3308 in the solution according to the fifth embodiment.

FIG. 38 is a block diagram showing a configuration example of the base station (for example, base station 3308 of FIG. 35) according to the present embodiment. The same reference symbols as those of FIG. 9 denote equivalent portions, and thus description thereof is omitted. A control unit for downlink component A 3801 controls one downlink component. The control unit for downlink component A 3801 includes a protocol processing unit 903-A for downlink component A, a transmission data buffer unit 904-A for downlink component A, an encoding unit 905-A for downlink component A, a modulating unit 906-A for downlink component A and a frequency converting unit 907-A for downlink component A. Alternatively, the control unit for downlink component A 3801 may include the protocol processing unit 903-A for downlink component A and the frequency converting unit 907-A for downlink component A. Still alternatively, the control unit for downlink component A 3801 may include the control protocol processing unit 903-A for downlink component A. For example, in a case where the 3301 configured DL_CC_1 (f1_DL) is configured as the frequency for downlink component A by the frequency converting unit 907-A, the control unit for downlink component A 3801 serves as the control unit for configured DL_CC_1.

A control unit for downlink component B 3802 controls one downlink component. The control unit for downlink component B 3802 includes a protocol processing unit 903-B for downlink component B, a transmission data buffer unit 904-B for downlink component B, an encoding unit 905-B for downlink component B, a modulating unit 906-B for downlink component B and a frequency converting unit 907-B for downlink component B. Alternatively, the control unit for downlink component B 3802 may include the protocol processing unit 903-B for downlink component A and the frequency converting unit 907-B for downlink component B. Still alternatively, the control unit for downlink component B 3802 may include the protocol processing unit 903-B for downlink component B. For example, in a case where the 3302 configured DL_CC_2 (f2_DL) is configured as the frequency for downlink component B by the frequency converting unit 907-B, the control unit for downlink component B 3802 serves as the control unit for configured DL_CC_2.

While this configuration example has described the case of two control units for downlink component, the case of one or three or more control units for downlink component is also conceivable.

A control unit for uplink component C 3803 controls one uplink component. The control unit for uplink component C 3803 includes a protocol processing unit 903-C for uplink component C, a decoding unit 910 for uplink component C, a demodulating unit 909-C for uplink component C and a frequency converting unit 907-C for uplink component C. Alternatively, the control unit for uplink component C 3803 may include the protocol processing unit 903-C for uplink component C and the frequency converting unit 907-C for uplink component C. Still alternatively, the control unit for uplink component C 3803 may include the protocol processing unit 903-C for uplink component C. For example, in a case where the 3306 configured UL_CC_2 (f2_UL) is configured as the frequency for uplink component C by the frequency converting unit 907-C, the control unit for uplink component C 3803 serves as the control unit for configured UL_CC_2.

While this configuration example has described the case of one control unit for uplink component, the case of two or more control units is also conceivable.

A protocol processing unit 3804 performs protocol processing of the entire base station. For example, the protocol processing unit 3804 performs protocol processing so as to cover the respective control units for components, cover uplink and downlink, or adjust the respective components.

In Step ST3401, the control unit for configured DL_CC_1 (3301) 3801 notifies a UE of the measurement configuration. The measurement configuration includes a measurement object, a reporting configuration, and a measurement identity for linking a measurement object with a reporting configuration. In this operation example, f1_DL and the PCI of the configured DL_CC_1 (3301) are included as a measurement object and a measurement reference component carrier, respectively. The threshold of the event A3 is included as a reporting configuration. A measurement ID "1" is included as the measurement identity. The measurement object f1_DL is linked with the reporting configuration event A3 by the measurement ID "1". Alternatively, the measurement configuration may be notified by means of the frequency layer 3303 (f1_DL). Still alternatively, the measurement configuration may be notified by means of the configured downlink component carrier 1 (configured DL_CC_1) 3301.

In Step ST3402, the UE receives the measurement configuration from the control unit for configured DL_CC_1 (3301) 3801.

In Step ST3403, the control unit for configured DL_CC_2 (3302) 3802 notifies the UE of the measurement configuration. The measurement configuration includes a measurement object, a reporting configuration, and a measurement identity for linking a measurement object with a reporting configuration. In this operation example, f3_DL and the PCI of the 3302 configured DL_CC_2 are included as a measurement object and a measurement reference component carrier, respectively. The threshold of the event A3-bis is included as a reporting configuration. A measurement ID "1" is included as the measurement identity. The measurement object f3_DL is linked with the reporting configuration event A3-bis by the measurement ID "1". Alternatively, the measurement configuration may be notified by means of the frequency layer 3304 (f2 DL). Still alternatively, the measurement configuration may be notified by means of the configured downlink component carrier 2 (configured DL_CC_2) 3302.

In Step ST3404, the UE receives the measurement configuration from the control unit for configured DL_CC_2 (3302) 3802.

In Step ST3405, the UE performs measurement in accordance with the measurement configurations received in Step ST3402 and Step ST3404.

In Step ST3406, the UE judges whether or not a trigger has occurred as to the measurement report event transmission, based on the measurement configurations received in Step ST3402 and Step ST3404. In this operation example, the case where the reception quality of the neighboring base station_CC_1 (3105) becomes better than the reception quality of the configured DL_CC_1 (3301) is described, and thus the UE judges that a trigger has occurred as to event A3 transmission. Further, the case where the reception quality of the neighboring base station_CC_3 (3107) becomes better than the reception quality of the configured DL_CC_2 (3302) is described, and thus the UE judges that a trigger has occurred as to event A3-bis transmission.

In Step ST3407, the UE provides a measurement report that the event A3 and the event A3-bis have occurred to the base station by means of the configured UL_CC_2 (3306). The measurement report is notified to the protocol processing unit 3804 through the control unit 3803 for configured UL_CC_2 (3306). The measurement report includes the information of the measurement reference component carrier. Specifically, the measurement report of the event A3 includes the PCI of the configured DL_CC_1 (3301), the measurement ID "1" and the PCI of the neighboring base station_CC_1 (3105). The measurement report of the event A3-bis includes the PCI of the configured DL_CC_2 (3302), the measurement ID "1" and the PCI of the neighboring base station_CC_3 (3107).

In Step ST3408, the protocol processing unit 3804 receives the measurement report from the UE. The information of the measurement reference component carrier is included per measurement report, and accordingly the base station can know the measurement reference component carrier per measurement even in a case where asymmetric carrier aggregation has been performed.

In Step ST3409, the base station 3308 (protocol processing unit 3804) performs handover process based on the measurement report received in Step ST3408.

The fifth embodiment can achieve the following effect.

The network is allowed to recognize the measurement reference component carrier even in a case where asymmetric carrier aggregation has been performed. This enables to appropriately perform, for example, mobility management such as handover and component carrier management such as addition, deletion or switch of component carriers, as a mobile communication system. Accordingly, an effect that radio resources are effectively used can be achieved.

First Modification of Fifth Embodiment

A problem to be solved by a first modification of the fifth embodiment is similar to that of the fifth embodiment, and description thereof is omitted.

A solution in the first modification of the fifth embodiment is described below.

Different portions from those of the fifth embodiment are described below. Portions that are not particularly described are similar to those of the fifth embodiment.

In the case of providing a measurement report, the UE notifies the information indicating that the RRC message including a measurement report is the control information corresponding to what downlink component carrier, with the use of the third solution of the first embodiment. Further, the UE may include the measurement identity that has triggered a measurement report to be transmitted, the PCI of a neighboring cell, the measurement results of a serving cell and the like in the measurement report as in the conventional technique. The network performs mobility management, component carrier management and the like based on the measurement report. Specific examples of the entity of the network include a base station.

The UE manages one list of measurement objects, one list of reporting configurations and one list of measurement identities per downlink component carrier where measurement configuration has been performed. This makes it easier for the UE to perform measurement per downlink component carrier, leading to an effect that the information indicating that the RRC message containing a measurement report is the control information corresponding to what downlink component carrier can be added more easily. Alternatively, the UE may manage a plurality of lists of measurement objects, a plurality of lists of reporting configurations and a plurality of lists of measurement identities. The "plurality of" may be the number of component carriers that have been configured, the number of scheduling component carriers, or the number of candidate component carriers.

Specific examples of the types of measurement reference component carriers are similar to those of the fifth embodiment, and thus description thereof is omitted.

Specific examples of the information of measurement reference component carriers are similar to those of the fifth embodiment, and thus description thereof is omitted.

An example of the operation is similar to that of the fifth embodiment, and thus description thereof is omitted.

The first modification of the fifth embodiment can achieve a similar effect to that of the fifth embodiment.

Second Modification of Fifth Embodiment

A problem to be solved by a second modification of the fifth embodiment is similar to that of the fifth embodiment, and thus description thereof is omitted.

A solution in the second modification of the fifth embodiment is described below.

Different portions from those of the fifth embodiment are descried below. Portions that are not particularly described are similar to those of the fifth embodiment.

A measurement configuration is made by means of one downlink component carrier.

The information on a measurement reference component carrier is newly provided to a measurement configuration. There may be a list of measurement reference component carriers. The block (as a specific example, protocol processing unit 3804 of FIG. 38) that adjusts respective components within a base station or one downlink component carrier for configuring a measurement links one measurement reference component carrier and, one measurement object and one reporting configuration together by a measurement identity. One block within the base station or one downlink component carrier performs the linking, which makes it easier to allocate measurement identities without being overlapped.

As in the conventional technique, the UE includes the measurement identity that has triggered a measurement report to be transmitted, the PCI of a neighboring cell and measurement results of a serving cell in the measurement report. The network performs mobility management, component carrier management and the like based on the measurement report. Specific examples of the entity of the network include a base station.

The UE may manage one list of measurement objects, one list of reporting configurations, one list of measurement reference component carriers and one list of measurement identities.

The UE may provide a measurement report using an uplink component carrier that forms a pair with one downlink component carrier for configuring measurement.

Eight specific examples of one downlink component carrier are disclosed below. (1) Carrier for notifying a paging message. (2) Carrier for notifying broadcast information for carrier aggregation or LTE-A system. (3) Carrier for notifying the UE of scheduling results by means of the PDCCH. (4) Downlink frequency carrier in a multicarrier anchor. (5) PCC. (6) Anchor component carrier. (7) Downlink frequency carrier in a special cell. (8) Combination of (1) to (7) above.

Specific examples of the information of measurement reference component carriers are similar to those of the fifth embodiment, and thus description thereof is omitted.

Figure 36:
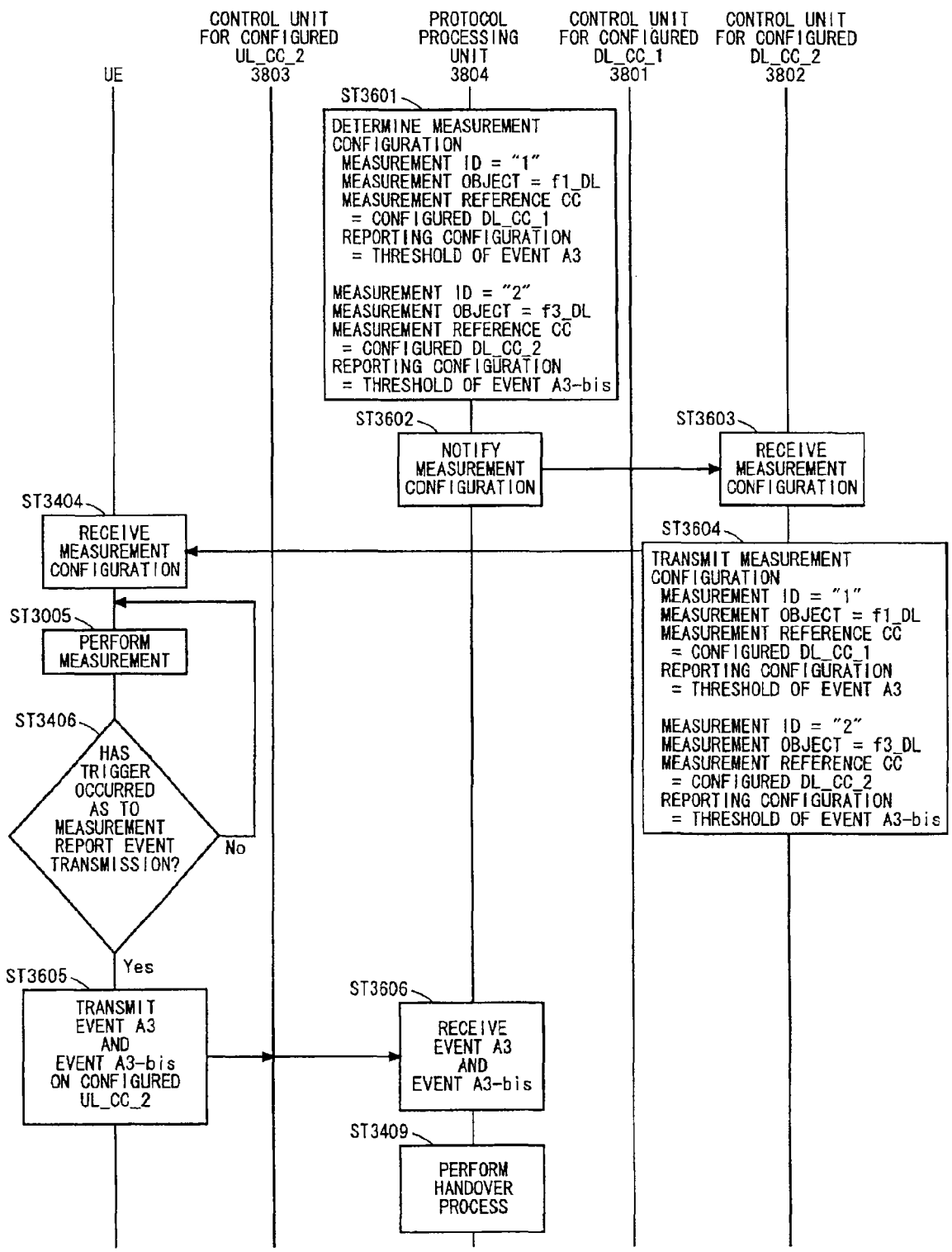
FIG. 36 is a sequence diagram showing the operation of a mobile communication system in a solution according to a second modification of the fifth embodiment.

FIG. 36 shows an example of the operation. The same reference symbols as those of FIG. 34 denote equivalent portions, and thus description thereof is omitted. FIG. 35 shows the state of a serving base station and a neighboring base station. FIG. 35 shows the case where the reception quality of the neighboring base station_CC_1 (3105) becomes better than the reception quality of the configured DL_CC_1 (3301) and the reception quality of the neighboring base station_CC_3 (3107) becomes better than the reception quality of the configured DL_CC_2 (3302). One downlink component carrier for configuring measurement of the base station 3308 is denoted by the configured DL_CC_2 (3302). FIG. 38 is a block diagram showing the configuration example of the base station (for example, base station 3308 of FIG. 35) according to the present embodiment.

In Step ST3601, the protocol processing unit 3804 links one measurement reference component carrier, one measurement object and one reporting configuration together. In this operation example, linking is performed in the following two fashions. (1) The configured DL_CC_1 (3301) as a measurement reference component carrier of the measurement ID "1", the f1_DL (3303) as a measurement object and the reporting configuration including the threshold of the event A3 are linked together. (2) The configured DL_CC_2 (3302) as the measurement reference component carrier of the measurement ID "2", the f3_DL (3305) as a measurement object and the reporting configuration including the threshold of the event A3-bis are linked together.

In Step ST3602, the protocol processing unit 3804 notifies the control unit for the configured DL_CC_2 (3302) 3802 being one downlink component carrier that configures measurement of the results of linking performed in Step ST3601 (hereinafter, referred to as "all CC measurement configurations"). The all CC measurement configurations may include a list of measurement objects, a list of reporting configurations, a list of measurement reference component carriers and a list of measurement identities.

In Step ST3603, the control unit for the configured DL_CC_2 (3302) 3802 receives the all CC measurement configurations.

In Step ST3604, the control unit for the configured DL_CC_2 (3302) 3802 notifies the UE of the all CC measurement configurations received in Step ST3603. The control unit for the configured DL_CC_2 (3302) 3802 notifies the measurement configuration targeted for the UE among the all CC measurement configurations received in Step ST3603.

In Step ST3605, the UE provides a measurement report that the event A3 and the event A3-bis have occurred to the base station 3308 by means of the configured UL_CC_2 (3306). This measurement report is notified to the protocol processing unit 3804 through the control unit for the configured UL_CC_2 (3306) 3803. The measurement report of the event A3 includes the measurement ID "1" and the PCI of the neighboring base station_CC_1 (3105). The measurement report of the event A3-bis includes measurement ID "2" and the PCI of the neighboring base station_CC_3 (3107). The measurement report is not required to include the information of a measurement reference component carrier, leading to an effect that radio resources are effectively used. In addition, the conventional technique can be used for the measurement report, which allows a mobile communication system to have high backward compatibility.

In Step ST3606, the protocol processing unit 3804 receives the measurement report from the UE. The measurement identity links one measurement reference component carrier, one measurement object and one reporting configuration together, leading to an effect that the network that has received the measurement report including the measurement identity can recognize the measurement reference component carrier.

The second modification of the fifth embodiment can achieve the following effect in addition to the effect of the fifth embodiment.

Differently from the fifth embodiment, additional information is not required when a UE transmits a measurement report to a network. This achieves an effect that radio resources are used more effectively compared with the fifth embodiment. Further, a conventional technique can be used for the measurement report, which allows a mobile communication system to have high backward compatibility.

Third Modification of Fifth Embodiment

A problem to be solved by a third modification of the fifth embodiment is similar to that of the fifth embodiment, and thus description thereof is omitted.

A solution in the third modification of the fifth embodiment is described below.

Different portions from those of the fifth embodiment are described below. Portions that are not particularly described are similar to those of the fifth embodiment.

Measurement is configured for each component carrier.

Adjustment is performed in the base station including a plurality of downlink component carriers such that measurement identities are not overlapped between the downlink component carriers.

The UE allows the measurement report to include the measurement identity that has triggered a measurement report to be transmitted, the PCI of a neighboring cell and the measurement results of a serving cell, as in the conventional technique. The network performs mobility management, component carrier management and the like based on the measurement report. Specific examples of the entity of the network include a base station.

Nine specific examples of an adjustment entity are disclosed below. (1) Control unit for carrier, which notifies a paging message. (2) Control unit for carrier, which notifies the broadcast information for carrier aggregation or LTE-A system. (3) Control unit for carrier, which notifies the UE of the scheduling results by means of the PDCCH. (4) Control unit for downlink frequency carrier in a multicarrier anchor. (5) Control unit for PCC. (6) Control unit for anchor component carrier. (7) Control unit for downlink frequency carrier in a special cell. (8) New block that adjusts downlink component carriers existing within one base station, such as the protocol processing unit 3804 of FIG. 38. (9) Combination of (1) to (8) above.

Three specific examples of adjustment contents are disclosed below. (1) In a case where a new measurement identity is required in a downlink component carrier, measurement identity allocation is requested for an adjustment entity. The adjustment entity that has received the request allocates measurement identities such that those are not overlapped between a plurality of downlink component carriers. The adjustment entity notifies the downlink component carrier of the allocation results. A request is made in a case where the measurement identity is necessary, and thus a margin is not required, leading to an effect of a smaller total number of measurement identities. (2) An adjustment entity allocates in advance measurement identities that can be used by the downlink component carrier to a plurality of downlink component carriers. Allocation is performed in advance, leading to an effect of a smaller control delay. (3) A measurement identity that can be used by the downlink component carrier are determined in a static manner.

Figure 37:
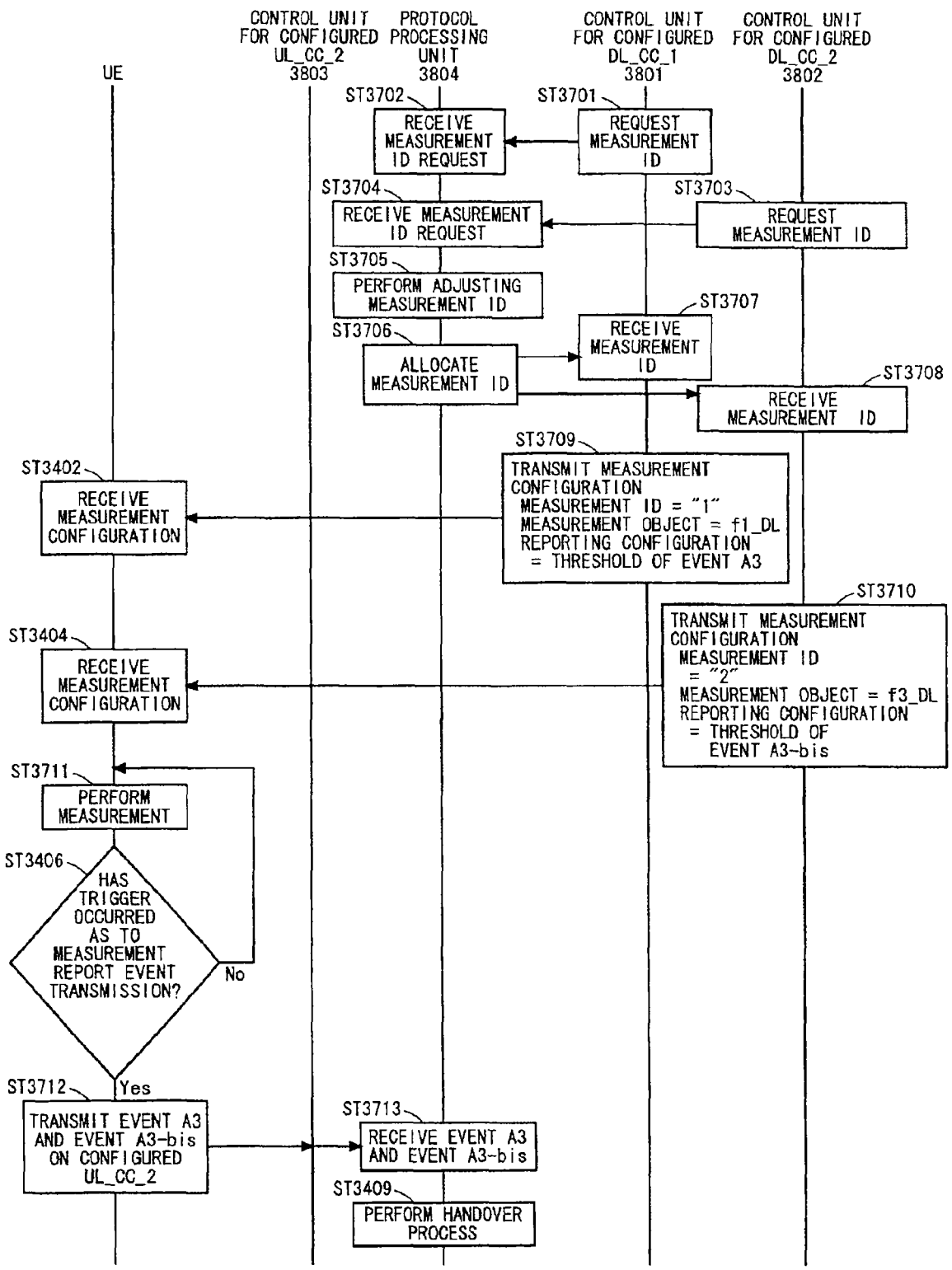
FIG. 37 is a sequence diagram showing the operation of a mobile communication system in a solution according to a third modification of the fifth embodiment.

FIG. 37 shows an example of the operation. The same reference symbols as those of FIG. 34 denote equivalent portions, and thus description thereof is omitted. In this operation example, the specific example (8) is used as an adjustment entity. In this operation example, the adjustment entity is described as the protocol processing unit 3804 of FIG. 38. Further, the specific example (1) is used as the adjustment contents. FIG. 35 shows the state of a serving base station and a neighboring base station. FIG. 35 shows the case where the reception quality of the neighboring base station_CC_1 (3105) becomes better than the reception quality of the configured DL_CC_1 (3301) and the reception quality of the neighboring base station_CC_3 (3107) becomes better than the reception quality of the neighboring base station_CC_2 (3302). FIG. 38 is a block diagram showing the configuration example of a base station (for example, base station 3308 of FIG. 35) according to the present embodiment.

In Step ST3701, the control unit for the configured DL_CC_1 (3301) 3801 notifies the protocol processing unit 3804 of a measurement identity allocation request.

In Step ST3702, the protocol processing unit 3804 receives the measurement identity allocation request from the control unit for the configured DL_CC_1 (3301) 3801.

In Step ST3703, the control unit for the configured DL_CC_2 (3302) 3802 notifies the protocol processing unit 3804 of the measurement identity allocation request.

In Step ST3704, the protocol processing unit 3804 receives the measurement identity allocation request from the control unit for the configured DL_CC_2 (3302) 3802.

In Step ST3705, the protocol processing unit 3804 performs an adjustment such that measurement identities are not overlapped between a plurality of downlink component carriers, in this operation example, between the configured DL_CC_1 (3301) and the configured DL_CC_2 (3302). For example, as a result of adjustment, the protocol processing unit 3804 allocates the measurement ID "1" in response to the request from the control unit for the configured DL_CC_1 (3301) 3801 and the measurement ID "2" in response to the request from the control unit for the configured DL_CC_2 (3302) 3802.

In Step ST3706, the protocol processing unit 3804 allocates measurement identities to the respective control units for downlink component carrier that have requested measurement identity allocation. In this operation example, the protocol processing unit 3804 notifies the control unit for the configured DL_CC_1 (3301) 3801 of the allocation of measurement ID "1" and notifies the control unit for the configured DL_CC_2 (3302) 3802 of the allocation of measurement ID "2".

In Step ST3709, the control unit for the configured DL_CC_1 (3301) 3801 notifies the UE of a measurement configuration. The measurement configuration includes a measurement object, a reporting configuration, and a measurement identity that links the measurement object with the reporting configuration. In this operation example, the threshold of the event A3 is included as a measurement configuration, and the measurement ID "1" is included as a measurement identity. The measurement ID "1" links the measurement object f1_DL with the reporting configuration of the event A3. Alternatively, the measurement configuration may be notified by means of the frequency layer 3303 (f1_DL). Still alternatively, the measurement configuration may be notified by means of the configured downlink component carrier 1 (configured DL_CC_1) 3301.

In Step ST3710, the control unit for the configured DL_CC_2 (3302) 3802 notifies a UE of a measurement configuration. The measurement configuration includes a measurement object, a reporting configuration, and a measurement identity that links the measurement object with the reporting configuration. In this operation example, the threshold of the event A3-bis is included as a reporting configuration, and the measurement ID "2" is included as a measurement identity. The measurement ID "2" links measurement object f3_DL with the reporting configuration of the event A3-bis. Alternatively, the measurement configuration may be notified by means of the frequency layer 3304 (f2_DL). Still alternatively, the measurement configuration may be notified by means of the configured downlink component carrier 2 (configured DL_CC_2) 3302.

In Step ST3711, the UE performs a measurement in accordance with the measurement configurations received in Step ST3402 and Step ST3404. The measurement reference component carrier may be the downlink component carrier where measurement has been configured. The measurement is configured by each downlink component carrier, which enables to perform this method. The information of the measurement reference component carrier does not need to be included in the measurement configuration, leading to an effect that radio resources are effectively used. A conventional technique can be used for the measurement configuration, which allows a mobile communication system to have high backward compatibility. While, it is also possible to use specific examples of the types of measurement reference component carriers of the fifth embodiment.

In Step ST3712, the UE provides a measurement report that the event A3 and the event A3-bis have occurred to the base station 3308 by means of the configured UL_CC_2 (3306). The measurement report is notified to the protocol processing unit 3804 through the control unit for the configured UL_CC_2 (3306) 3803. The measurement report of the event A3 includes the measurement ID "1" and the PCI of the neighboring base station_CC_1 (3105). The measurement report of the event A3-bis includes the measurement ID "2" and the PCI of the neighboring base station_CC_3 (3107). The information of the measurement reference component carrier does not need to be included in the measurement report, leading to an effect that radio resources are effectively used. Further, a conventional technique can be used for the measurement report, which allows a mobile communication system to have high backward compatibility.

In Step ST3713, the protocol processing unit 3804 receives the measurement report from the UE. The measurement identities are not overlapped between a plurality of downlink component carriers, leading to an effect that the network that has received the measurement report including the measurement identities can recognize the measurement reference component carrier.

The third modification of the fifth embodiment can achieve the following effect in addition to the effect of the fifth embodiment.

Differently from the fifth embodiment, additional information is not required when measurement is configured from the network to the UE and when a measurement configuration is performed from the UE to the network. This achieves an effect that radio resources are used more effectively compared with the fifth embodiment. Further, a conventional technique can be used for the measurement report, which allows a mobile communication system to have high backward compatibility.

The invention claimed is:

1. A mobile communication system using aggregated carriers including a plurality of component carriers aggregated, the mobile communication system comprising:
   a base station configured to perform radio communication with a user equipment corresponding to the aggregated carriers,
   wherein, in a case where a new component carrier is added to the aggregated carriers, component carrier information, being information of the new component carrier, is transmitted from the base station to the user equipment with a radio resource management (RRC) message or a medium access control (MAC) message, and control information related to the new component carrier is transmitted from the base station to the user equipment.

2. The mobile communication system according to claim 1, wherein, in a case where the new component carrier is added to the aggregated carriers:
the component carrier information, being the information of the new component carrier, is transmitted from the base station to the user equipment with the RRC message; and
control information related to the new component carrier to be newly added is transmitted from the base station to the user equipment with the RRC message.

3. A base station, comprising:
circuitry configured to, using aggregated carriers including a plurality of component carriers aggregated, perform radio communication with a user equipment corresponding to the aggregated carriers,
wherein, in a case where a new component carrier is added to the aggregated carriers, component carrier information, being information of the new component carrier, is transmitted from the base station to the user equipment with a radio resource management (RRC) message or a medium access control (MAC) message, and control information related to the new component carrier is transmitted from the base station to the user equipment.

4. A user equipment, comprising:
circuitry configured to, using aggregated carriers including a plurality of component carriers aggregated, perform radio communication with a base station, the user equipment corresponding to the aggregated carriers,
wherein, in a case where a new component carrier is added to the aggregated carriers, the user equipment receives component carrier information, being information of the new component carrier from the base station with a radio resource management (RRC) message or a medium access control (MAC) message, and the user equipment further receives control information related to the new component carrier from the base station.

* * * * *